United States Patent
Sakamoto et al.

(10) Patent No.: US 11,768,348 B2
(45) Date of Patent: Sep. 26, 2023

(54) ZOOM LENS AND IMAGE PICKUP APPARATUS

(71) Applicant: CANON KABUSHIKI KAISHA, Tokyo (JP)

(72) Inventors: Masaru Sakamoto, Tochigi (JP); Tomoya Yamada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 54 days.

(21) Appl. No.: 17/584,150

(22) Filed: Jan. 25, 2022

(65) Prior Publication Data

US 2022/0244488 A1 Aug. 4, 2022

(30) Foreign Application Priority Data

Jan. 29, 2021 (JP) .................................. 2021-013070

(51) Int. Cl.
| | |
|---|---|
| *G02B 7/10* | (2021.01) |
| *G02B 15/14* | (2006.01) |
| *G02B 15/17* | (2006.01) |
| *G02B 15/173* | (2006.01) |

(52) U.S. Cl.
CPC ........... *G02B 7/10* (2013.01); *G02B 15/1461* (2019.08); *G02B 15/144109* (2019.08); *G02B 15/144113* (2019.08); *G02B 15/145117* (2019.08); *G02B 15/145125* (2019.08); *G02B 15/145129* (2019.08); *G02B 15/17* (2013.01); *G02B 15/173* (2013.01)

(58) Field of Classification Search
CPC .............. G02B 7/10; G02B 15/144109; G02B 15/144113; G02B 15/145117; G02B 15/145125; G02B 15/145129; G02B 15/1461; G02B 15/17; G02B 15/173
See application file for complete search history.

(56) References Cited

FOREIGN PATENT DOCUMENTS

JP 2011107693 A 6/2011

*Primary Examiner* — Jack Dinh
(74) *Attorney, Agent, or Firm* — CANON U.S.A., INC. IP Division

(57) ABSTRACT

A zoom lens includes, in order from an object side to an image side, a first lens unit having a positive refractive power, a plurality of lens units which move in zooming, and a final lens unit having a positive refractive power, an interval between each pair of adjacent lens units changing in zooming, the plurality of lens units including a lens unit having a negative refractive power, the first lens unit including a negative lens and a positive lens, at least a part of the first lens unit moving for focusing, the first lens unit including a negative lens made of a material satisfying inequalities defined by a refractive index, an Abbe number, and a partial dispersion ratio, and the zoom lens satifying an inequality defined by a maximum value of an Abbe number of at least one positive lens of the first lens unit.

20 Claims, 33 Drawing Sheets

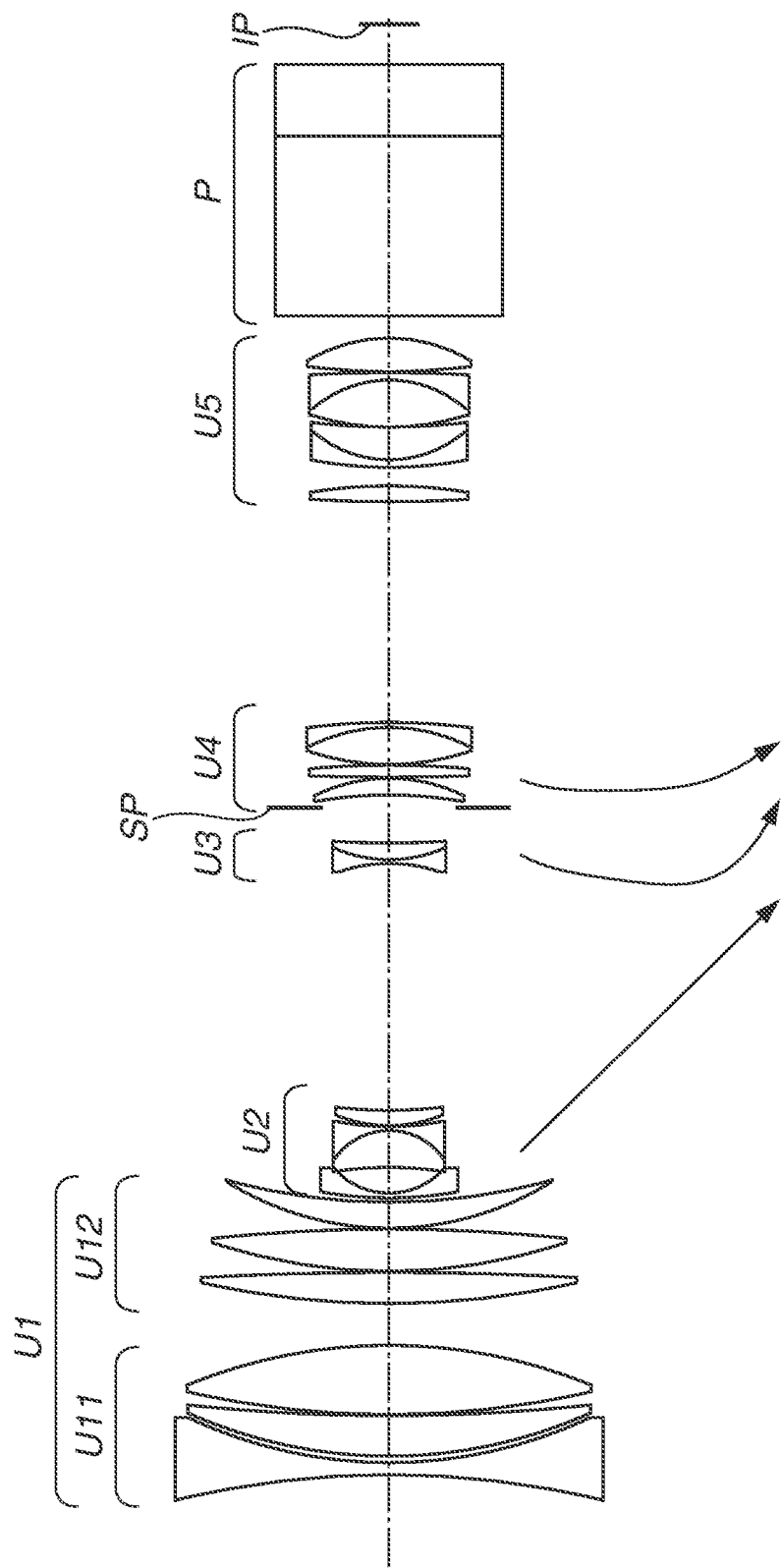

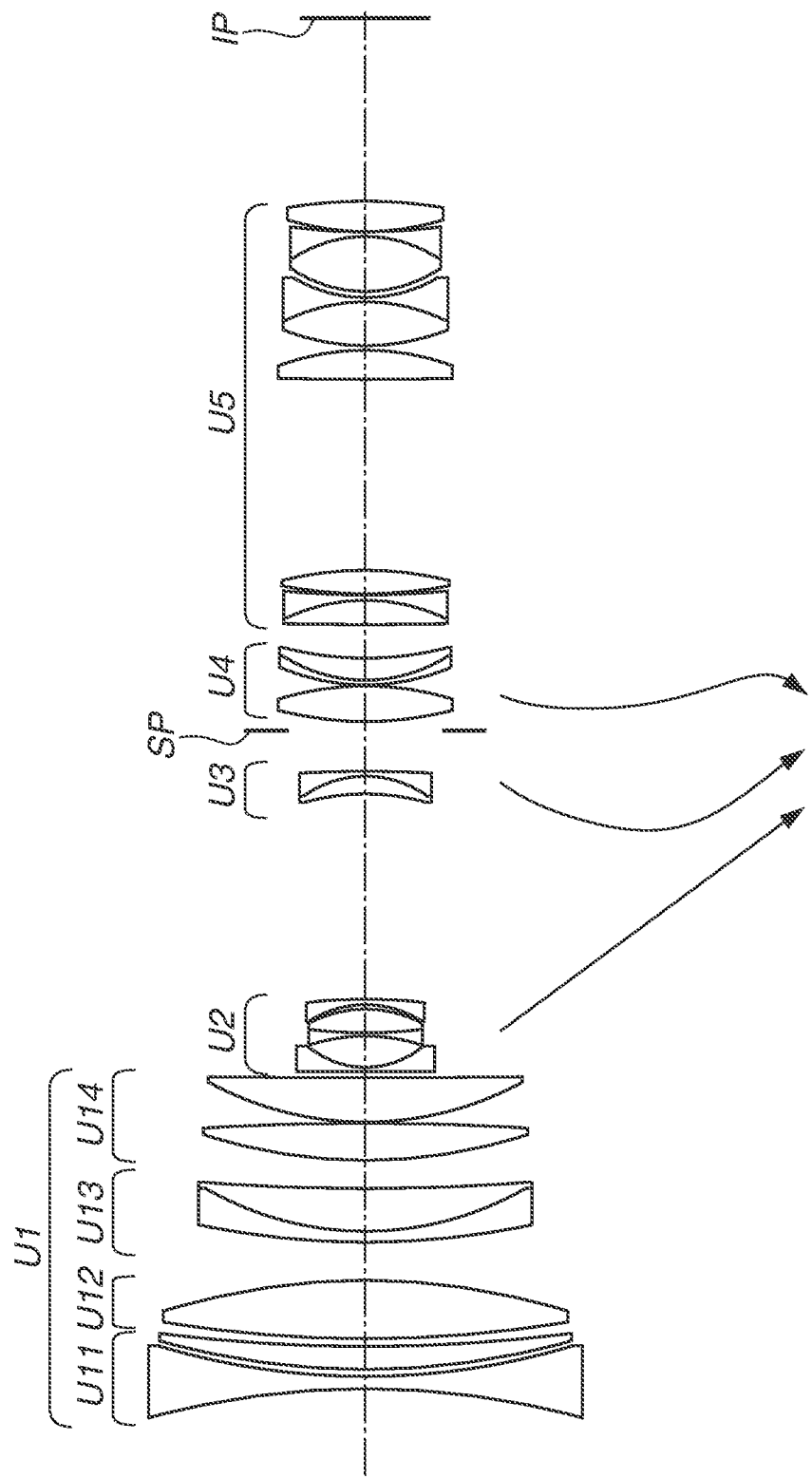

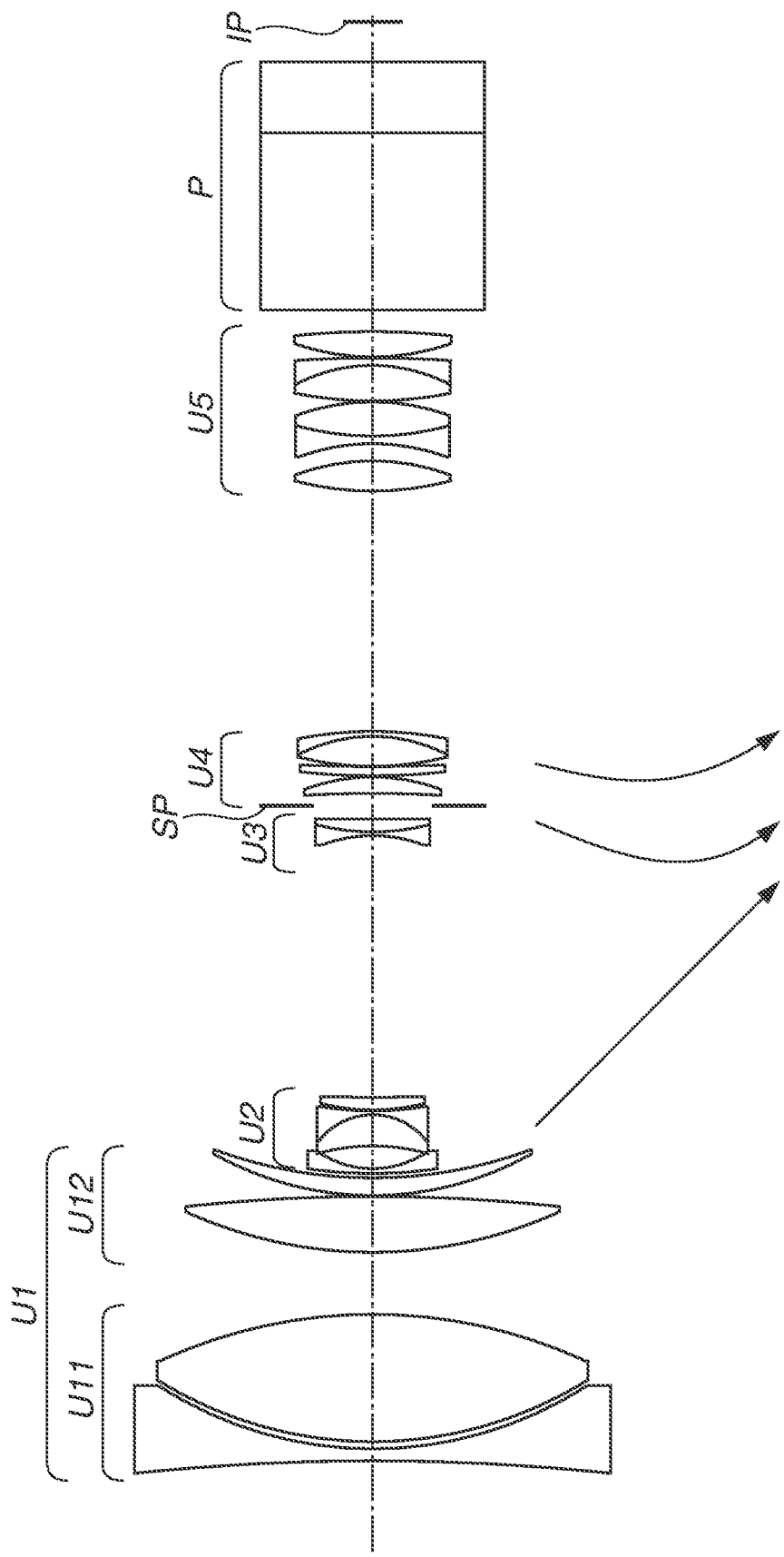

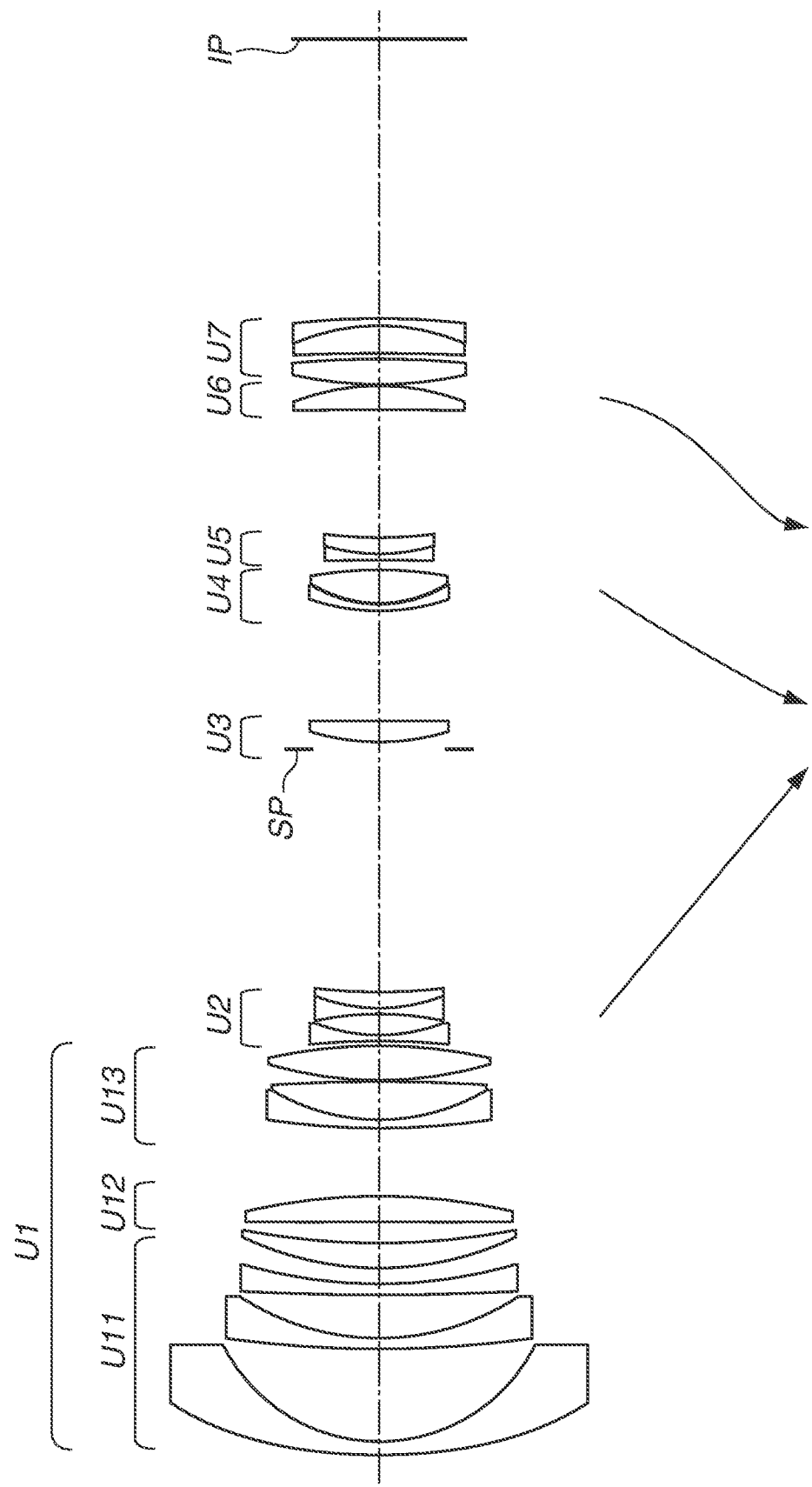

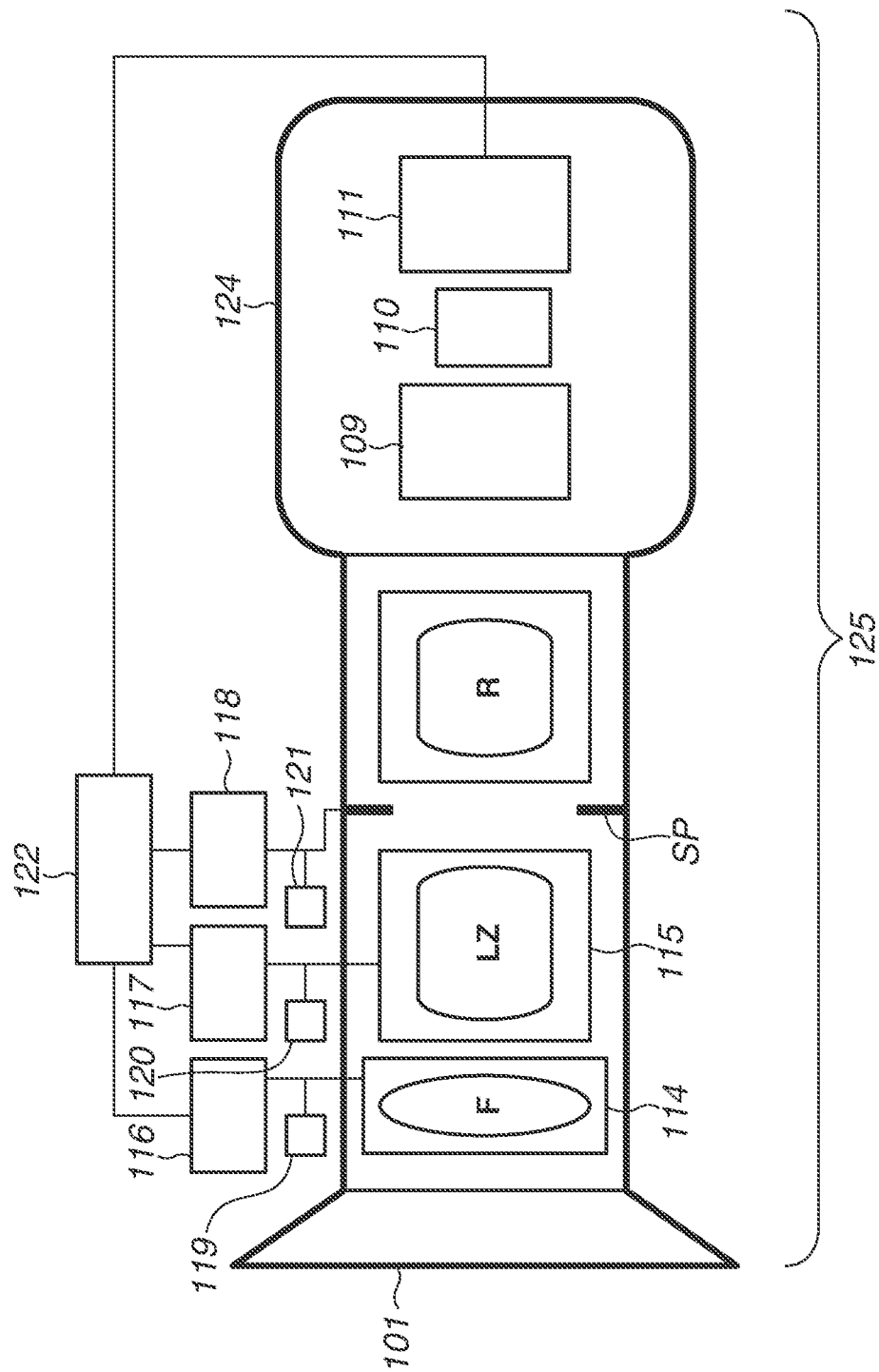

ZOOM LENS AND IMAGE PICKUP APPARATUS

BACKGROUND

Field of the Disclosure

Aspects of the embodiments generally relate to a zoom lens and an image pickup apparatus.

Description of the Related Art

Image pickup apparatuses, such as television cameras, cinema cameras, and video cameras, are required to use a zoom lens having a wide angle of view, a high zoom ratio, and a high optical performance. As such a zoom lens, there is known a positive lead type zoom lens, which includes a lens unit with positive refractive power located on the most object side and is configured to perform focusing by moving a part of the lens unit. Such a positive lead type zoom lens includes, in order from an object side to an image side, a first lens unit with positive refractive power, which does not move for variation of magnification, a second lens unit with negative refractive power, which moves for variation of magnification, and an imaging lens unit, which does not move for variation of magnification. As such a positive lead type zoom lens, there is known a zoom lens having a zoom ratio of about 22 and a half angle of view at the wide-angle end of about 35°, as discussed in Japanese Patent Application Laid-Open No. 2011-107693.

To enable the above-mentioned positive lead type zoom lens to have a small size and light weight, a large aperture ratio, a high zoom ratio, and a high optical performance at the telephoto end, it is necessary to appropriately configure the first lens unit, which has a focusing function. The zoom lens discussed in Japanese Patent Application Laid-Open No. 2011-107693 may be disadvantageous in that further increasing a zoom ratio results in an increase of longitudinal chromatic aberration at the telephoto end and an increase of the size of the first lens unit.

SUMMARY OF THE DISCLOSURE

An aspect of the disclosure provides, for example, a zoom lens beneficial in a small size and light weight, a large aperture ratio, a high zoom ratio, and a high optical performance thereof.

According to an aspect of the disclosure, a zoom lens includes, in order from an object side to an image side, a first lens unit having a positive refractive power, a plurality of lens units which move in zooming, final lens unit having a positive refractive power, an interval between each pair of adjacent lens units changing in zooming, wherein the plurality of lens units include a lens unit having a negative refractive power, wherein the first lens unit includes a negative lens and a positive lens, wherein at least a part of the first lens unit moves for focusing, wherein the first lens unit includes a negative lens made of a material satisfying the following inequalities:

$1.70 < Ndn < 1.85$, $28 < vdn < 39$, and $-0.010 < \theta n - (0.641682 - 0.001623 \times vdn) < -0.004$, where $Ndn$ denotes a refractive index with respect to a d-line, $vdn$ denotes an Abbe number based on a d-line, and $\theta n$ denotes a partial dispersion ratio with respect to a g-line and an F-line, and wherein the zoom lens satisfies the following inequality:

$2.0 < vbg/vdn < 3.5$, where $vbg$ denotes a maximum value of an Abbe numbers based on a d-line of at least one positive lens included in the first lens unit.

Further features of the disclosure will become apparent from the following description of exemplary embodiments with reference to the attached drawings.

BRIEF DESCRIPTION OF THE DRAWINGS

FIG. 1 is a diagram illustrating a cross-section of a zoom lens in a state of being set at the wide-angle end and at focusing on infinite distance according to a first exemplary embodiment (numerical example 1).

FIG. 7 is a diagram illustrating a cross-section of a zoom lens in a state of being set at the wide-angle end and at focusing on infinite distance according to a fourth exemplary embodiment (numerical example 4).

FIG. 9 is a diagram illustrating a cross-section of a zoom lens in a state of being set at the wide-angle end and at focusing on infinite distance according to a fifth exemplary embodiment (numerical example 5).

FIG. 31 is a diagram illustrating a cross-section of a zoom lens in a state of being set at the wide-angle end and at focusing on infinite distance according to a sixteenth exemplary embodiment (numerical example 16).

FIG. 33 is a diagram illustrating a configuration example of an image pickup apparatus.

DESCRIPTION OF THE EMBODIMENTS

Figure 2A:
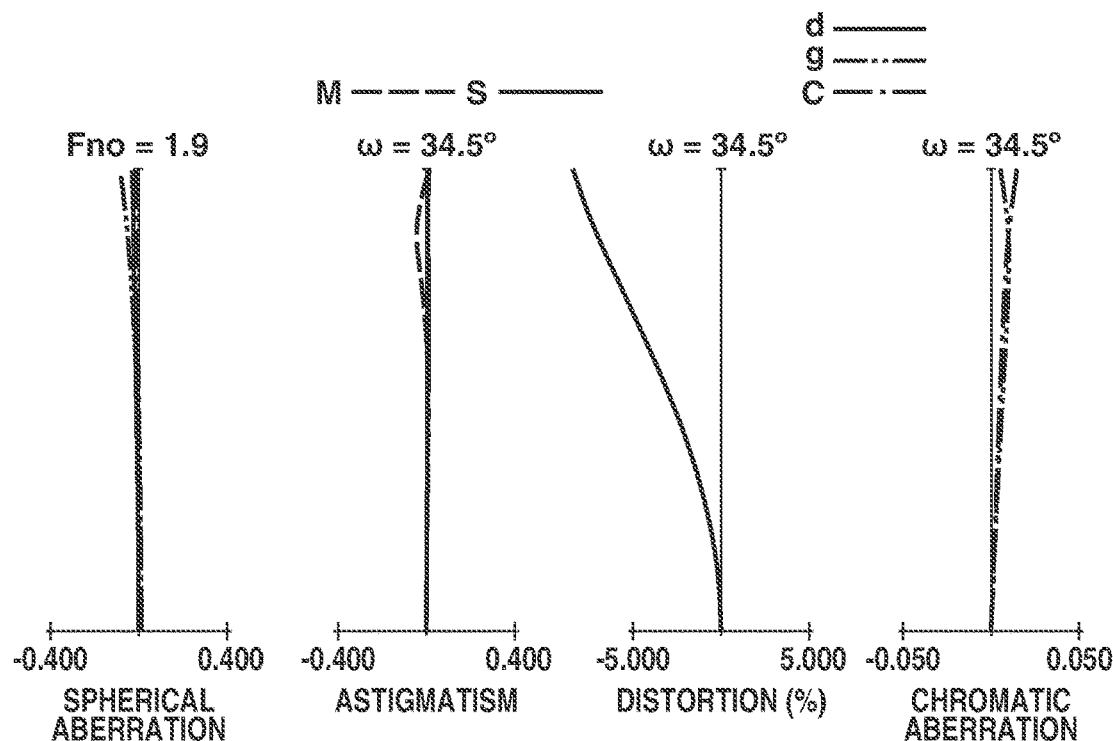
FIGS. 2A and 2B are aberration diagrams of the zoom lens in a state of being set at the wide-angle end and at focusing on infinite distance and in a state of being set at the telephoto end and at focusing on infinite distance, respectively, according to the first exemplary embodiment (numerical example 1).

Various exemplary embodiments, features, and aspects of the disclosure will be described in detail below with reference to the drawings. Furthermore, throughout all of the figures used for describing exemplary embodiments, in principle (unless otherwise stated), for example, the same members are assigned the respective same reference characters, and any duplicate description thereof is omitted.

A zoom lens according to a first exemplary embodiment (the same also applying to the other exemplary embodiments) includes a first lens unit, a plurality of movable lens units (also referred to simply as a "plurality of lens units"), and a final lens unit, which are arranged in order from an object side to an image side. The first lens unit has positive refractive power and does not move for variation of magnification (also referred to as "zoom adjustment" or "zooming"). The plurality of movable lens units moves in variation of magnification (in zooming). Each of intervals between the respective adjacent lens units included in the zoom lens varies due to the plurality of movable lens units moving. The final lens unit has positive refractive power. The plurality of movable lens units includes at least one movable lens unit with negative refractive power. The first lens unit includes a negative lens. At least a part of the first lens unit moves for focusing (also referred to as "focus adjustment" or "in-focus adjustment"). The negative lens satisfies the following inequalities:

$$1.70 < Ndn < 1.85 \quad (1)$$

$$28 < vdn < 39 \quad (2)$$

$$-0.010 < \theta n - (0.641682 - 0.001623 \times vdn) < -0.004 \quad (3)$$

$$2.0 < vbg/vdn < 3.5 \quad (4)$$

Here, Ndn denotes a refractive index regarding d-line of the negative lens. Moreover, vdn denotes an Abbe number based on d-line of the negative lens. Moreover, θn denotes a partial dispersion ratio regarding g-line and F-line of the negative lens. Moreover, vbg denotes a maximum value of Abbe numbers based on d-line of the positive lenses included in the first lens unit.

The inequalities (1) to (3) define optical characteristics of the negative lens included in the first lens unit. Optical glass can contain a metal oxide. Examples of the metal oxide include silicon dioxide ($SiO_2$), titanium dioxide ($TiO_2$), lanthanum oxide ($La_2O_3$), aluminum oxide ($Al_2O_3$), niobium pentoxide ($Nb_2O_5$), zirconium dioxide ($ZrO_2$), and gadolinium (III) oxide ($Gd_2O_3$). Here, for example, $TiO_2$ has the effect of heightening a refractive index and making an Abbe number smaller (heightening a dispersion), and glass containing a high proportion of $TiO_2$ has a relatively high refractive index and a relatively high dispersion. Moreover, $Gd_2O_3$ has the effect of heightening a refractive index and making an Abbe number larger (lowering a dispersion), and glass containing a high proportion of $Gd_2O_3$ has a relatively high refractive index and a relatively low dispersion. This is because $TiO_2$ and $Gd_2O_3$ have a relatively high refractive index and a relatively high dispersion and a relatively high refractive index and a relatively low dispersion, respectively. In this way, optical glass varies in optical characteristics depending on its contained component. The same also applies to optical ceramics, and containing a substance having a relatively high refractive index and a relatively low dispersion enables obtaining optical ceramics having a relatively high refractive index and a relatively low dispersion. Therefore, an optical material (for example, optical glass or optical ceramics) can have various optical characteristics (for example, a refractive index and an Abbe number) by, for example, containing (dissolving or sintering) a contained material (for example, a metal oxide such as $SiO_2$, $TiO_2$, or $La_2O_3$) to various extents.

In a zoom lens having the above-mentioned configuration, the height of an axial ray in the first lens unit increases as the focal length increases (typically, in proportion to the focal length). Therefore, as the focal length increases, longitudinal chromatic aberration increases. Here, the amount A of longitudinal chromatic aberration in the zoom lens is expressed by the following formula:

$$\Delta = \Delta 1 \cdot \beta r^2 + \alpha$$

where Δ1 denotes the amount of longitudinal chromatic aberration in the first lens unit, βr denotes an imaging magnification of an optical system located behind the first lens unit, and α denotes the amount of longitudinal chromatic aberration occurring by an optical component different from the first lens unit. In the amount Δ of longitudinal chromatic aberration, an aberration occurring by the first lens unit becomes conspicuous at the telephoto side, in which axial marginal rays pass through a higher portion in the first lens unit. Accordingly, it is possible to decrease the amount Δ1 of longitudinal chromatic aberration in the first lens unit by decreasing the amount of secondary spectrum of longitudinal chromatic aberration in the first lens unit, and, therefore, it is possible to decrease the amount Δ of longitudinal chromatic aberration at the telephoto side.

First, the inequality (1) is about the refractive index Ndn of the above-mentioned negative lens included in the first lens unit. If the inequality (1) is not satisfied with regard to the lower limit value thereof, the curvature of the negative lens increases, and, therefore, aberrations at the telephoto end (particularly, spherical aberration and coma) become excessively large. If the inequality (1) is not satisfied with regard to the upper limit value thereof, the partial dispersion ratio of an optical material constituting the negative lens becomes excessively small, and, therefore, the specific gravity of the optical material becomes excessively large.

It is more favorable that the inequality (1) is altered as follows:

$$1.72 < Ndn < 1.83 \quad (1a)$$

It is further favorable that the inequality (1) is altered as follows:

$$1.73 < Ndn < 1.79 \quad (1b)$$

Moreover, the inequality (2) is about the Abbe number vdn of the above-mentioned negative lens included in the first lens unit. If the inequality (2) is not satisfied with regard to the lower limit value thereof, the Abbe number of a positive lens and the Abbe number of a negative lens become excessively away from each other. Therefore, the partial dispersion ratio of the positive lens and the partial dispersion ratio of the negative lens become excessively away from each other. As a result, the amount of secondary spectrum of longitudinal chromatic aberration in the first lens unit, eventually, the amount Δ1 of longitudinal chromatic aberration in the first lens unit, becomes excessively large. If the inequality (2) is not satisfied with regard to the upper limit value thereof, the refractive power of each single lens included in the first lens unit becomes excessively large, and, therefore, aberrations at the telephoto end (particularly, spherical aberration and coma) become excessively large.

It is more favorable that the inequality (2) is altered as follows:

$$29 < vdn < 39 \quad (2a)$$

It is further favorable that the inequality (2) is altered as follows:

$$34 < vdn < 37 \quad (2b)$$

Moreover, the inequality (3) is about a relationship between the Abbe number vdn and partial dispersion ratio θn of the above-mentioned negative lens included in the first lens unit. If the inequality (3) is not satisfied with regard to the upper limit value thereof, longitudinal chromatic aberration in the first lens unit increases, so that variations of longitudinal chromatic aberration caused by zooming becomes excessively large. If the inequality (3) is not satisfied with regard to the lower limit value thereof, lateral chromatic aberration at the wide-angle end becomes excessively large or the partial dispersion ratio becomes excessively small, and, therefore, it becomes difficult to obtain an optical material suited for the above-mentioned negative lens.

It is more favorable that the inequality (3) is altered as follows:

$$-0.007<\theta n-(0.641682-0.001623\times vdn)<-0.004 \quad (3a)$$

Moreover, it is favorable that at least a part of the first lens unit has positive refractive power and moves for focusing. This is because it is possible to provide a zoom lens beneficial in respect of the amount of movement of a lens unit for focusing being small, the number of lenses constituting the first lens unit being small, a high zoom ratio, and a small size and light weight. The above-mentioned at least a part can be a second subunit, which does not include a first subunit located on the most object side, in the first lens unit and which moves from the image side to the object side for focusing from infinite distance to minimum distance. Moreover, the above-mentioned at least a part can be a second subunit, which does not include a first subunit located on the most object side and a third subunit located on the most image side, in the first lens unit and which moves from the object side to the image side for focusing from infinite distance to minimum distance. In the case of this configuration, it is possible to provide a zoom lens beneficial in respect of the amount of movement of a lens unit for focusing being small and the variation of aberrations caused by the movement of the lens unit for focusing being small. Furthermore, the first subunit and the second subunit can have positive or negative refractive power.

Moreover, the inequality (4) is about the ratio of the maximum value vbg of Abbe numbers based on d-line of positive lenses included in the first lens unit to the Abbe number vdn of the above-mentioned negative lens. If the inequality (4) is not satisfied with regard to the lower limit value thereof, the refractive power of each single lens included in the first lens unit becomes excessively large, and, therefore, aberrations (particularly, spherical aberration and coma) at the telephoto end become excessively large.

If the inequality (4) is not satisfied with regard to the upper limit value thereof, it becomes difficult to obtain an optical material suitable for a positive lens. Alternatively, the Abbe number of a positive lens and the Abbe number of a negative lens become excessively away from each other. Therefore, the partial dispersion ratio of the positive lens and the partial dispersion ratio of the negative lens become excessively away from each other. As a result, the amount of secondary spectrum of longitudinal chromatic aberration in the first lens unit, eventually, the amount Δ1 of longitudinal chromatic aberration in the first lens unit, becomes excessively large.

Furthermore, the zoom lens according to the first exemplary embodiment (the same also applying to the other exemplary embodiments) satisfies the following inequality, which is about the specific gravity Dn of the above-mentioned negative lens in the first lens unit:

$$3.0<Dn<4.0 \quad (5)$$

If the inequality (5) is not satisfied with regard to the upper limit value thereof, the weight of the negative lens, which is large in volume in the first lens unit, becomes excessively large, so that it becomes difficult to provide a zoom lens beneficial in respect of a small size and light weight. It is more favorable that the inequality (5) is altered as follows:

$$3.1<Dn<3.8 \quad (5a)$$

Moreover, in the zoom lens according to the first exemplary embodiment (the same also applying to the other exemplary embodiments), it is favorable that the above-mentioned negative lens included in the first lens unit is a lens included in a first subunit located on the most object side. Furthermore, the first subunit does not move for focusing. Alternatively, it is favorable that the above-mentioned negative lens included in the first lens unit is at least one of a lens located on the most object side and a lens located second from the object side. Such a negative lens having a refractive power large in absolute value enables obtaining a zoom lens beneficial not only in respect of longitudinal chromatic aberration as mentioned above but also in respect of a wide angle of view. Furthermore, "a lens located N-th from the object side" is also referred to as the "N-th lens".

Moreover, it is also favorable that the above-mentioned third subunit located closer to the image side than the above-mentioned second subunit, which moves toward the image side for focusing, in the first lens unit includes the above-mentioned negative lens included in the first lens unit. The above-mentioned negative lens can be at least one negative lens among a lens located on the most object side to a lens located fourth from the object side in the third subunit including the above-mentioned negative lens. In the case of a wide-angle zoom lens, the above-mentioned first subunit located closer to the object side than the second subunit, which moves toward the image side for focusing, results in having a negative refractive power large in absolute value. Therefore, in the third subunit located closer to the image side than the first subunit, the height of an axial ray becomes high. Therefore, causing the third subunit, in which the height of an axial ray becomes high, to include the above-mentioned negative lens included in the first lens unit enables obtaining a zoom lens beneficial in respect of the variation of longitudinal chromatic aberration caused by variation of magnification not becoming excessive.

Moreover, in the zoom lens according to the first exemplary embodiment (the same also applying to the other exemplary embodiments), it is favorable that the above-mentioned negative lens included in the first lens unit is a negative lens the absolute value of refractive power of which is maximum among negative lenses included in the first lens unit. This is because an influence on the amount Δ1 of longitudinal chromatic aberration in the first lens unit increases according to (typically, in proportion to) the absolute value of refractive power of the negative lens. Employing such a configuration enables obtaining a zoom lens in which the variation of longitudinal chromatic aberration caused by zooming does not become excessively large.

Moreover, the zoom lens according to the first exemplary embodiment (the same also applying to the other exemplary embodiments) satisfies the following inequality:

$$0.7<|f1/fnmx|<13.0 \quad (6)$$

The inequality (6) is about the absolute value of the ratio of the focal length f1 of the first lens unit to the focal length fnmx of a lens unit the absolute value of refractive power of which is largest among negative lens units which move in variation of magnification. If the inequality (6) is not satisfied with regard to the upper limit value thereof, the refractive power of the above-mentioned negative lens unit becomes excessively stronger than the refractive power of the first lens unit, and, therefore, the variation of aberrations caused by variation of magnification becomes excessively large. If the inequality (6) is not satisfied with regard to the lower limit value thereof, the refractive power of the above-mentioned negative lens unit becomes excessively weaker than the refractive power of the first lens unit, and, therefore, the amount of movement of the above-mentioned negative lens unit in variation of magnification becomes excessively large, so that it becomes difficult to obtain a zoom lens beneficial in respect of a small size and light weight.

Furthermore, it is favorable that the above-mentioned zoom lens in which the second subunit included in the first lens unit moves from the image side to the object side for focusing from infinite distance to minimum distance is made to satisfy the following inequality (6') instead of the inequality (6):

$$2.8 < |f1/fnmx| < 13.0 \qquad (6')$$

It is more favorable that the inequality (6') is altered as follows:

$$3.0 < |f1/fnmx| < 11.0 \qquad (6'a)$$

Furthermore, it is favorable that the above-mentioned zoom lens in which the second subunit included in the first lens unit moves from the object side to the image side for focusing from infinite distance to minimum distance is made to satisfy the following inequality (6") instead of the inequality (6):

$$0.7 < |f1/fnmx| < 7.0 \qquad (6")$$

It is more favorable that the inequality (6") is altered as follows:

$$0.9 < |f1/fnmx| < 5.0 \qquad (6"a)$$

Moreover, it is favorable that the above-mentioned zoom lens in which the second subunit included in the first lens unit moves from the object side to the image side for focusing from infinite distance to minimum distance is made to satisfy the following inequality (7). The inequality (7) is about the absolute value of the ratio of the focal length f11 of the first subunit included in the first lens unit located closer to the object side than the second subunit to the focal length f1 of the first lens unit.

$$0.5 < |f1/f1| < 5.0 \qquad (7)$$

If the inequality (7) is not satisfied with regard to the upper limit value thereof, the absolute value of refractive power of the first subunit located on the object side becomes excessively smaller than the absolute value of refractive power of the first lens unit. Therefore, the diameter of the first subunit located on the object side becomes excessively large, so that a disadvantage occurs in obtaining a zoom lens beneficial in respect of a small size and a wide angle of view. If the inequality (7) is not satisfied with regard to the lower limit value thereof, the absolute value of refractive power of the first subunit located on the object side becomes excessively larger than the absolute value of refractive power of the first lens unit, so that a disadvantage occurs in obtaining a zoom lens beneficial in respect of the variation of aberrations being small (a high optical performance). It is more favorable that the inequality (7) is altered as follows:

$$0.7 < |f11/f1| < 3.0 \qquad (7a)$$

Table 1 described below shows values concerning the respective conditions in the first to eleventh exemplary embodiments (numerical examples 1 to 11). Furthermore, "numerical example" is also referred to simply as "example". Each of the first to eleventh exemplary embodiments (numerical examples 1 to 11) satisfies all of the inequalities (1) to (6). The fourth exemplary embodiment (numerical example 4) also satisfies the inequalities (6') and (7). Therefore, according to each of the first to eleventh exemplary embodiments, it is possible to provide a zoom lens beneficial in respect of, for example, a small size and light weight, a large aperture ratio, a high zoom ratio, and a high optical performance.

Moreover, Table 2 described below shows values concerning the respective conditions in the twelfth to sixteenth exemplary embodiments (numerical examples 12 to 16). Each of the twelfth to sixteenth exemplary embodiments (numerical examples 12 to 16) satisfies all of the inequalities (1) to (5), (6'), and (7). Therefore, according to each of the twelfth to sixteenth exemplary embodiments, it is possible to provide a zoom lens beneficial in respect of, for example, a small size and light weight, a large aperture ratio, a high zoom ratio, and a high optical performance.

FIG. 1 is a diagram illustrating a cross-section of a zoom lens in a state of being set at the wide-angle end and at focusing on infinite distance (an infinite distance object) according to the first exemplary embodiment (corresponding to a numerical example 1 described below). The zoom lens includes, in order from an object side to an image side, first to fifth lens units. The first lens unit (U1) has positive refractive power and does not move for variation of magnification (zoom adjustment or zooming). The second lens unit (U2) has negative refractive power and moves in variation of magnification. The third lens unit (U3) has negative refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, P denotes a glass block. The glass block can include a color separation prism or a filter such as a neutral density (ND) filter. Moreover, IP denotes an image plane of the zoom lens, at which the imaging surface (light receiving surface) of an image sensor (image pickup element; photoelectric conversion element) can be located.

Figure 2B:
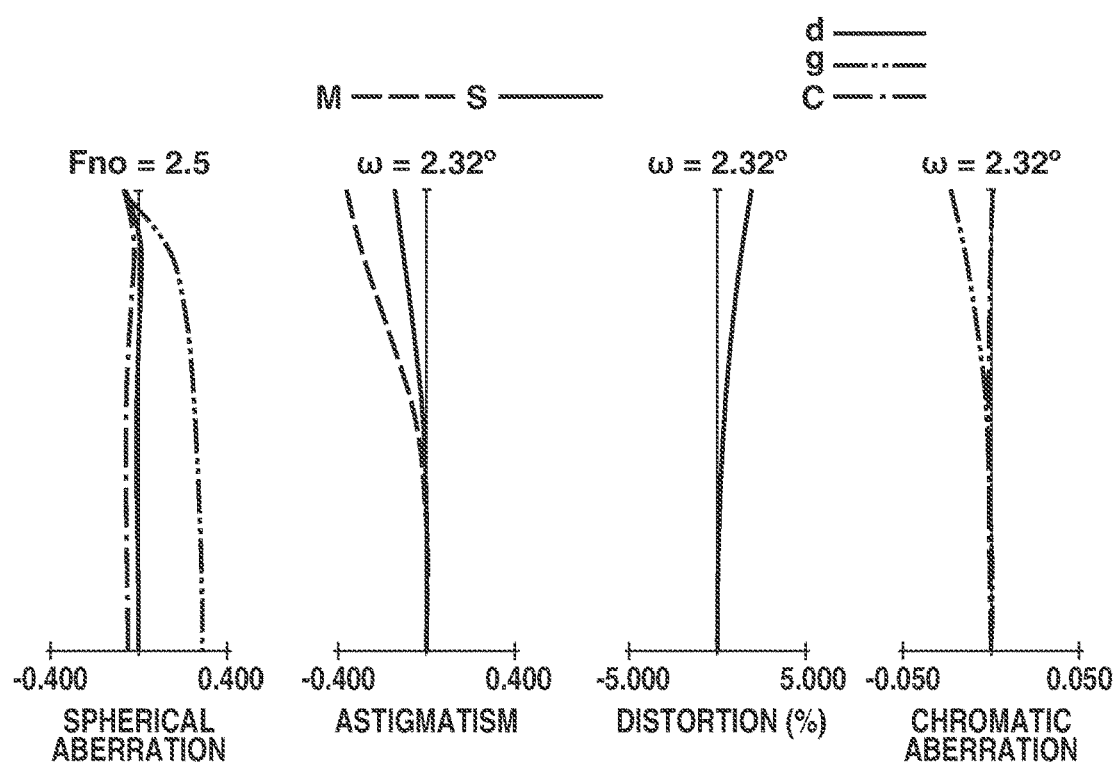

FIGS. 2A and 2B are aberration diagrams of the zoom lens in a state of being set at the wide-angle end and at focusing on infinite distance and in a state of being set at the telephoto end and at focusing on infinite distance, respectively, according to the first exemplary embodiment (numerical example 1). Furthermore, in the aberration diagrams (the same also applying to aberration diagrams in numerical examples 2 to 11), spherical aberration is illustrated with respect to d-line, g-line, and C-line with the full scale in the horizontal axis being set as ±0.400 millimeters (mm). Astigmatism is illustrated with respect to a meridional image plane (ΔM) in d-line and a sagittal image plane (ΔS) in d-line with the full scale in the horizontal axis being set as ±0.400 mm Distortion is illustrated with the full scale in the horizontal axis being set as ±5.000%. Lateral chromatic aberration is illustrated with respect to g-line and C-line with the full scale in the horizontal axis being set as ±0.050 mm Fno denotes F-number, and ω to denotes a half angle of view. Furthermore, the wide-angle end corresponds to a zoom state in which the focal length is shortest, and the telephoto end corresponds to a zoom state in which the focal length is longest.

The first lens unit includes six lenses, and a positive lens located fourth from the object side, a positive lens located fifth from the object side, and a positive lens located sixth from the object side move from the image side to the object side for focusing (focus adjustment or in-focus adjustment) from infinite distance to minimum distance. The lenses located fourth to sixth from the object side (second subunit U12) can be configured to move integrally with each other. Moreover, the lenses located fourth and fifth from the object side can be configured to move integrally with each other and the lens located sixth from the object side can be configured to move independently of the lenses located fourth and fifth from the object side.

In the first lens unit, lenses located first to third from the object side (first subunit U11) do not move for focusing. Furthermore, the lens located first from the object side is a negative lens. The negative lens satisfies the above-mentioned inequalities (1) to (3) and (5).

The first lens unit includes four or more lenses, and, here, includes six lenses. A positive lens the Abbe number based on d-line of which becomes maximum among the positive lenses included in the first lens unit is a lens located second from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 3:
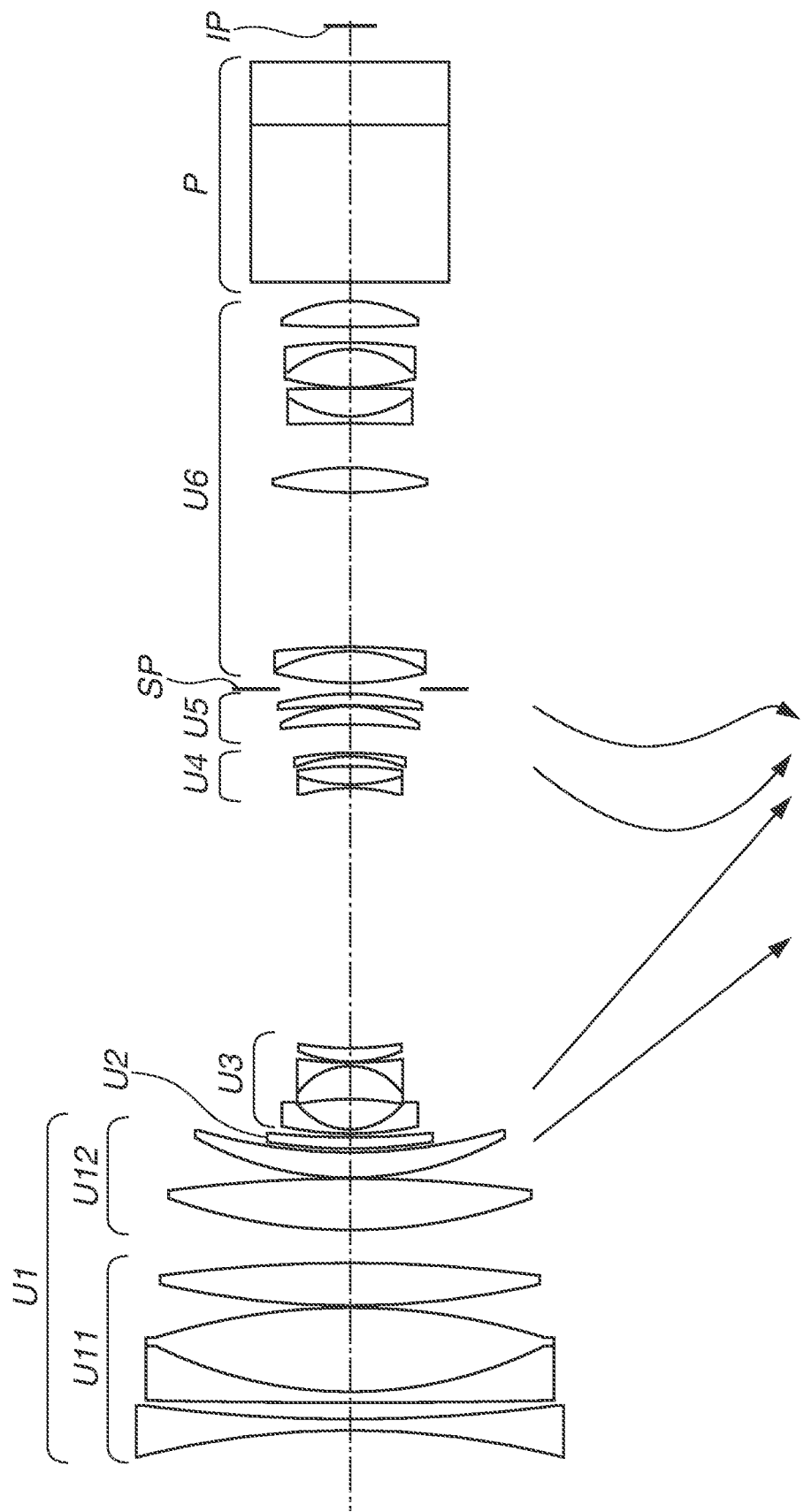
FIG. 3 is a diagram illustrating a cross-section of a zoom lens in a state of being set at the wide-angle end and at focusing on infinite distance according to a second exemplary embodiment (numerical example 2).

FIG. 3 is a diagram illustrating a cross-section of a zoom lens in a state of being set at the wide-angle end and at focusing on infinite distance according to a second exemplary embodiment (corresponding to a numerical example 2 described below). The zoom lens includes, in order from an object side to an image side, first to sixth lens units. The first lens unit (U1) has positive refractive power and does not move for variation of magnification (zoom adjustment or zooming). The second lens unit (U2) has positive refractive power and moves in variation of magnification. The third lens unit (U3) has negative refractive power and moves in variation of magnification. The fourth lens unit (U4) has negative refractive power and moves in variation of magnification. The fifth lens unit (U5) has positive refractive power and moves in variation of magnification. The sixth lens unit (U6) has positive refractive power, serves to form an image, and does not move for variation of magnification. Furthermore, the third lens unit moves toward the image side in variation of magnification from the wide-angle end to the telephoto end. Moreover, the sixth lens unit (U6) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 4A:
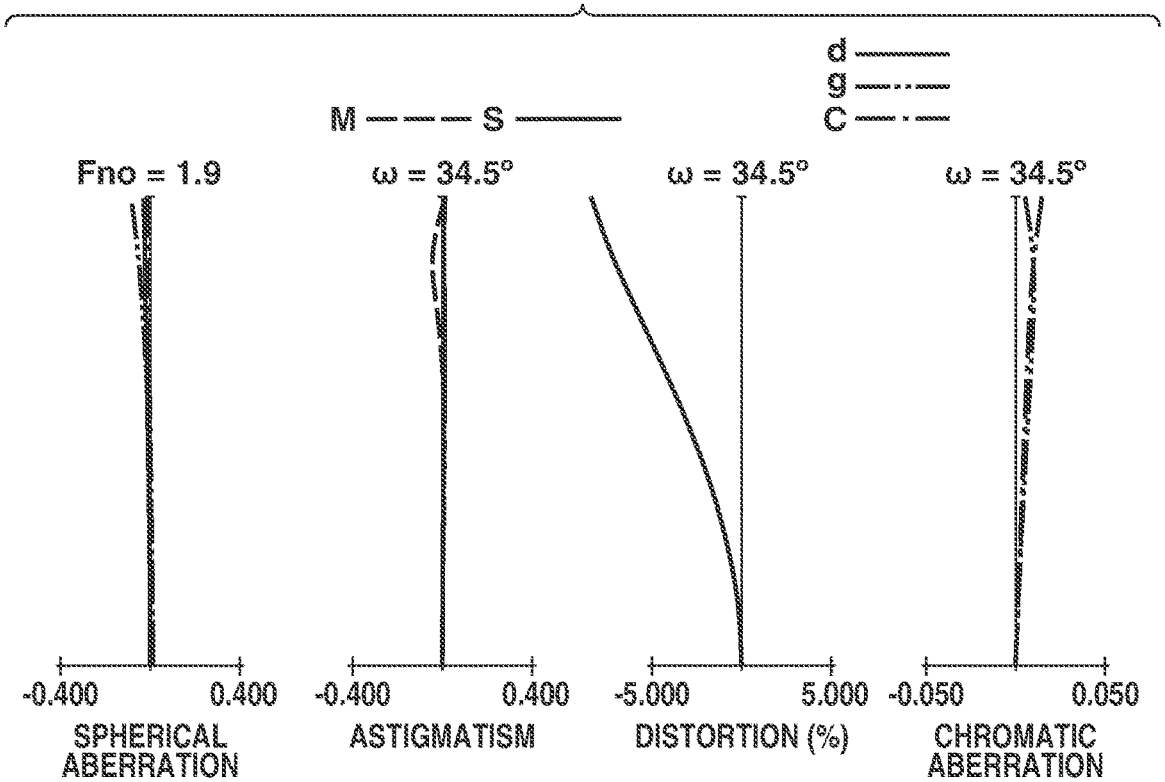
FIGS. 4A and 4B are aberration diagrams of the zoom lens in a state of being set at the wide-angle end and at focusing on infinite distance and in a state of being set at the telephoto end and at focusing on infinite distance, respectively, according to the second exemplary embodiment (numerical example 2).
Figure 4B:
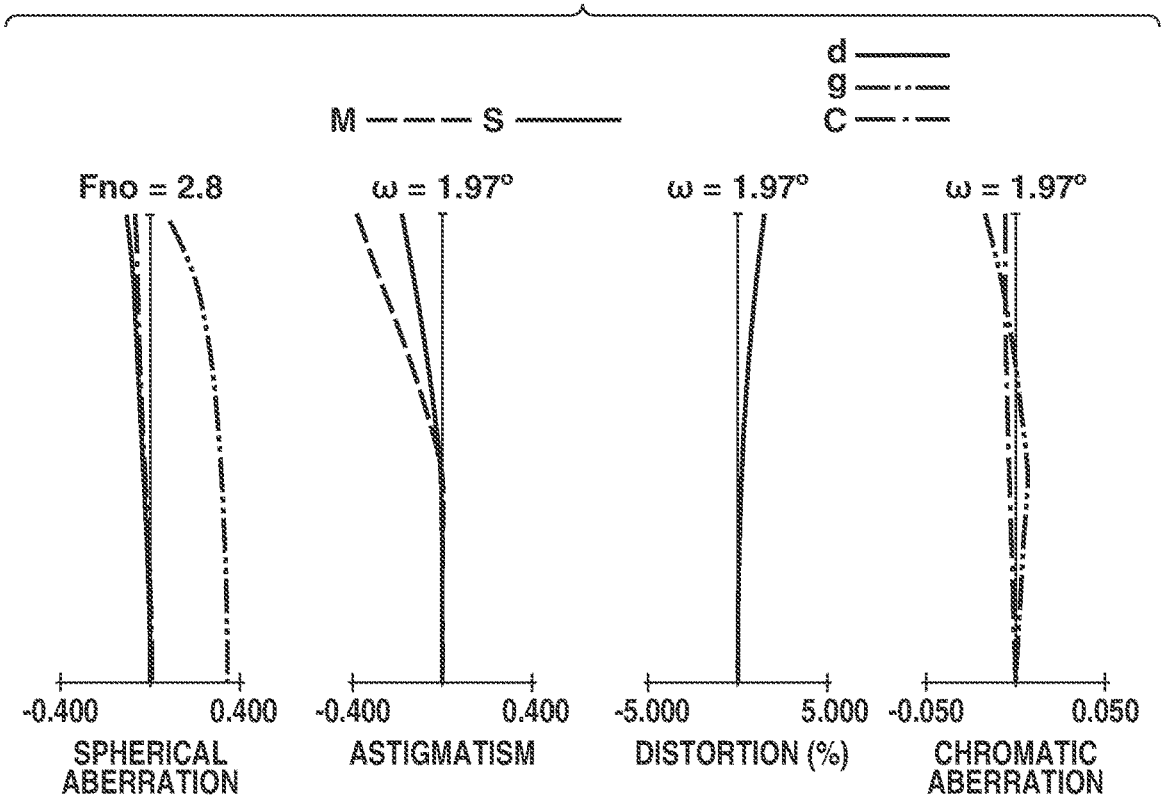

FIGS. 4A and 4B are aberration diagrams of the zoom lens in a state of being set at the wide-angle end and at focusing on infinite distance and in a state of being set at the telephoto end and at focusing on infinite distance, respectively, according to the second exemplary embodiment (numerical example 2).

The first lens unit includes six lenses, and a positive lens located fifth from the object side and a positive lens located sixth from the object side (second subunit U12) move from the image side to the object side for focusing from infinite distance to minimum distance (focusing from an infinite object distance to a minimum object distance). The lenses located fifth and sixth from the object side can be configured to move integrally with each other. Moreover, the lens located sixth from the object side can be configured to move independently of the lens located fifth from the object side.

In the first lens unit, lenses located first to fourth from the object side (first subunit U11) do not move for focusing. Furthermore, each of lenses located first and second from the object side is a negative lens. Each of the lenses located first and second from the object side (negative lens) satisfies the above-mentioned inequalities (1) to (3) and (5).

The first lens unit includes four or more lenses, and, here, includes six lenses. A positive lens the Abbe number based on d-line of which becomes maximum among the positive lenses included in the first lens unit is a lens located fourth from the object side. A negative lens the absolute value of refractive power of which is largest in the first lens unit is a lens located second from the object side. A lens unit the absolute value of refractive power of which is largest among negative lens units which move in variation of magnification is the third lens unit U3.

Figure 5:
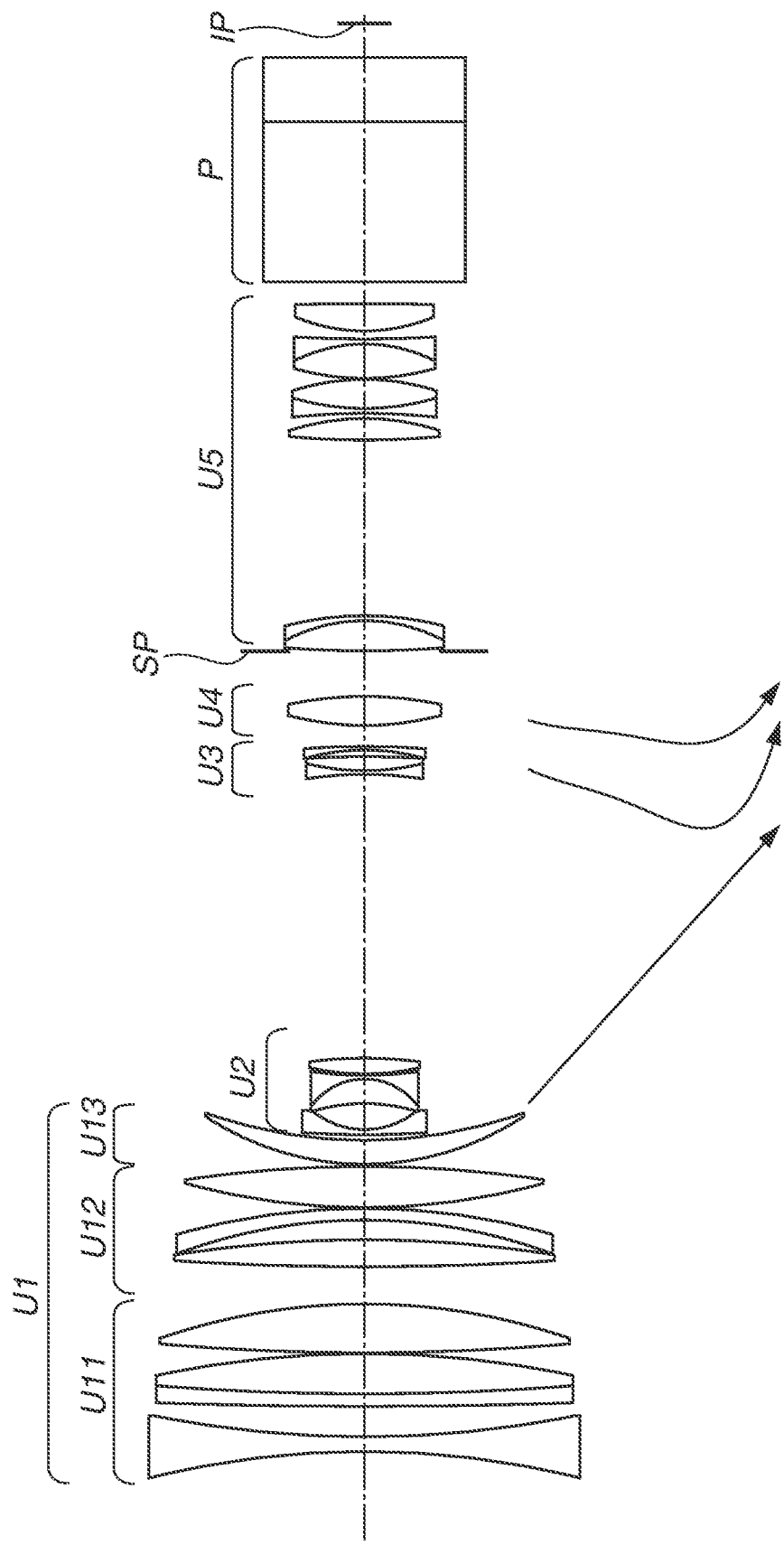
FIG. 5 is a diagram illustrating a cross-section of a zoom lens in a state of being set at the wide-angle end and at focusing on infinite distance according to a third exemplary embodiment (numerical example 3).

FIG. 5 is a diagram illustrating a cross-section of a zoom lens in a state of being set at the wide-angle end and at focusing on infinite distance according to a third exemplary embodiment (corresponding to a numerical example 3 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fifth lens unit (U5) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 6A:
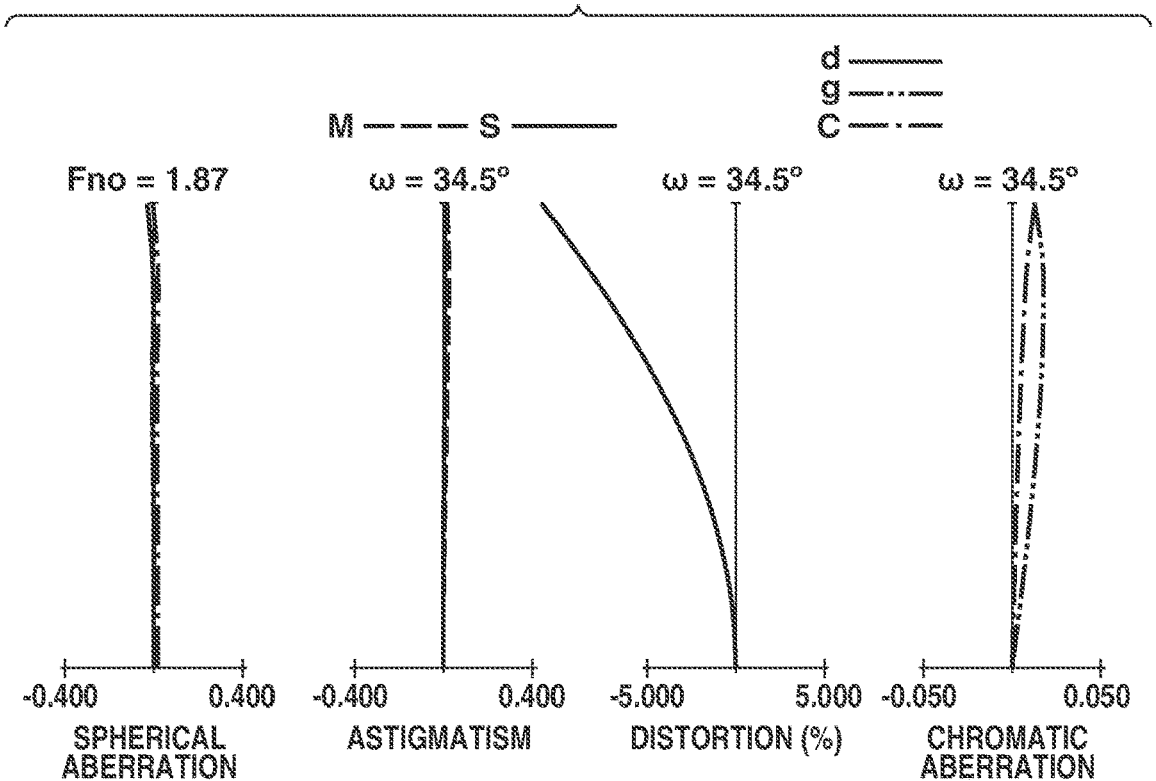
FIGS. 6A and 6B are aberration diagrams of the zoom lens in a state of being set at the wide-angle end and at focusing on infinite distance and in a state of being set at the telephoto end and at focusing on infinite distance, respectively, according to the third exemplary embodiment (numerical example 3).
Figure 6B:
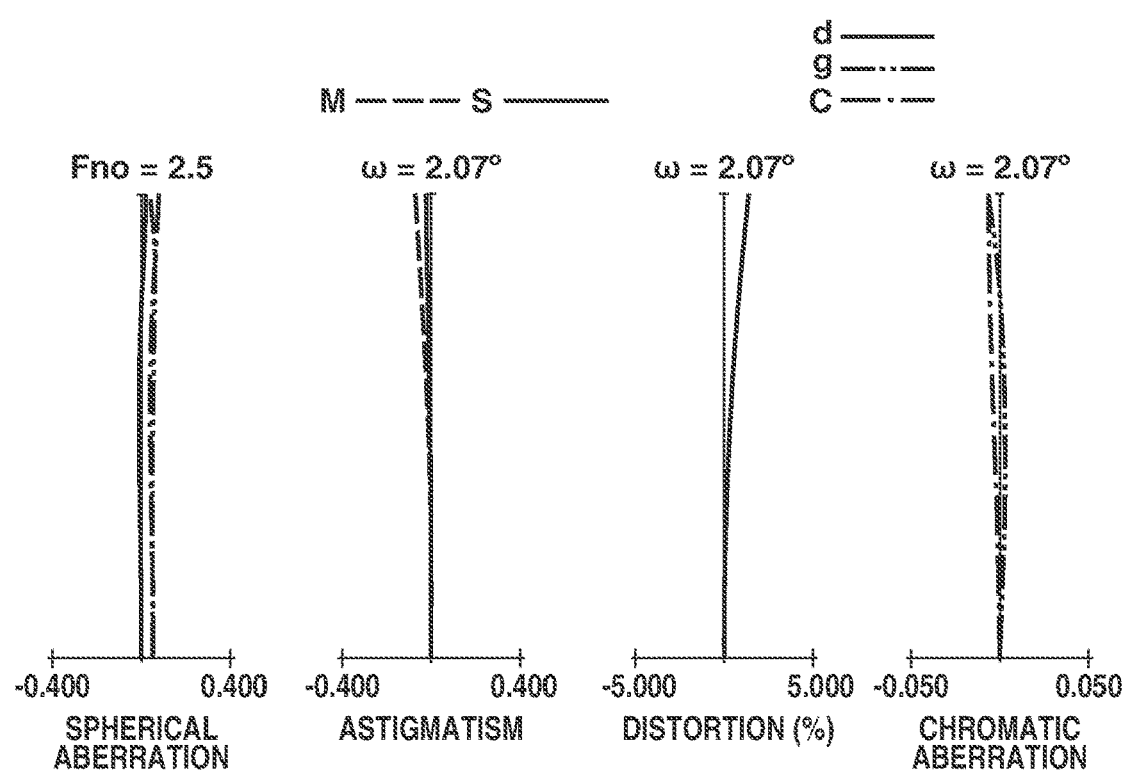

FIGS. 6A and 6B are aberration diagrams of the zoom lens in a state of being set at the wide-angle end and at focusing on infinite distance and in a state of being set at the telephoto end and at focusing on infinite distance, respectively, according to the third exemplary embodiment (numerical example 3).

The first lens unit includes eight lenses, and lenses located fifth to eighth from the object side (second subunits U12 and U13) move from the image side to the object side for focusing from infinite distance to minimum distance.

The lenses located fifth to eighth from the object side can be configured to move integrally with each other. Moreover, the lens located eighth from the object side (subunit U13) can be configured to move independently of the lenses located fifth to seventh from the object side (subunit U12).

In the first lens unit, lenses located first to fourth from the object side (first subunit U11) do not move for focusing. Furthermore, each of lenses located first and second from the object side is a negative lens. Each of the lenses located first and second from the object side (negative lens) satisfies the above-mentioned inequalities (1) to (3) and (5). Moreover, in the first lens unit, the lens located sixth from the object side is a negative lens. The lens located sixth from the object side (negative lens) satisfies the above-mentioned inequalities (1) to (3) and (5).

The first lens unit includes four or more lenses, and, here, includes eight lenses. A positive lens the Abbe number based on d-line of which becomes maximum among the positive lenses included in the first lens unit is a lens located fourth from the object side. A negative lens the absolute value of refractive power of which is largest in the first lens unit is a lens located on the most object side. A lens unit the absolute value of refractive power of which is largest among negative lens units which move in variation of magnification is the second lens unit U2.

FIG. 7 is a diagram illustrating a cross-section of a zoom lens in a state of being set at the wide-angle end and at focusing on infinite distance according to a fourth exemplary embodiment (corresponding to a numerical example 4 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, IP denotes an image plane of the zoom lens, at which the imaging surface (light receiving surface) of an image sensor (image pickup element; photoelectric conversion element) can be located.

Figure 8A:
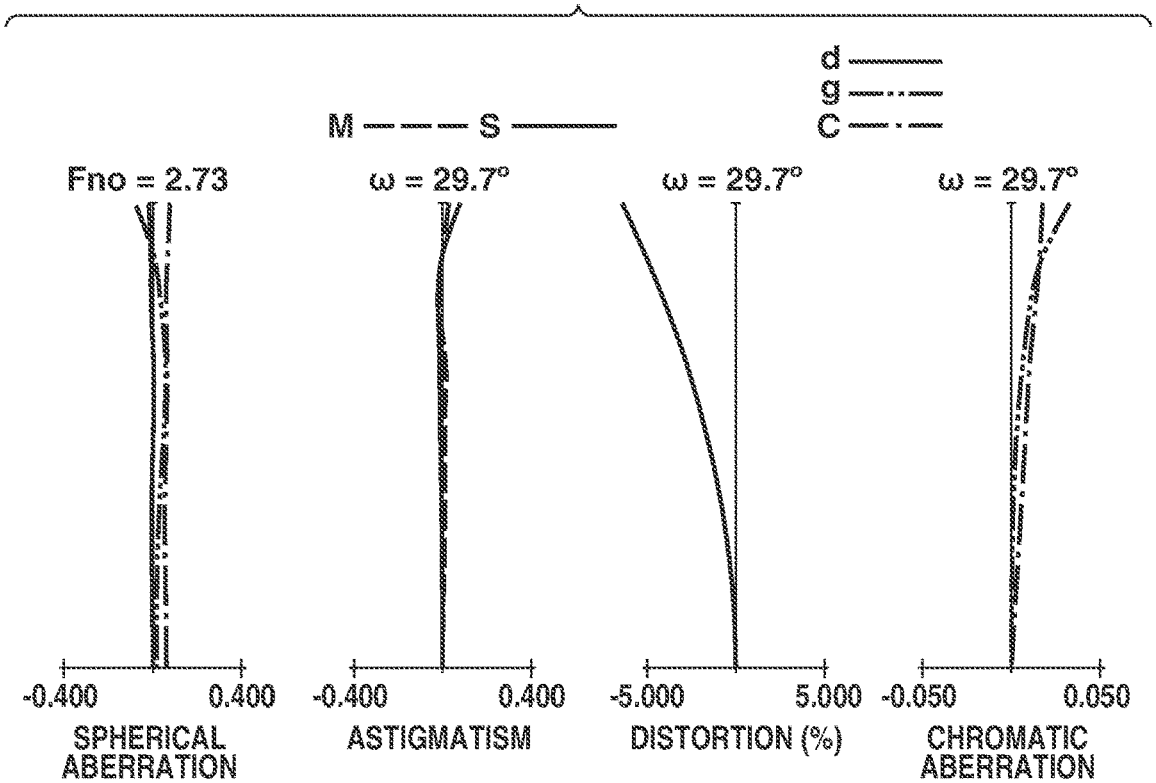
FIGS. 8A and 8B are aberration diagrams of the zoom lens in a state of being set at the wide-angle end and at focusing on infinite distance and in a state of being set at the telephoto end and at focusing on infinite distance, respectively, according to the fourth exemplary embodiment (numerical example 4).
Figure 8B:
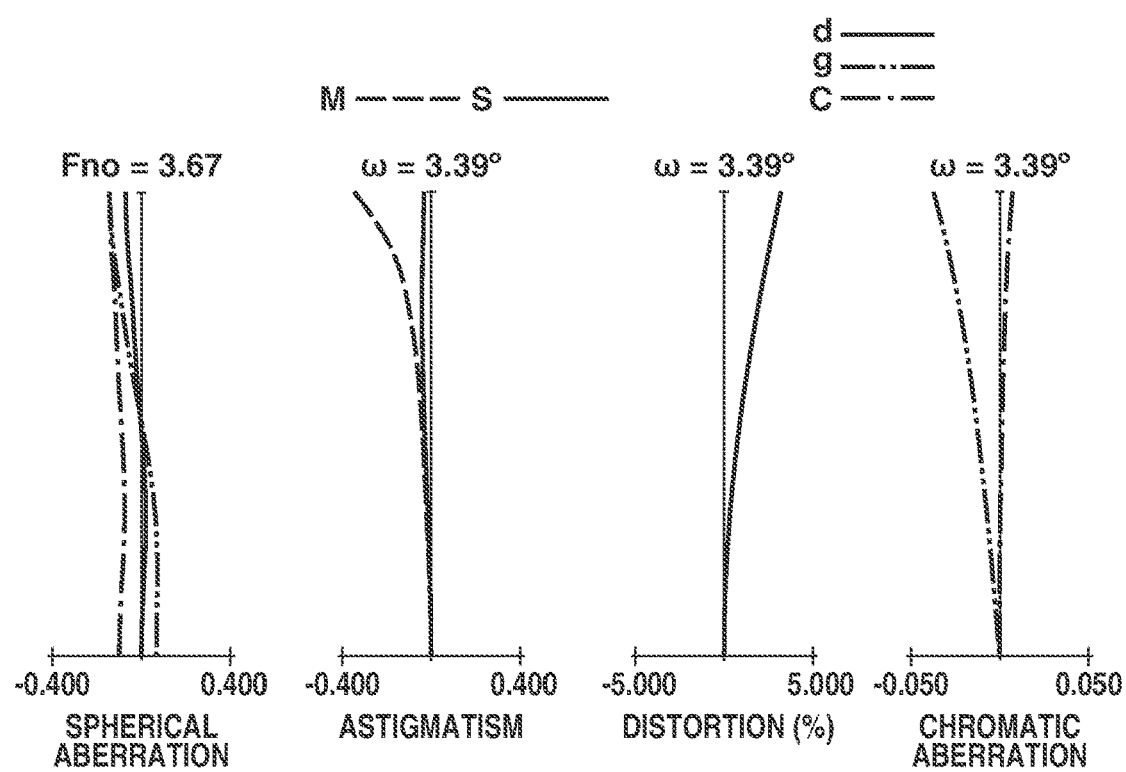

FIGS. 8A and 8B are aberration diagrams of the zoom lens in a state of being set at the wide-angle end and at focusing on infinite distance and in a state of being set at the telephoto end and at focusing on infinite distance, respectively, according to the fourth exemplary embodiment (numerical example 4).

The first lens unit includes seven lenses, and lenses located sixth and seventh from the object side (subunit U14: also referred to as a second subunit which does not include a first subunit) move from the image side to the object side for focusing from infinite distance to minimum distance. Moreover, a lens located third from the object side (subunit U12: also referred to as a second subunit which does not include a first subunit U11 and a subunit U14) move from the object side to the image side for focusing from infinite distance to minimum distance.

In the first lens unit, lenses located first and second from the object side (first subunit U11) and lenses located fourth and fifth from the object side (subunit U13) do not move for focusing. Furthermore, the lens located first from the object side is a negative lens. The negative lens satisfies the above-mentioned inequalities (1) to (3) and (5). Moreover, in the first lens unit, the lens located fourth from the object side is a negative lens. The lens located fourth from the object side (negative lens) satisfies the above-mentioned inequalities (1) to (3) and (5). Moreover, a lens (fourth lens) located first from the object side in the third subunit in the first lens unit, which is located closer to the image side than the second subunit (third lens), which moves toward the image side for focusing in the first lens unit, is a negative lens. The lens located first from the object side in the third subunit (negative lens: fourth lens) satisfies the above-mentioned inequalities (1) to (3) and (5).

The first lens unit includes four or more lenses, and, here, includes seven lenses. A positive lens the Abbe number based on d-line of which becomes maximum among the positive lenses included in the first lens unit is a lens located sixth from the object side.

A negative lens the absolute value of refractive power of which is largest in the first lens unit is a lens located on the most object side. A lens unit the absolute value of refractive power of which is largest among negative lens units which move in variation of magnification is the second lens unit U2.

FIG. 9 is a diagram illustrating a cross-section of a zoom lens in a state of being set at the wide-angle end and at focusing on infinite distance according to a fifth exemplary embodiment (corresponding to a numerical example 5 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 10A:
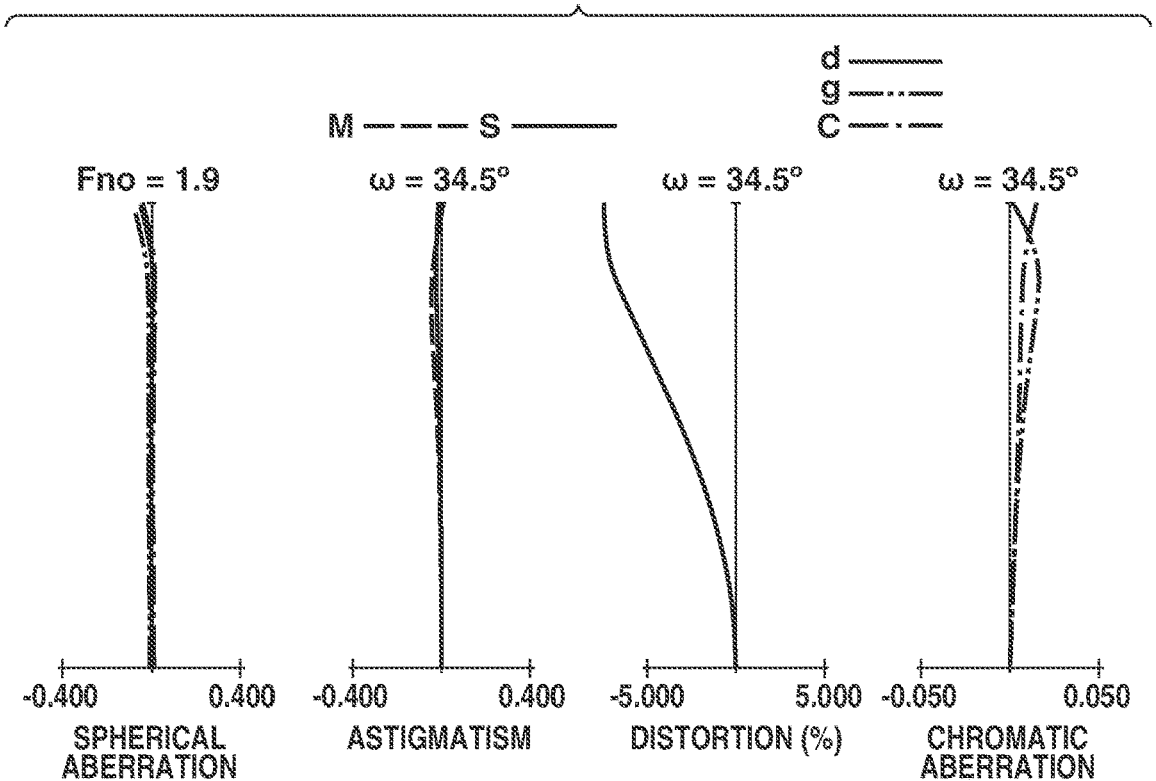
FIGS. 10A and 10B are aberration diagrams of the zoom lens in a state of being set at the wide-angle end and at focusing on infinite distance and in a state of being set at the telephoto end and at focusing on infinite distance, respectively, according to the fifth exemplary embodiment (numerical example 5).
Figure 10B:
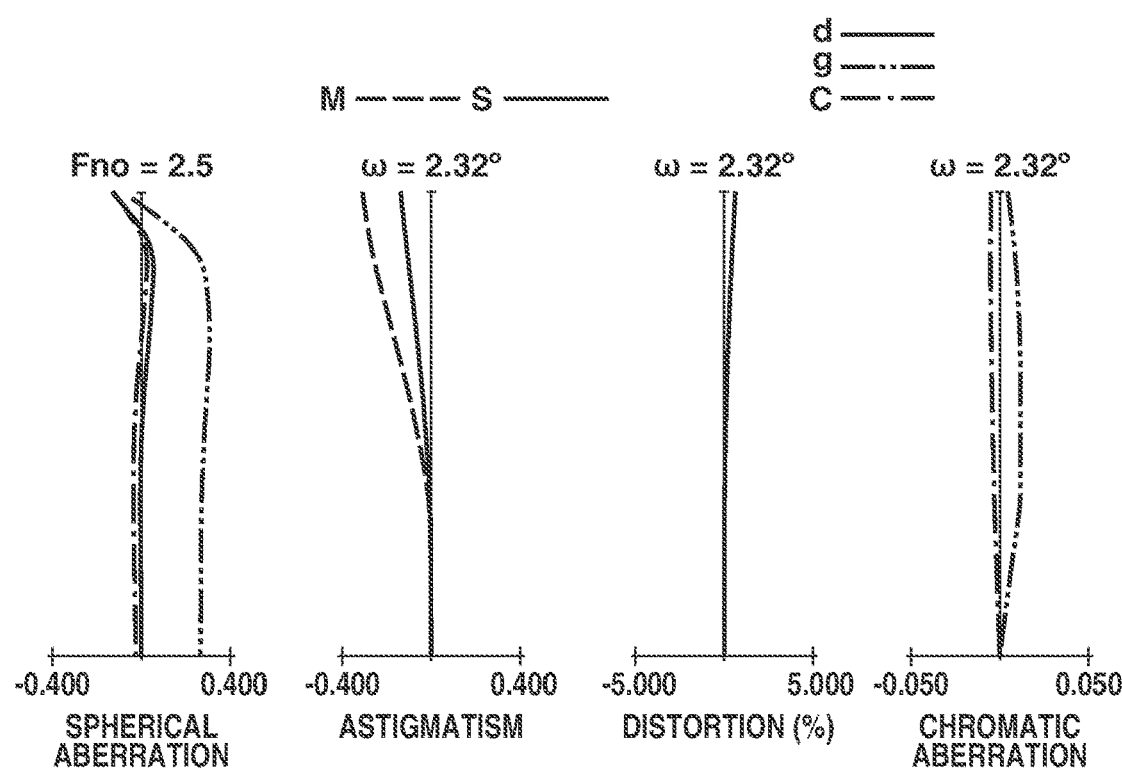

FIGS. 10A and 10B are aberration diagrams of the zoom lens in a state of being set at the wide-angle end and at focusing on infinite distance and in a state of being set at the telephoto end and at focusing on infinite distance, respectively, according to the fifth exemplary embodiment (numerical example 5).

The first lens unit includes four lenses, and lenses located third and fourth from the object side (second subunit U12) move from the image side to the object side for focusing from infinite distance to minimum distance.

In the first lens unit, lenses located first and second from the object side (first subunit U11) do not move for focusing. Furthermore, the lens located first from the object side is a negative lens. The negative lens satisfies the above-mentioned inequalities (1) to (3) and (5).

The first lens unit includes four or more lenses, and, here, includes four lenses. A positive lens the Abbe number based on d-line of which becomes maximum among the positive lenses included in the first lens unit is a lens located second from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 11:
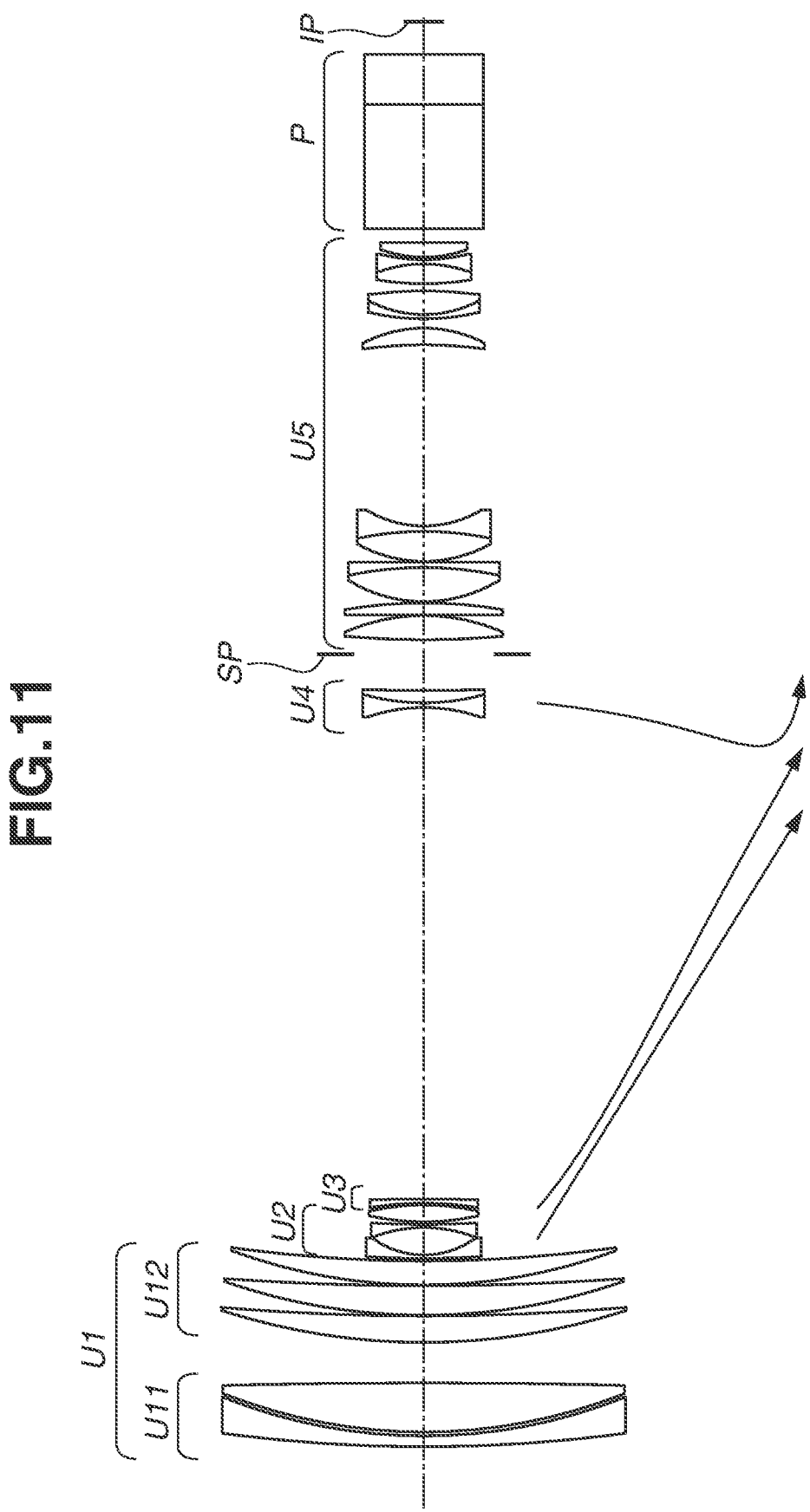
FIG. 11 is a diagram illustrating a cross-section of a zoom lens in a state of being set at the wide-angle end and at focusing on infinite distance according to a sixth exemplary embodiment (numerical example 6).

FIG. 11 is a diagram illustrating a cross-section of a zoom lens in a state of being set at the wide-angle end and at focusing on infinite distance according to a sixth exemplary embodiment (corresponding to a numerical example 6 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has negative refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fifth lens unit (U4) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 12A:
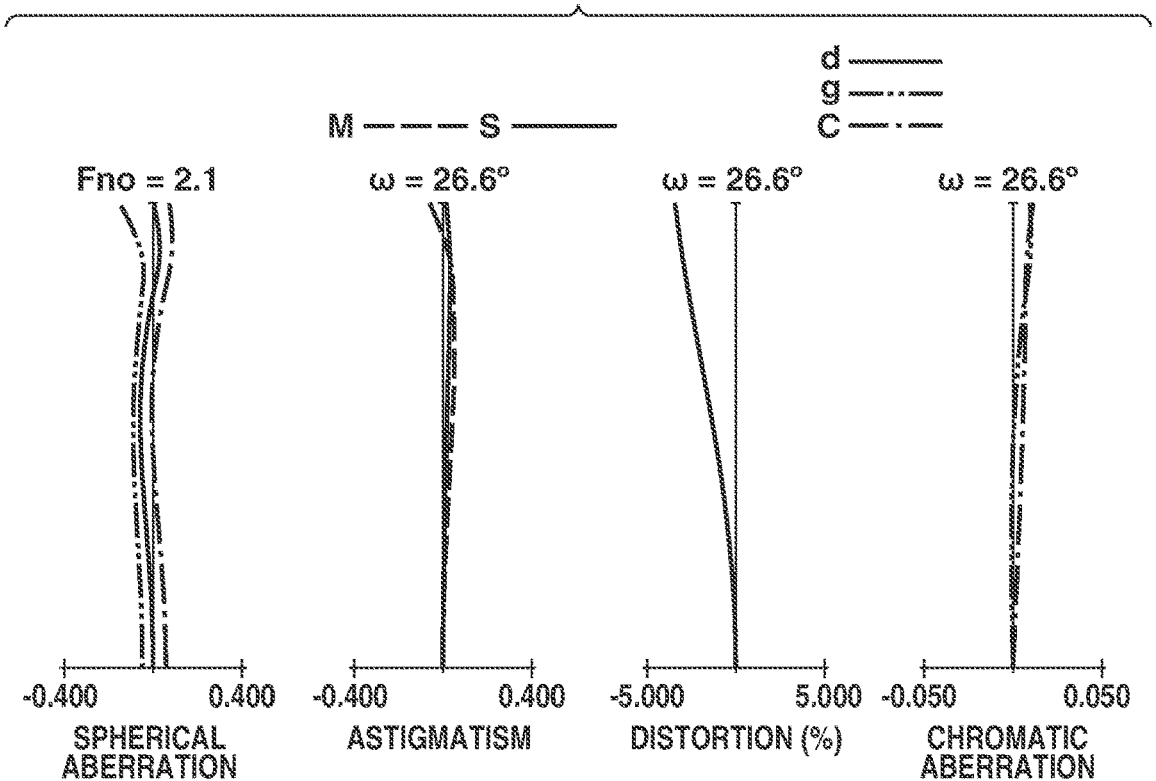
FIGS. 12A and 12B are aberration diagrams of the zoom lens in a state of being set at the wide-angle end and at focusing on infinite distance and in a state of being set at the telephoto end and at focusing on infinite distance, respectively, according to the sixth exemplary embodiment (numerical example 6).
Figure 12B:
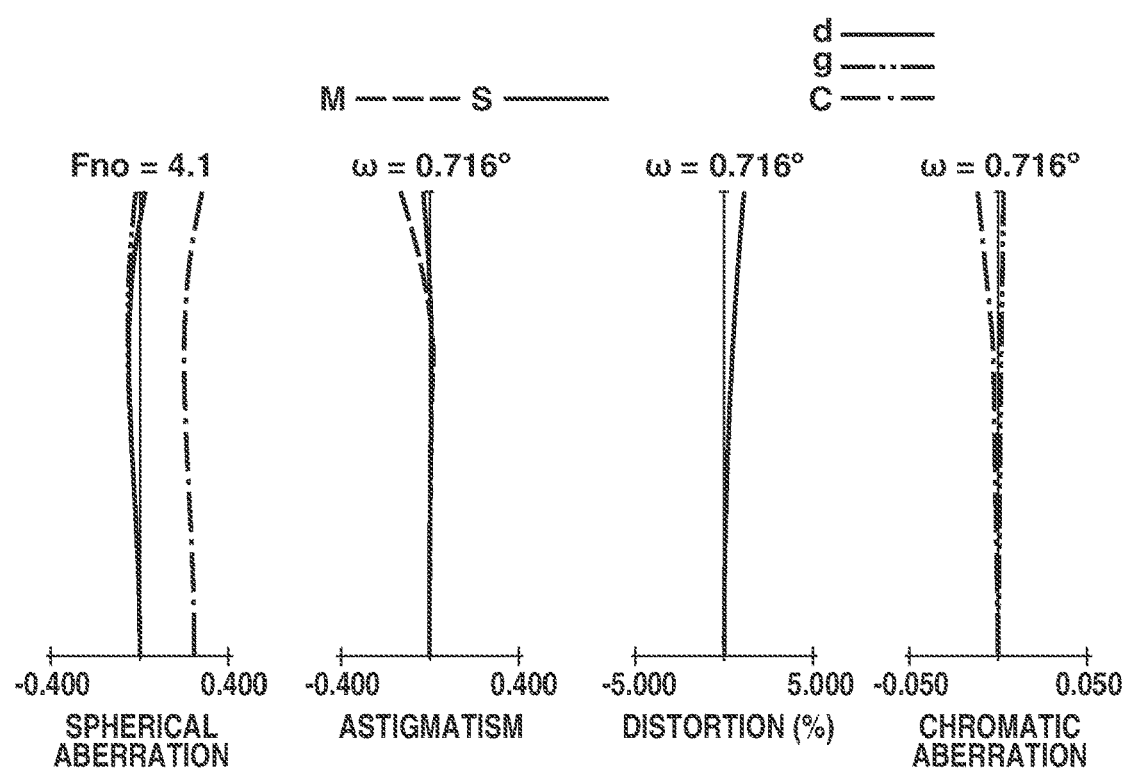

FIGS. 12A and 12B are aberration diagrams of the zoom lens in a state of being set at the wide-angle end and at focusing on infinite distance and in a state of being set at the telephoto end and at focusing on infinite distance, respectively, according to the sixth exemplary embodiment (numerical example 6).

The first lens unit includes five lenses, and lenses located third to fifth from the object side (second subunit U12) move from the image side to the object side for focusing from infinite distance to minimum distance. The lenses located third and fifth from the object side can be configured to move integrally with each other. Moreover, the lens located fifth from the object side can be configured to move independently of the lenses located third and fourth from the object side.

In the first lens unit, lenses located first and second from the object side (first subunit U11) do not move for focusing. Furthermore, the lens located first from the object side is a negative lens. The negative lens satisfies the above-mentioned inequalities (1) to (3) and (5).

The first lens unit includes four or more lenses, and, here, includes five lenses. A positive lens the Abbe number based on d-line of which becomes maximum among the positive lenses included in the first lens unit is a lens located second from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 13:
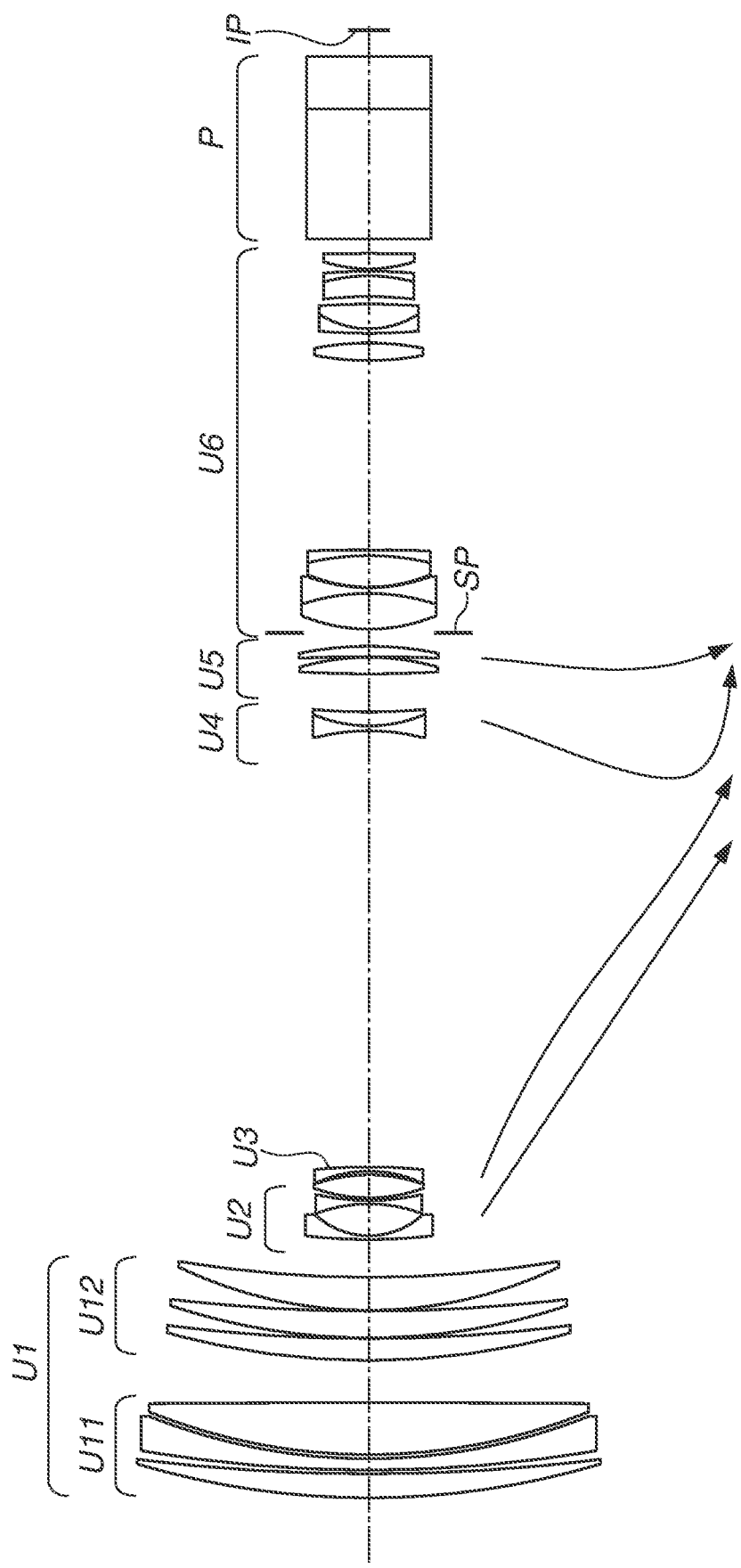
FIG. 13 is a diagram illustrating a cross-section of a zoom lens in a state of being set at the wide-angle end and at focusing on infinite distance according to a seventh exemplary embodiment (numerical example 7).

FIG. 13 is a diagram illustrating a cross-section of a zoom lens in a state of being set at the wide-angle end and at focusing on infinite distance according to a seventh exemplary embodiment (corresponding to a numerical example 7 described below). The zoom lens includes, in order from an object side to an image side, first to sixth lens units.

The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has negative refractive power and moves in variation of magnification. The fifth lens unit (U5) has positive refractive power and moves in variation of magnification. The sixth lens unit (U6) has positive refractive power, serves to form an image, and does not move for variation of magnification. Furthermore, the second lens unit moves toward the image side in variation of magnification from the wide-angle end to the telephoto end. Moreover, the sixth lens unit (U6) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 14A:
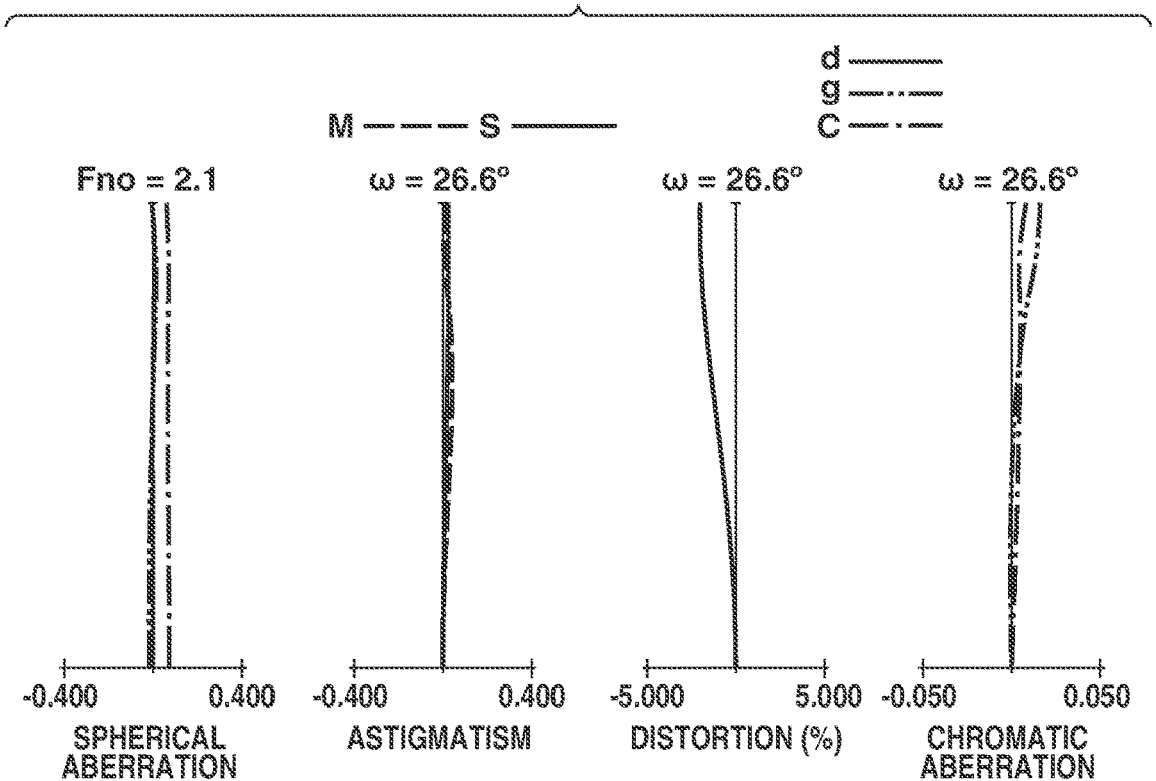
FIGS. 14A and 14B are aberration diagrams of the zoom lens in a state of being set at the wide-angle end and at focusing on infinite distance and in a state of being set at the telephoto end and at focusing on infinite distance, respectively, according to the seventh exemplary embodiment (numerical example 7).
Figure 14B:
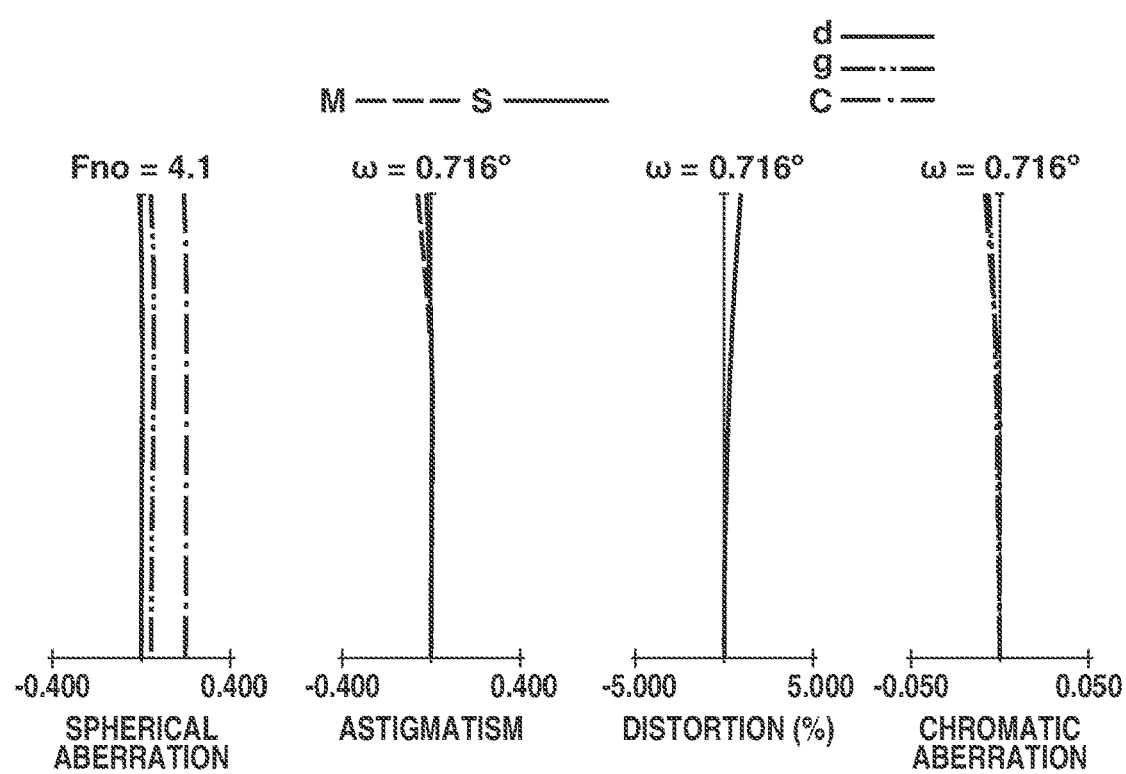

FIGS. 14A and 14B are aberration diagrams of the zoom lens in a state of being set at the wide-angle end and at focusing on infinite distance and in a state of being set at the telephoto end and at focusing on infinite distance, respectively, according to the seventh exemplary embodiment (numerical example 7).

The first lens unit includes six lenses, and lenses located fourth to sixth from the object side (second subunit U12) move from the image side to the object side for focusing from infinite distance to minimum distance. The lenses located fourth to sixth from the object side can be configured to move integrally with each other. Moreover, the lens located sixth from the object side can be configured to move independently of the lenses located fourth and fifth from the object side.

In the first lens unit, lenses located first to third from the object side (first subunit U11) do not move for focusing. Furthermore, the lens located second from the object side is a negative lens. The lens located second from the object side (negative lens) satisfies the above-mentioned inequalities (1) to (3) and (5).

The first lens unit includes four or more lenses, and, here, includes six lenses. A positive lens the Abbe number based on d-line of which becomes maximum among the positive lenses included in the first lens unit is a lens located first from the object side. A negative lens the absolute value of refractive power of which is largest in the first lens unit is a lens located second from the object side. A lens unit the absolute value of refractive power of which is largest among negative lens units which move in variation of magnification is the second lens unit U2.

Figure 15:
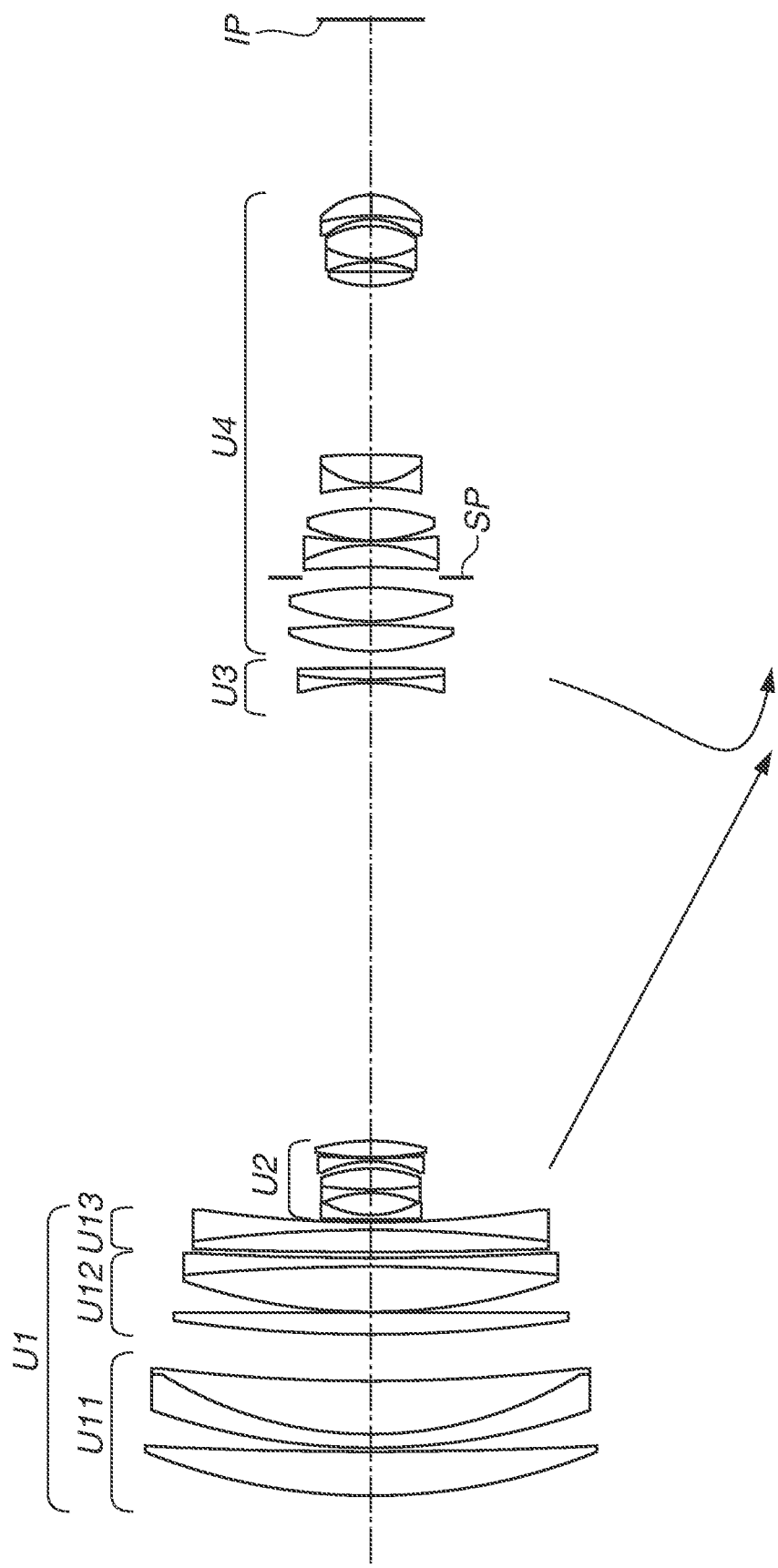
FIG. 15 is a diagram illustrating a cross-section of a zoom lens in a state of being set at the wide-angle end and at focusing on infinite distance according to an eighth exemplary embodiment (numerical example 8).

FIG. 15 is a diagram illustrating a cross-section of a zoom lens in a state of being set at the wide-angle end and at focusing on infinite distance according to an eighth exemplary embodiment (corresponding to a numerical example 8 described below). The zoom lens includes, in order from an object side to an image side, first to fourth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, IP denotes an image plane of the zoom lens, at which the imaging surface (light receiving surface) of an image sensor (image pickup element; photoelectric conversion element) can be located.

Figure 16A:
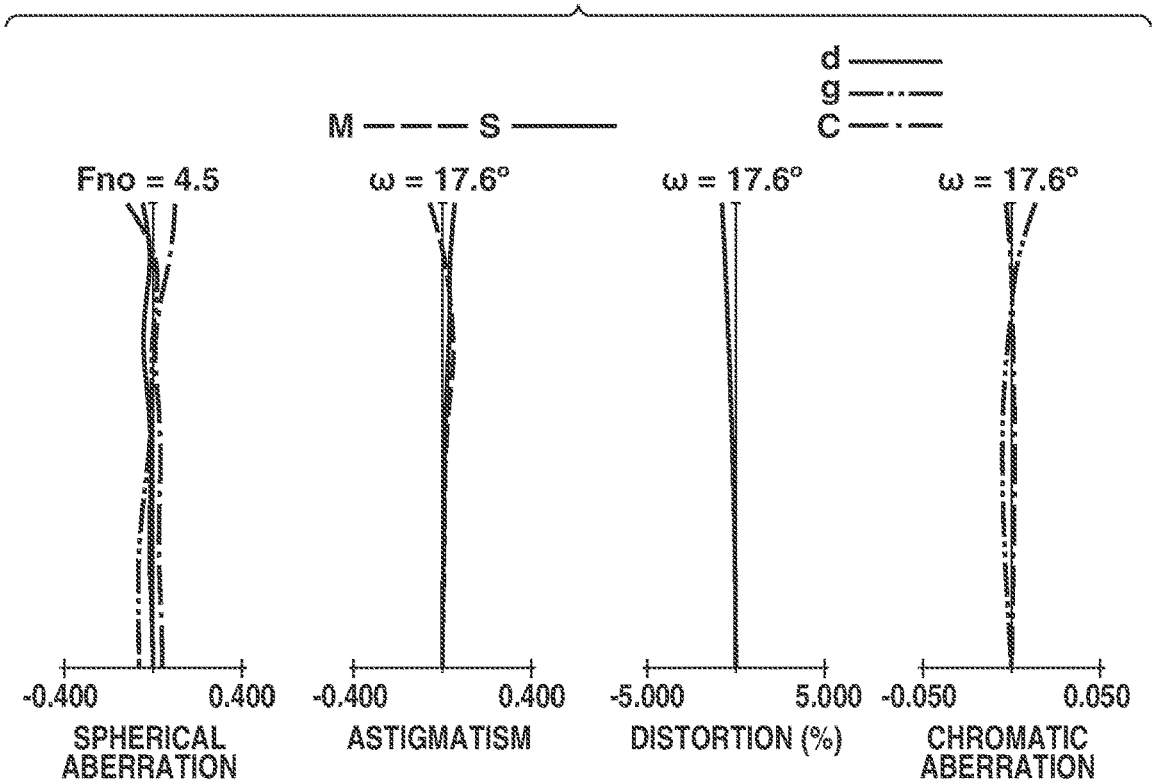
FIGS. 16A and 16B are aberration diagrams of the zoom lens in a state of being set at the wide-angle end and at focusing on infinite distance and in a state of being set at the telephoto end and at focusing on infinite distance, respectively, according to the eighth exemplary embodiment (numerical example 8).
Figure 16B:
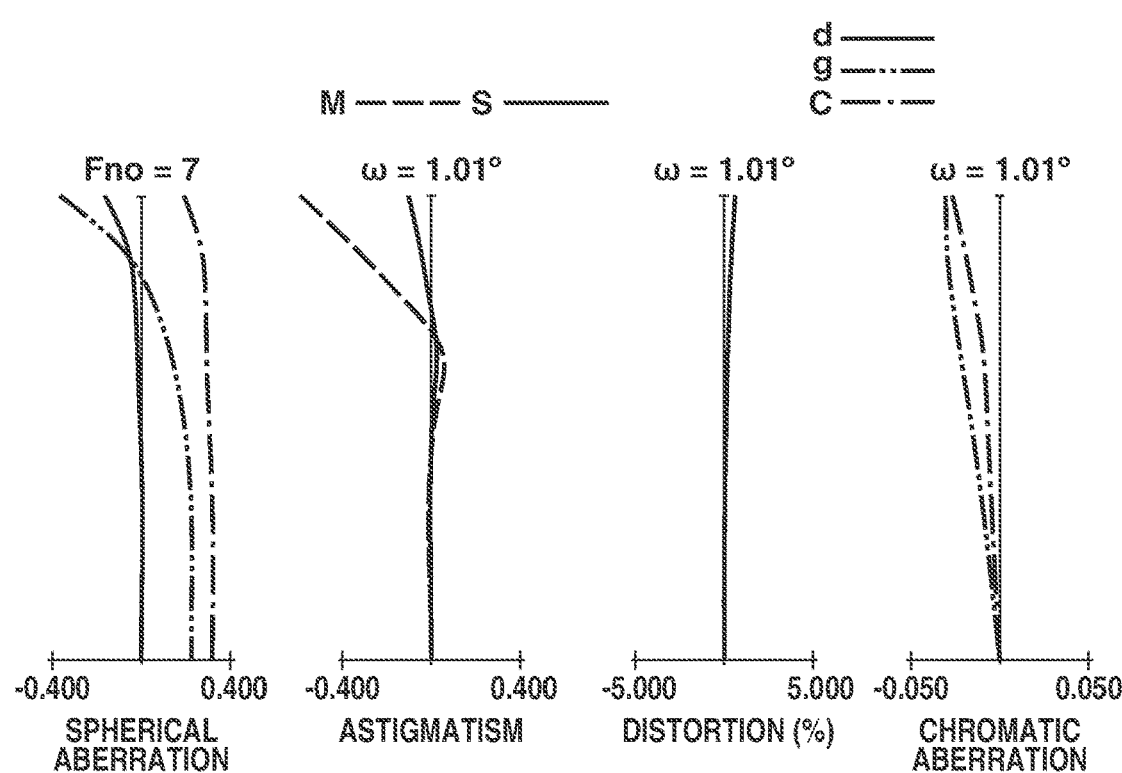

FIGS. 16A and 16B are aberration diagrams of the zoom lens in a state of being set at the wide-angle end and at focusing on infinite distance and in a state of being set at the telephoto end and at focusing on infinite distance, respectively, according to the eighth exemplary embodiment (numerical example 8).

The first lens unit includes eight lenses, and lenses located fourth to sixth from the object side (subunit U12: also referred to as a second subunit which does not include a first subunit U11) move from the image side to the object side for focusing from infinite distance to minimum distance.

In the first lens unit, lenses located first to third from the object side (first subunit U11) and lenses located seventh and eighth from the object side (subunit U13) do not move for focusing. Furthermore, the lens located second from the object side is a negative lens. The lens located second from the object side (negative lens) satisfies the above-mentioned inequalities (1) to (3) and (5). Moreover, in the first lens unit, each of lenses located sixth and eighth from the object side is also a negative lens. Each of the lenses located sixth and eighth from the object side (negative lens) satisfies the above-mentioned inequalities (1) to (3) and (5).

The first lens unit includes four or more lenses, and, here, includes eight lenses. A positive lens the Abbe number based on d-line of which becomes maximum among the positive lenses included in the first lens unit is a lens located third from the object side. A negative lens the absolute value of refractive power of which is largest in the first lens unit is a lens located eighth from the object side. A lens unit the absolute value of refractive power of which is largest among negative lens units which move in variation of magnification is the second lens unit U2.

Figure 17:
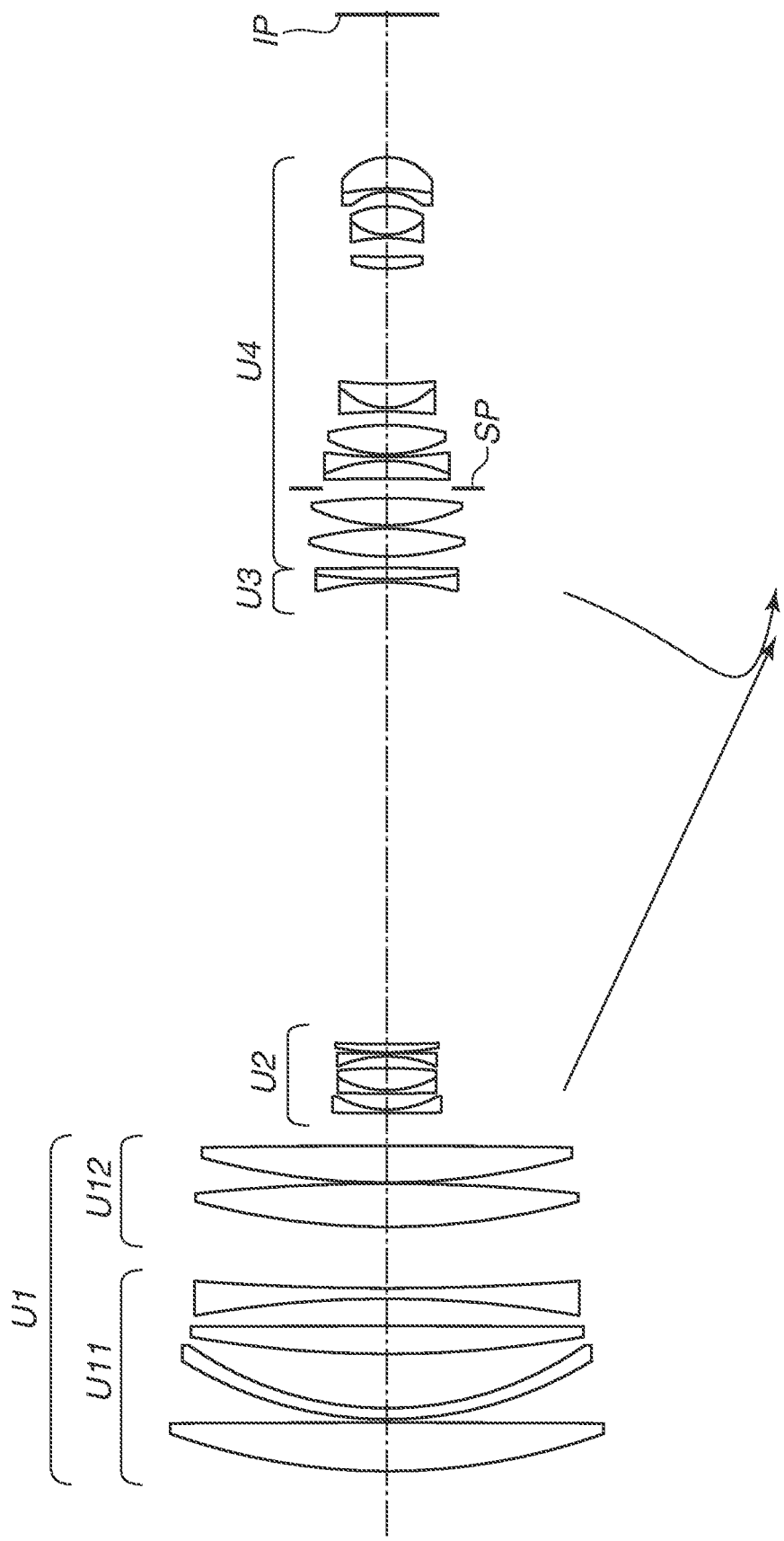
FIG. 17 is a diagram illustrating a cross-section of a zoom lens in a state of being set at the wide-angle end and at focusing on infinite distance according to a ninth exemplary embodiment (numerical example 9).

FIG. 17 is a diagram illustrating a cross-section of a zoom lens in a state of being set at the wide-angle end and at focusing on infinite distance according to a ninth exemplary embodiment (corresponding to a numerical example 9 described below). The zoom lens includes, in order from an object side to an image side, first to fourth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, IP denotes an image plane of the zoom lens, at which the imaging surface (light receiving surface) of an image sensor (image pickup element; photoelectric conversion element) can be located.

Figure 18A:
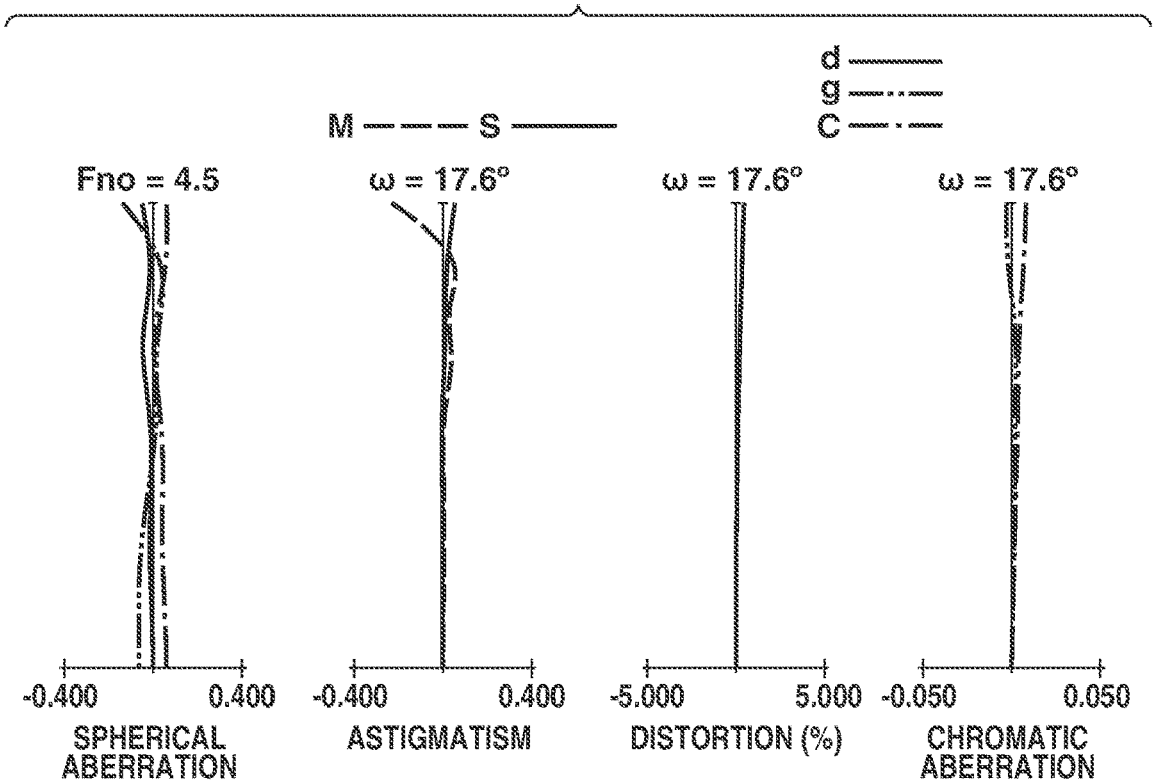
FIGS. 18A and 18B are aberration diagrams of the zoom lens in a state of being set at the wide-angle end and at focusing on infinite distance and in a state of being set at the telephoto end and at focusing on infinite distance, respectively, according to the ninth exemplary embodiment (numerical example 9).
Figure 18B:
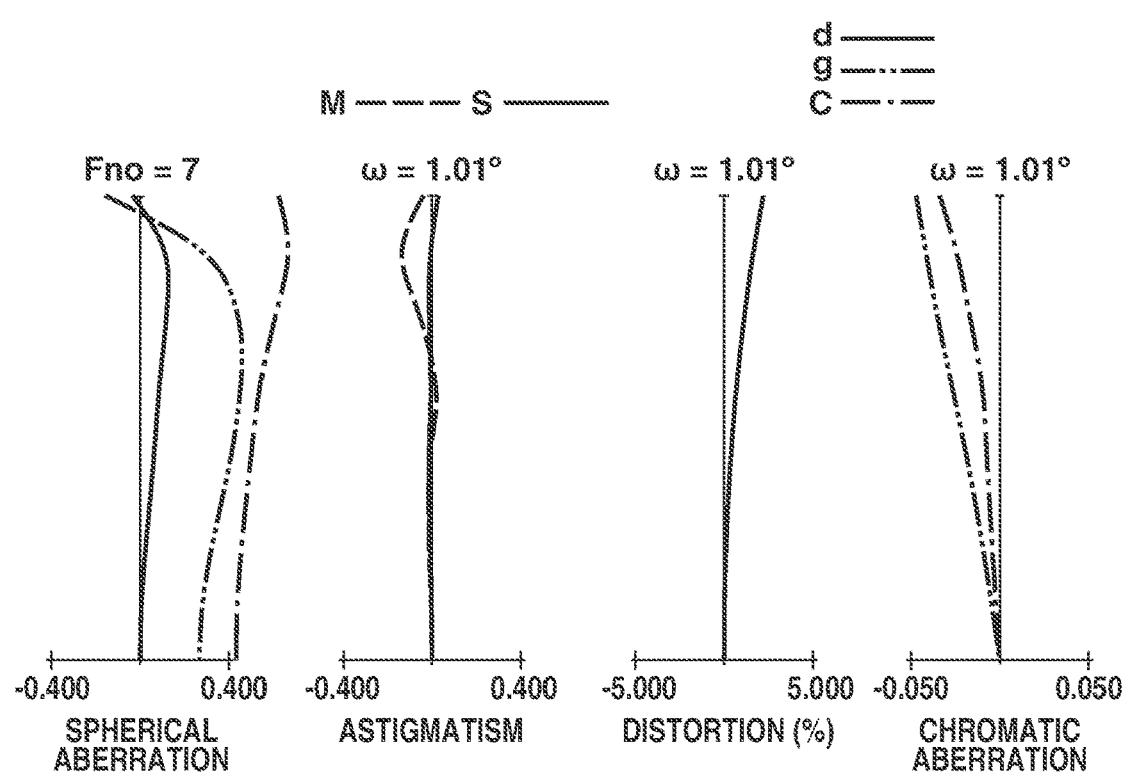

FIGS. 18A and 18B are aberration diagrams of the zoom lens in a state of being set at the wide-angle end and at focusing on infinite distance and in a state of being set at the telephoto end and at focusing on infinite distance, respectively, according to the ninth exemplary embodiment (numerical example 9).

The first lens unit includes six lenses, and lenses located fifth and sixth from the object side (second subunit U12) move from the image side to the object side for focusing from infinite distance to minimum distance.

In the first lens unit, lenses located first to fourth from the object side (first subunit U11) do not move for focusing. Furthermore, each of lenses located second and fourth from the object side is a negative lens. Each of the lenses located second and fourth from the object side (negative lens) satisfies the above-mentioned inequalities (1) to (3) and (5).

The first lens unit includes four or more lenses, and, here, includes six lenses. A positive lens the Abbe number based on d-line of which becomes maximum among the positive lenses included in the first lens unit is a lens located third from the object side. A negative lens the absolute value of refractive power of which is largest in the first lens unit is a lens located fourth from the object side. A lens unit the absolute value of refractive power of which is largest among negative lens units which move in variation of magnification is the second lens unit U2.

Figure 19:
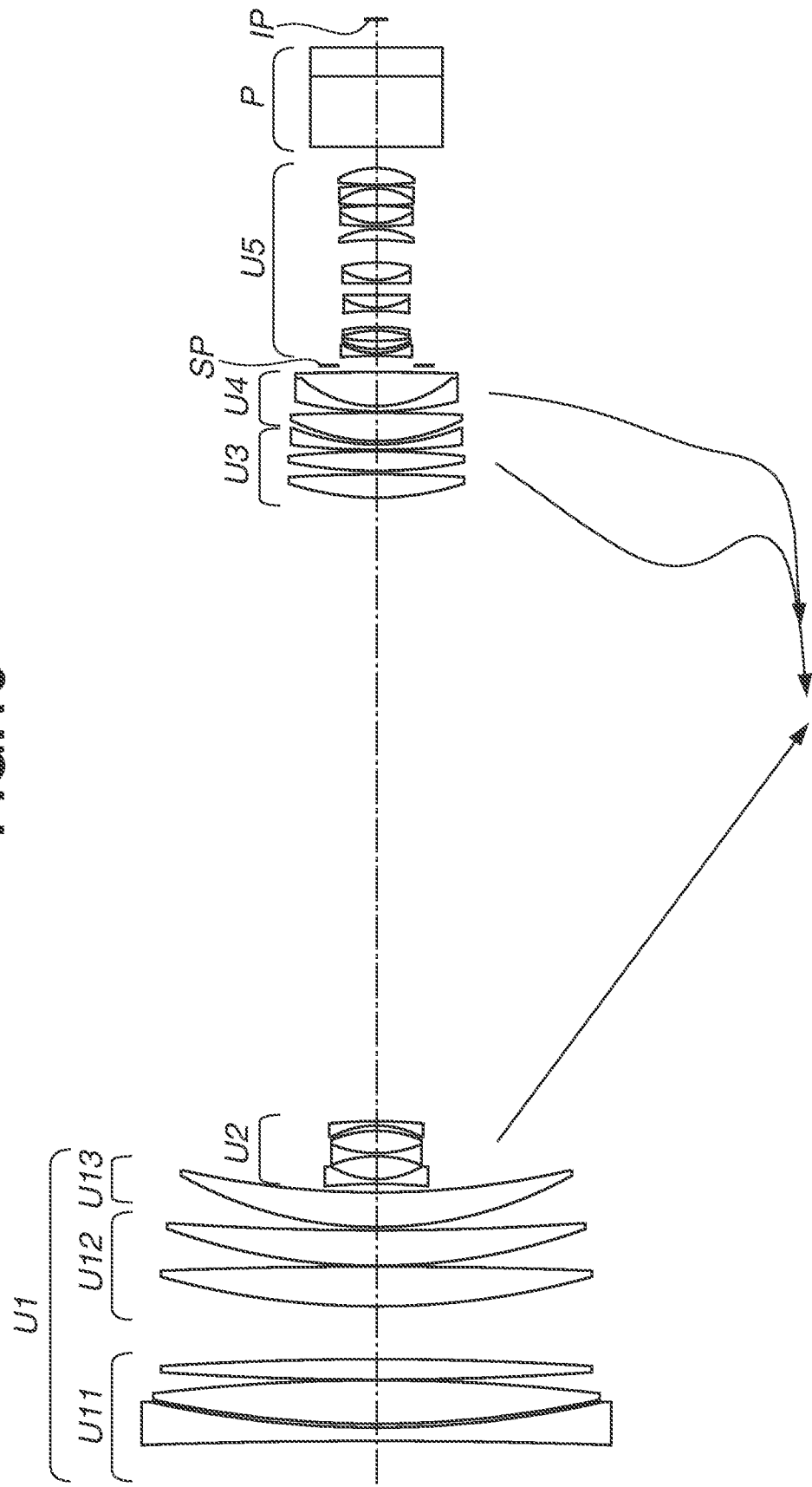
FIG. 19 is a diagram illustrating a cross-section of a zoom lens in a state of being set at the wide-angle end and at focusing on infinite distance according to a tenth exemplary embodiment (numerical example 10).

FIG. 19 is a diagram illustrating a cross-section of a zoom lens in a state of being set at the wide-angle end and at focusing on infinite distance according to a tenth exemplary embodiment (corresponding to a numerical example 10 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has positive refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fifth lens unit (U5) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 20A:
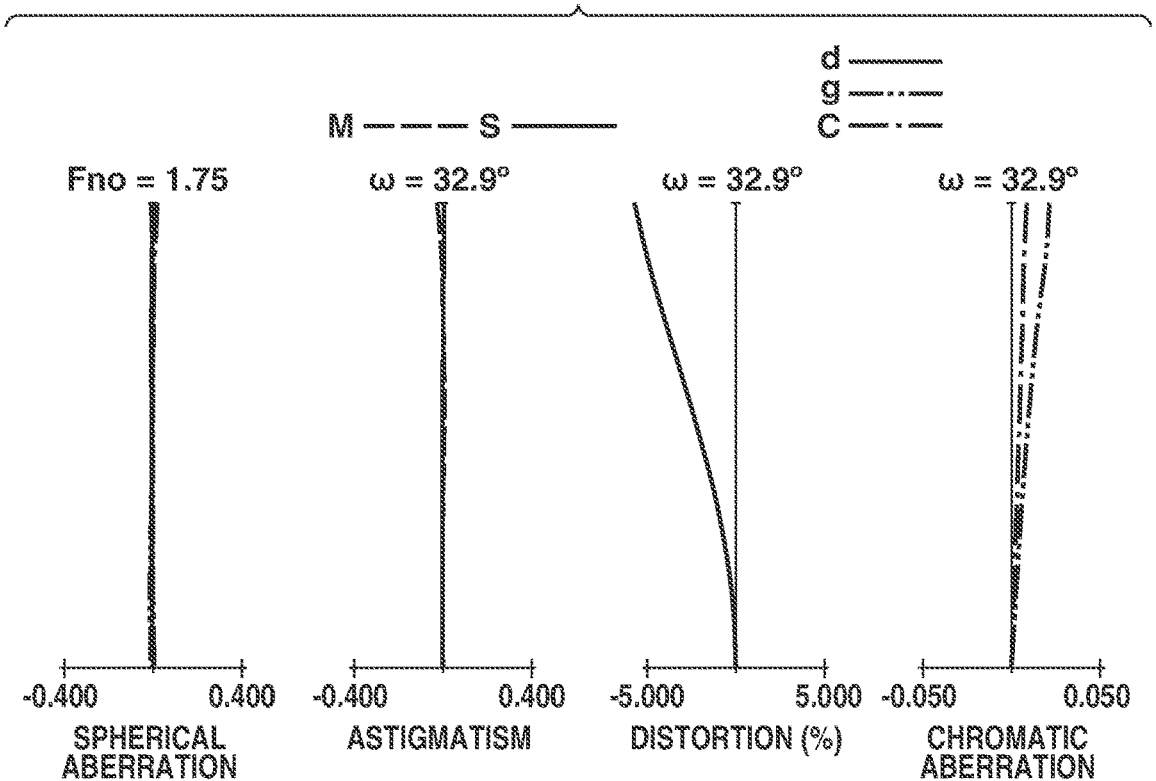
FIGS. 20A and 20B are aberration diagrams of the zoom lens in a state of being set at the wide-angle end and at focusing on infinite distance and in a state of being set at the telephoto end and at focusing on infinite distance, respectively, according to the tenth exemplary embodiment (numerical example 10).
Figure 20B:
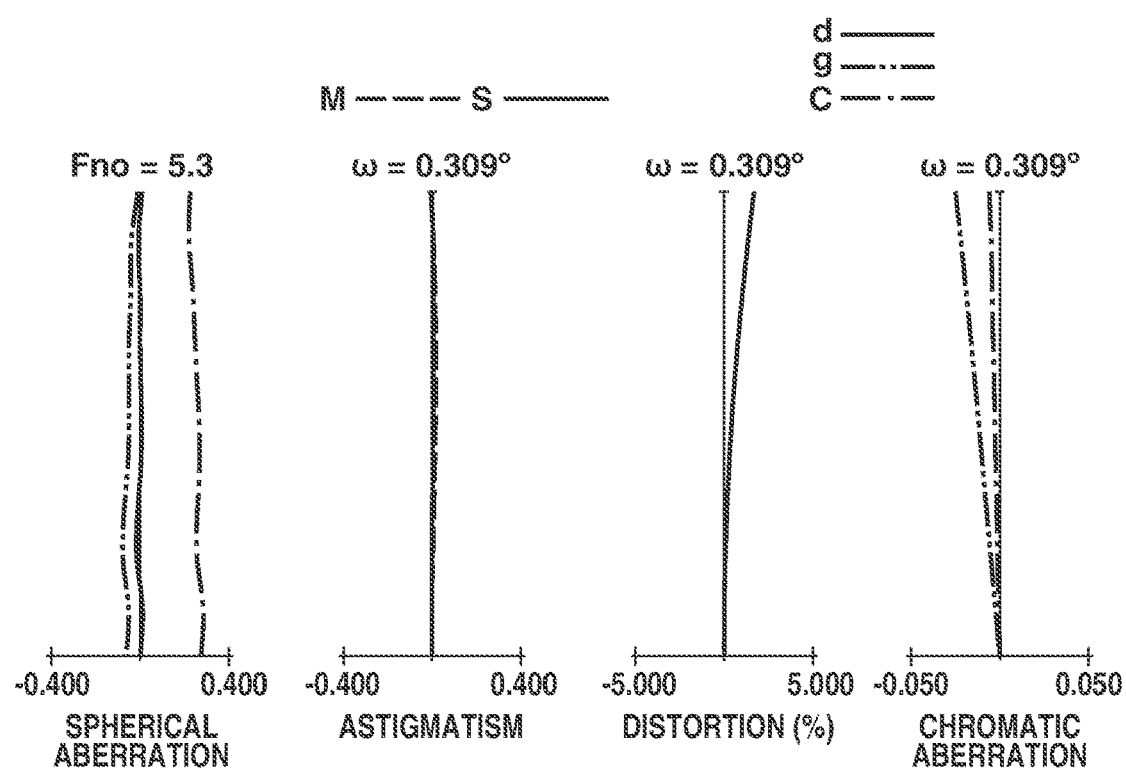

FIGS. 20A and 20B are aberration diagrams of the zoom lens in a state of being set at the wide-angle end and at focusing on infinite distance and in a state of being set at the telephoto end and at focusing on infinite distance, respectively, according to the tenth exemplary embodiment (numerical example 10).

The first lens unit includes six lenses, and lenses located fourth to sixth from the object side (second subunit U12) move from the image side to the object side for focusing from infinite distance to minimum distance. The lenses located fourth to sixth from the object side can be configured to move integrally with each other. Moreover, the lens located sixth from the object side can be configured to move independently of the lenses located fourth and fifth from the object side.

In the first lens unit, lenses located first to third from the object side (first subunit U11) do not move for focusing. Furthermore, the lens located first from the object side is a negative lens. The negative lens satisfies the above-mentioned inequalities (1) to (3) and (5).

The first lens unit includes four or more lenses, and, here, includes six lenses. A positive lens the Abbe number based on d-line of which becomes maximum among the positive lenses included in the first lens unit is a lens located second from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 21:
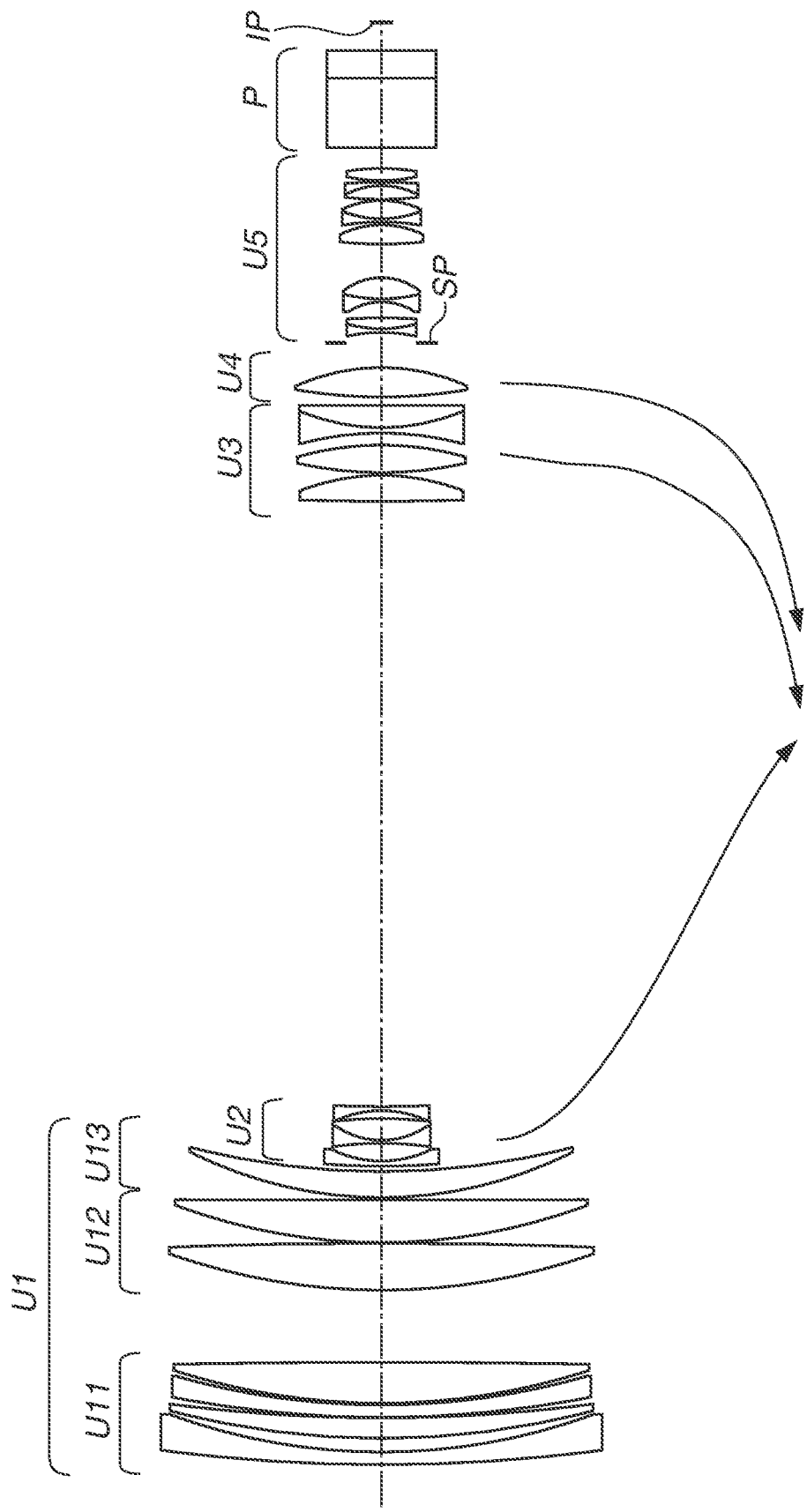
FIG. 21 is a diagram illustrating a cross-section of a zoom lens in a state of being set at the wide-angle end and at focusing on infinite distance according to an eleventh exemplary embodiment (numerical example 11).

FIG. 21 is a diagram illustrating a cross-section of a zoom lens in a state of being set at the wide-angle end and at focusing on infinite distance according to an eleventh exemplary embodiment (corresponding to a numerical example 11 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has positive refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fifth lens unit (U5) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 22A:
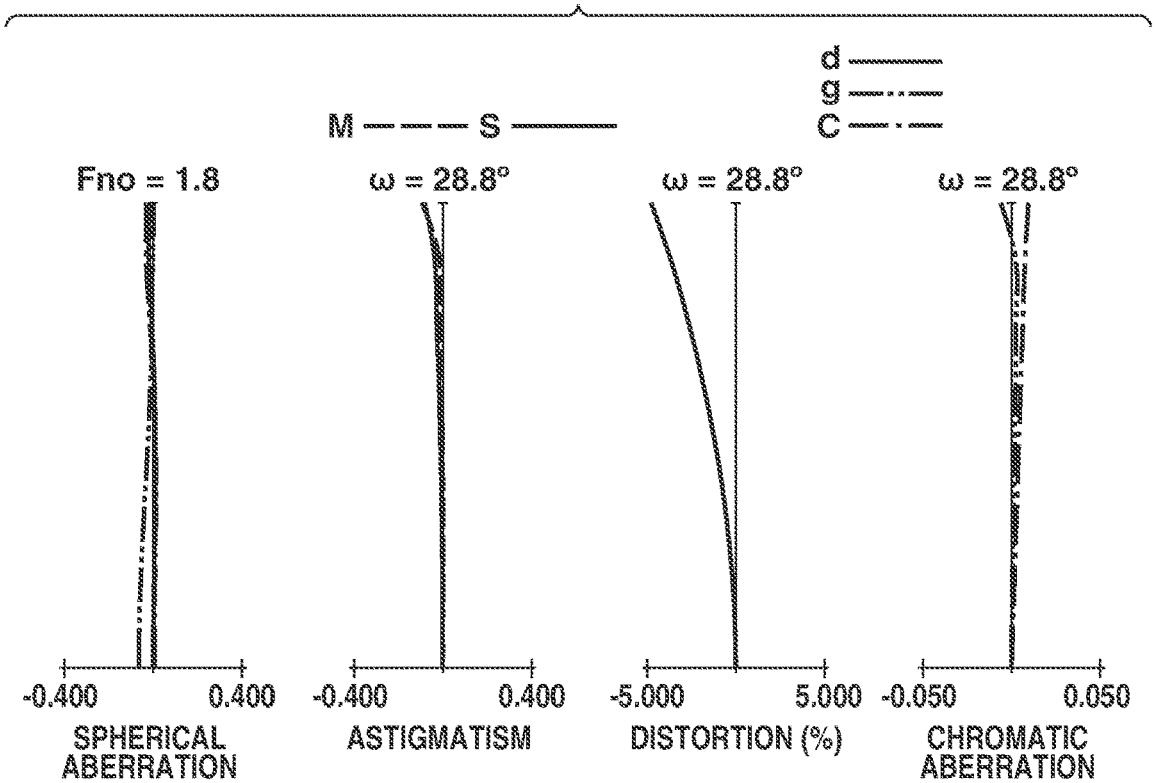
FIGS. 22A and 22B are aberration diagrams of the zoom lens in a state of being set at the wide-angle end and at focusing on infinite distance and in a state of being set at the telephoto end and at focusing on infinite distance, respectively, according to the eleventh exemplary embodiment (numerical example 11).
Figure 22B:
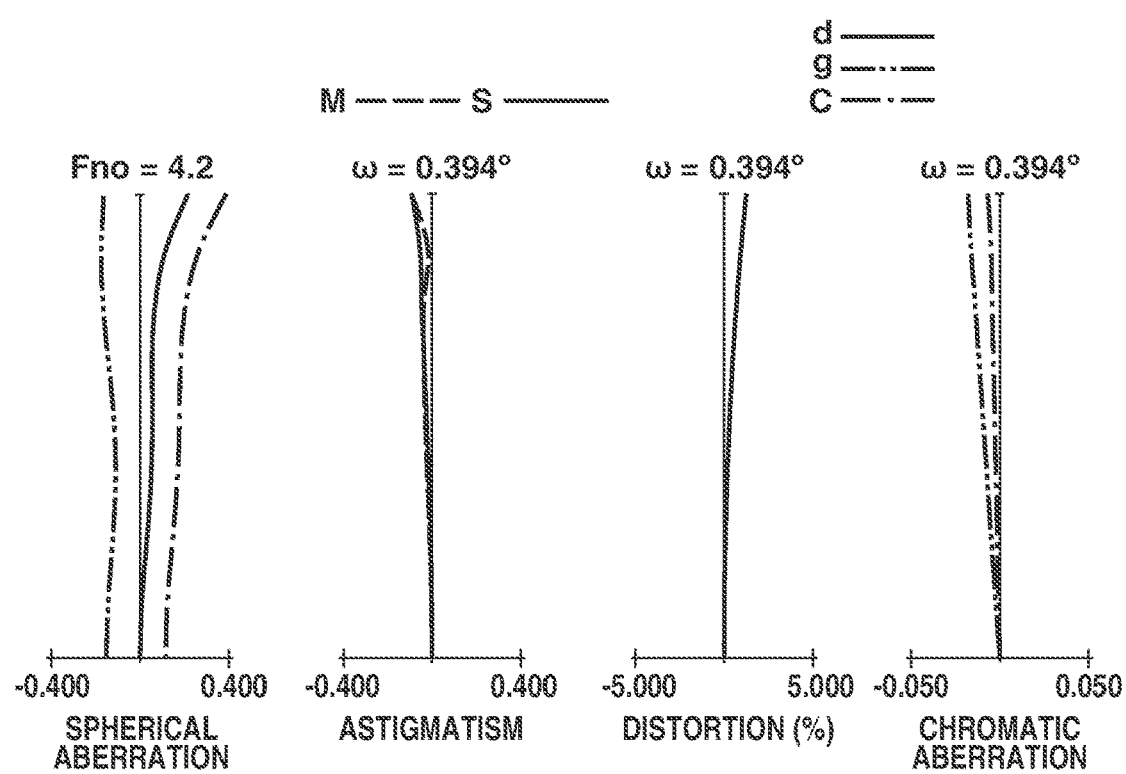

FIGS. 22A and 22B are aberration diagrams of the zoom lens in a state of being set at the wide-angle end and at focusing on infinite distance and in a state of being set at the telephoto end and at focusing on infinite distance, respectively, according to the eleventh exemplary embodiment (numerical example 11).

The first lens unit includes seven lenses, and lenses located fifth to seventh from the object side (second subunit U12) move from the image side to the object side for focusing from infinite distance to minimum distance. The lenses located fifth to seventh from the object side can be configured to move integrally with each other. Moreover, the lens located seventh from the object side can be configured to move independently of the lenses located fifth and sixth from the object side.

In the first lens unit, lenses located first to fourth from the object side (first subunit U11) do not move for focusing. Furthermore, each of lenses located first and third from the object side is a negative lens. Each of the lenses located first and third from the object side (negative lens) satisfies the above-mentioned inequalities (1) to (3) and (5).

The first lens unit includes four or more lenses, and, here, includes seven lenses. A positive lens the Abbe number based on d-line of which becomes maximum among the positive lenses included in the first lens unit is a lens located second from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 23:
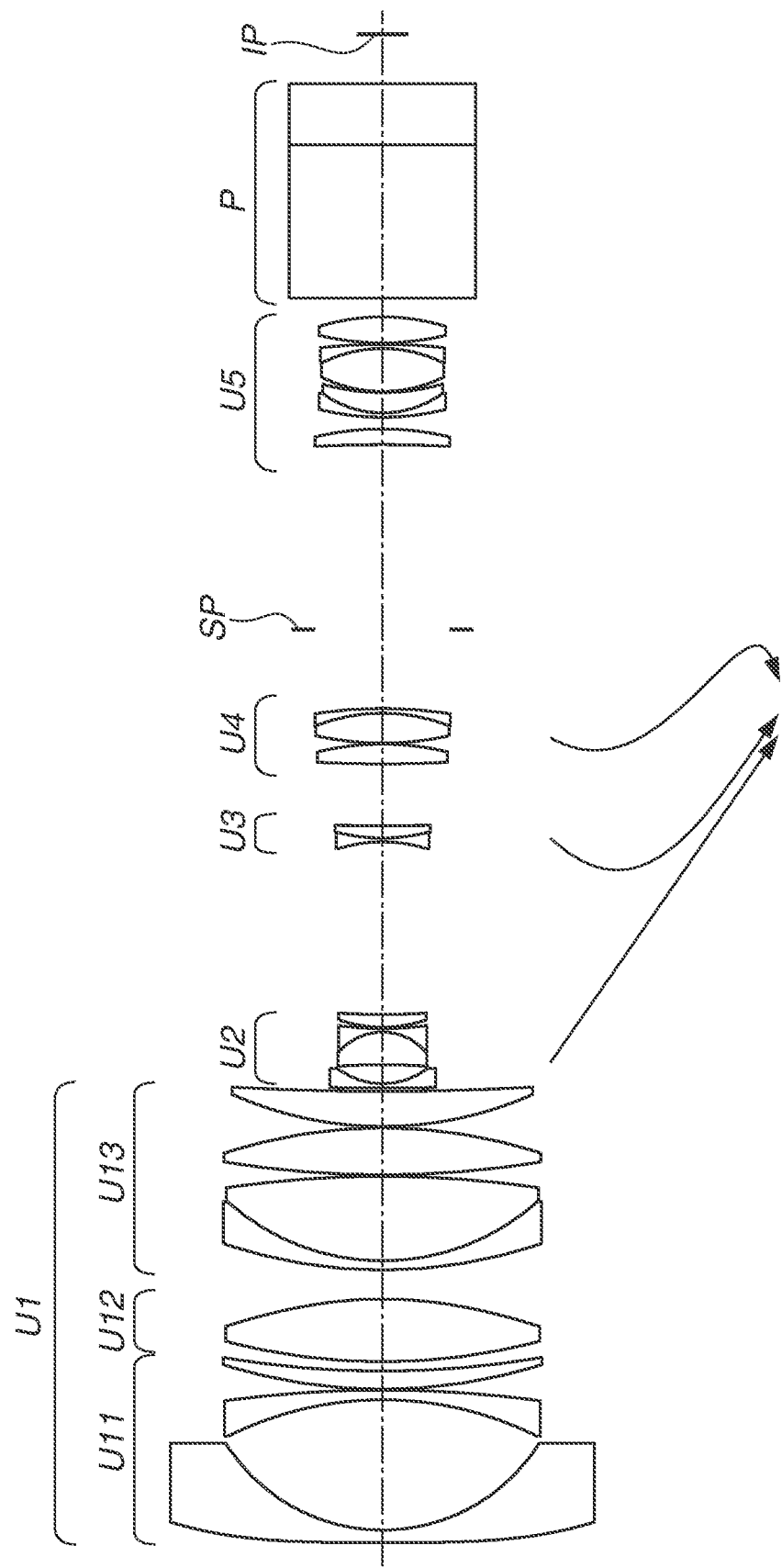
FIG. 23 is a diagram illustrating a cross-section of a zoom lens in a state of being set at the wide-angle end and at focusing on infinite distance according to a twelfth exemplary embodiment (numerical example 12).

FIG. 23 is a diagram illustrating a cross-section of a zoom lens in a state of being set at the wide-angle end and at focusing on infinite distance according to a twelfth exemplary embodiment (corresponding to a numerical example 12 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has positive refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fifth lens unit (U5) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 24A:
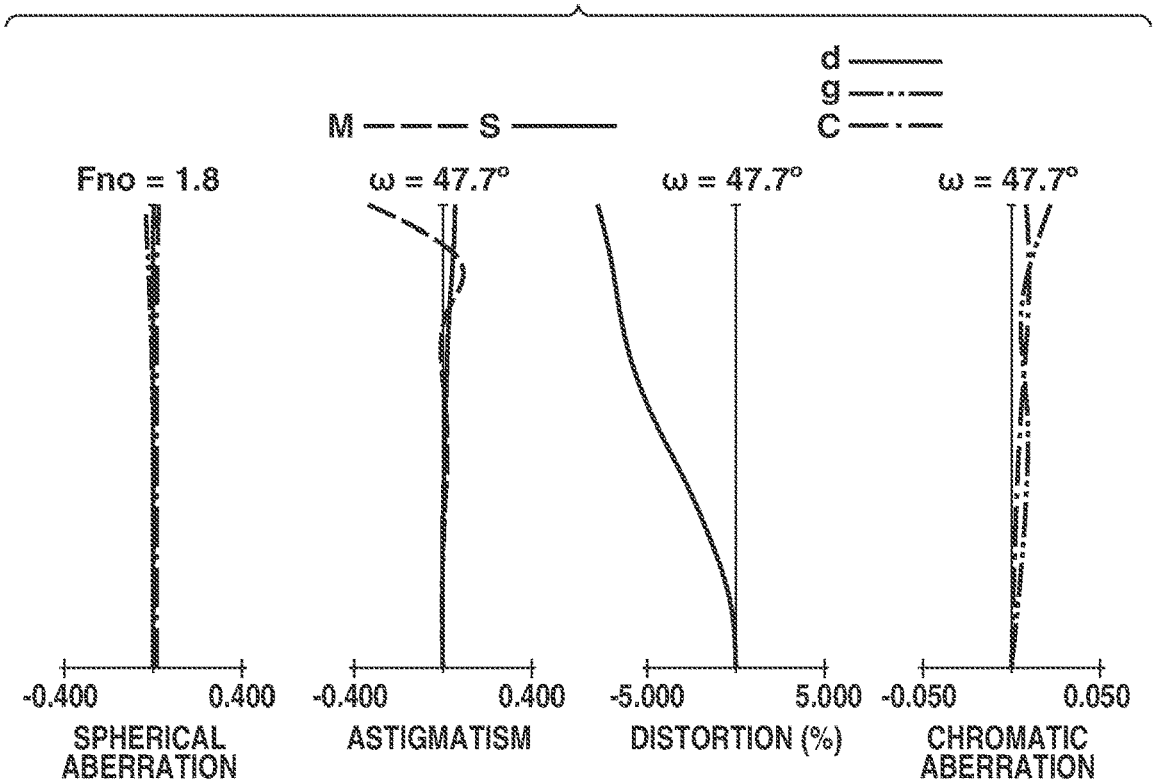
FIGS. 24A and 24B are aberration diagrams of the zoom lens in a state of being set at the wide-angle end and at focusing on infinite distance and in a state of being set at the telephoto end and at focusing on infinite distance, respectively, according to the twelfth exemplary embodiment (numerical example 12).
Figure 24B:
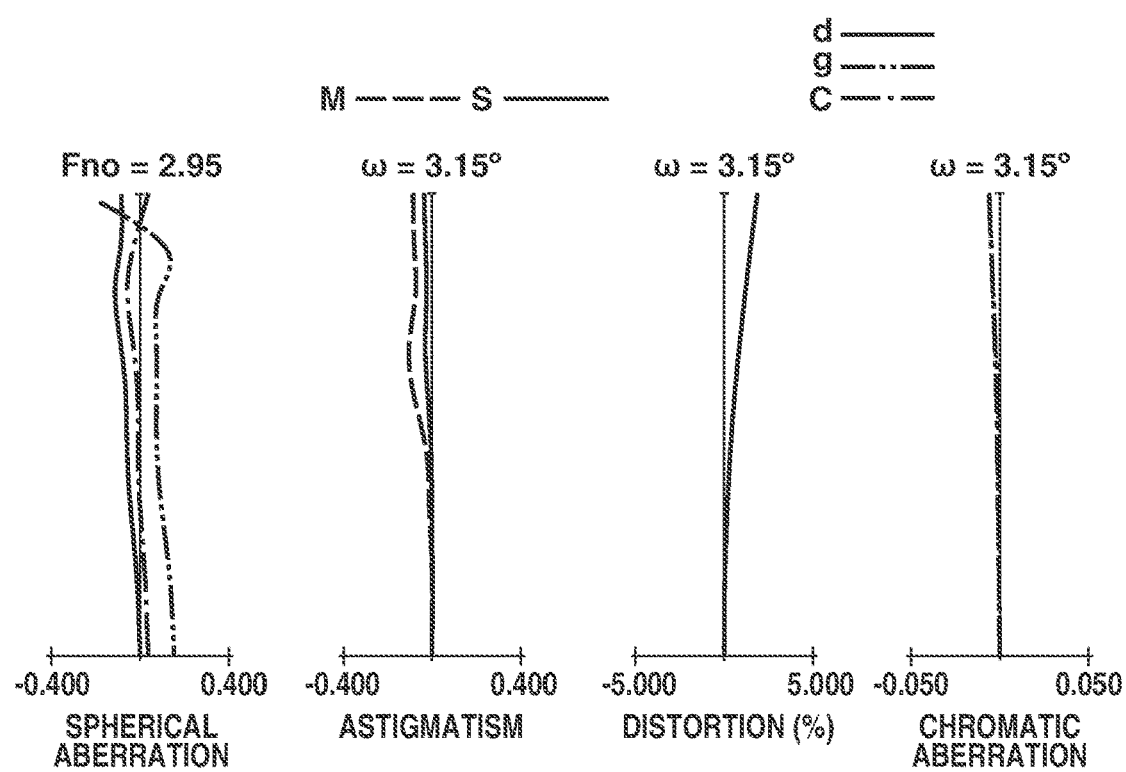

FIGS. 24A and 24B are aberration diagrams of the zoom lens in a state of being set at the wide-angle end and at focusing on infinite distance and in a state of being set at the telephoto end and at focusing on infinite distance, respectively, according to the twelfth exemplary embodiment (numerical example 12).

The first lens unit includes four or more lenses, and, here, includes eight lenses, and a lenses located fourth from the object side (positive lens; second subunit U12) moves from the object side to the image side for focusing from infinite distance to minimum distance.

In the first lens unit, lenses located first to third from the object side (first subunit U11) and lenses located fifth to eighth from the object side (third subunit U13) do not move for focusing. Furthermore, each of lenses located first and second from the object side is a negative lens. The lens located first from the object side (negative lens) satisfies the above-mentioned inequalities (1) to (3) and (5). A lens located first from the object side in the third subunit in the first lens unit, which is located closer to the image side than the second subunit, which moves toward the image side for focusing in the first lens unit, is a negative lens.

A positive lens the Abbe number based on d-line of which becomes maximum among the positive lenses included in the first lens unit is a lens located seventh from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 25:
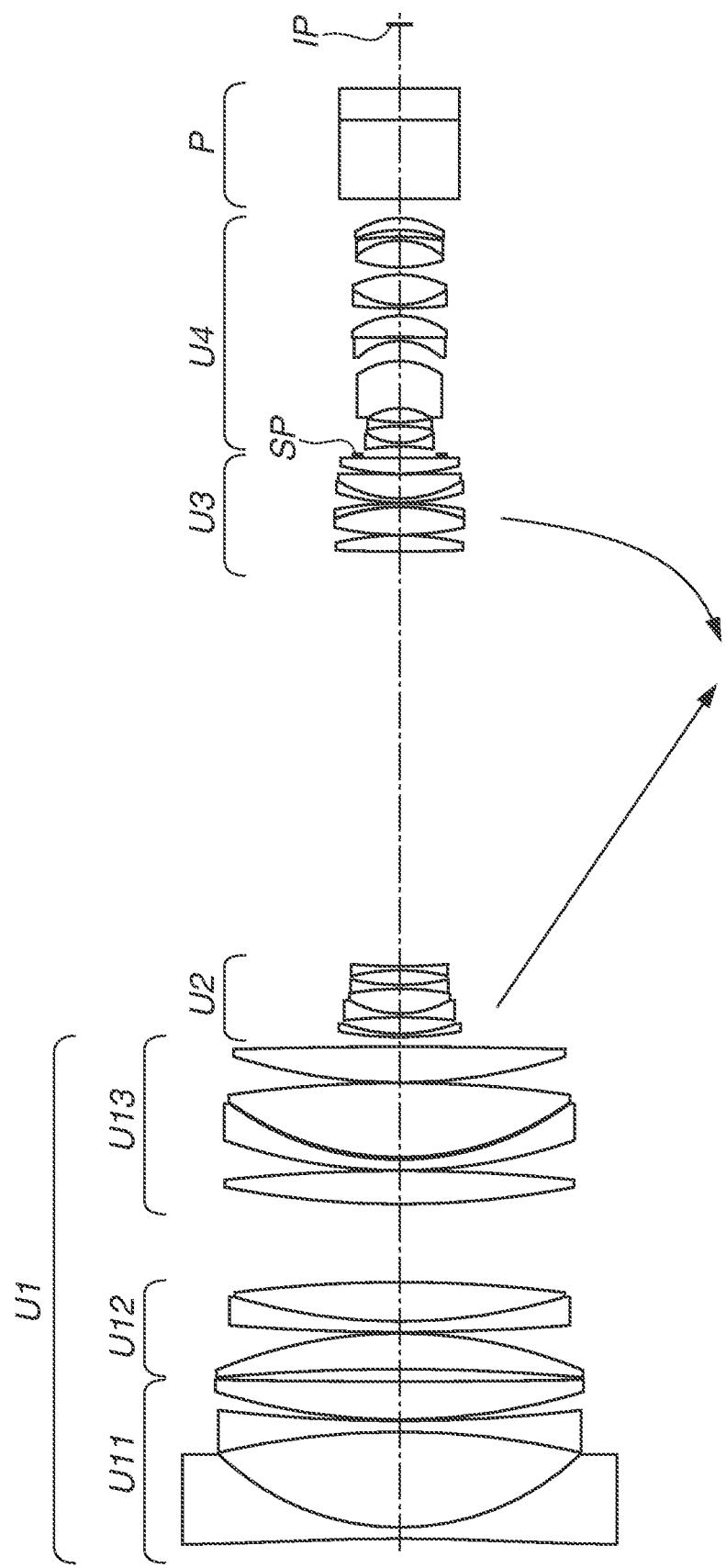
FIG. 25 is a diagram illustrating a cross-section of a zoom lens in a state of being set at the wide-angle end and at focusing on infinite distance according to a thirteenth exemplary embodiment (numerical example 13).

FIG. 25 is a diagram illustrating a cross-section of a zoom lens in a state of being set at the wide-angle end and at focusing on infinite distance according to a thirteenth exemplary embodiment (corresponding to a numerical example 13 described below). The zoom lens includes, in order from an object side to an image side, first to fourth lens units. The first lens unit (U1) has positive refractive power and does not move for variation of magnification. The second lens unit (U2) has negative refractive power and moves in variation of magnification. The third lens unit (U3) has positive refractive power and moves in variation of magnification. The fourth lens unit (U4) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, P denotes a glass block. The glass block can include a color separation prism or a filter such as an ND filter. Moreover, IP denotes an image plane of the zoom lens, at which the imaging surface (light receiving surface) of an image sensor (image pickup element; photoelectric conversion element) can be located.

Figure 26A:
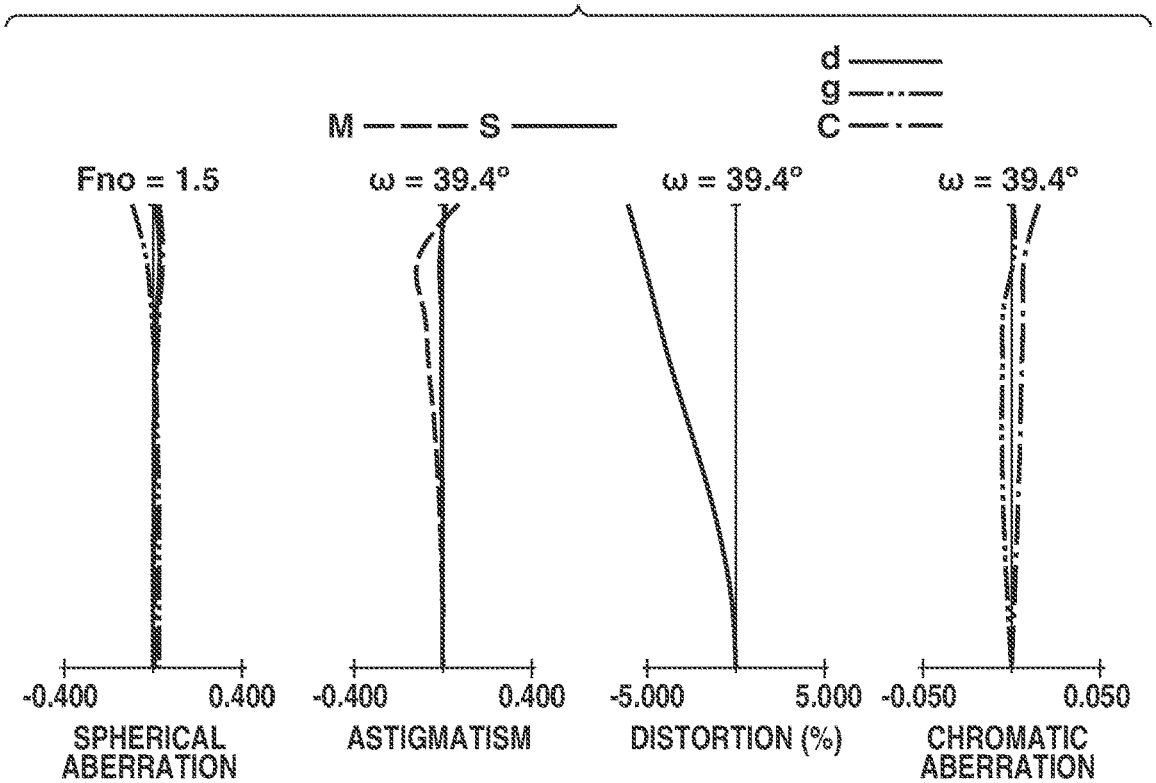
FIGS. 26A and 26B are aberration diagrams of the zoom lens in a state of being set at the wide-angle end and at focusing on infinite distance and in a state of being set at the telephoto end and at focusing on infinite distance, respectively, according to the thirteenth exemplary embodiment (numerical example 13).
Figure 26B:
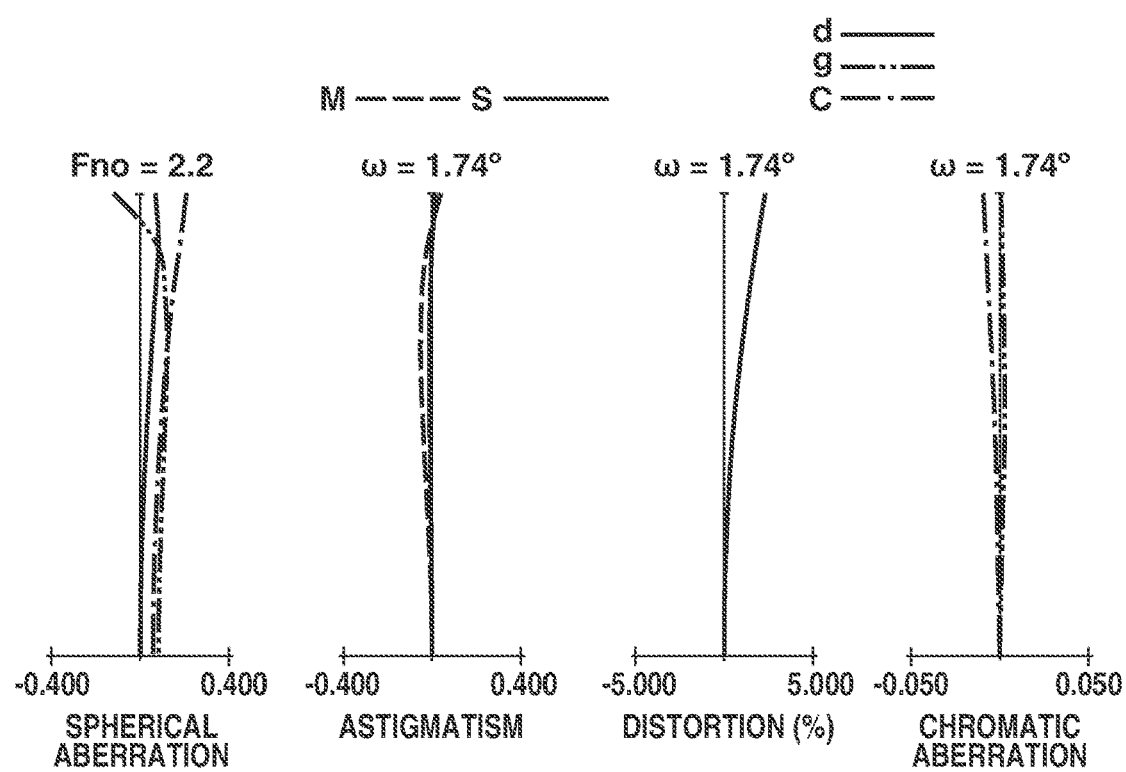

FIGS. 26A and 26B are aberration diagrams of the zoom lens in a state of being set at the wide-angle end and at focusing on infinite distance and in a state of being set at the telephoto end and at focusing on infinite distance, respectively, according to the thirteenth exemplary embodiment (numerical example 13).

The first lens unit includes four or more lenses, and, here, includes ten lenses. In the first lens unit, a lens located fourth from the object side (positive lens) and a cemented lens including a lens located fifth from the object side (negative lens) and a lens located sixth from the object side (positive lens) (second subunit U12) move from the object side to the image side for focusing from infinite distance to minimum distance.

In the first lens unit, lenses located first to third from the object side (first subunit U11) and lenses located seventh to tenth from the object side (third subunit U13) do not move for focusing. Furthermore, each of lenses located first and second from the object side is a negative lens. A lens located second from the object side in the third subunit in the first lens unit, which is located closer to the image side than the second subunit, which moves toward the image side for focusing in the first lens unit, is a negative lens, and the negative lens (eighth lens) satisfies the above-mentioned inequalities (1) to (3) and (5).

A positive lens the Abbe number based on d-line of which becomes maximum among the positive lenses included in the first lens unit is lenses located fourth, sixth, seventh, and ninth from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 27:
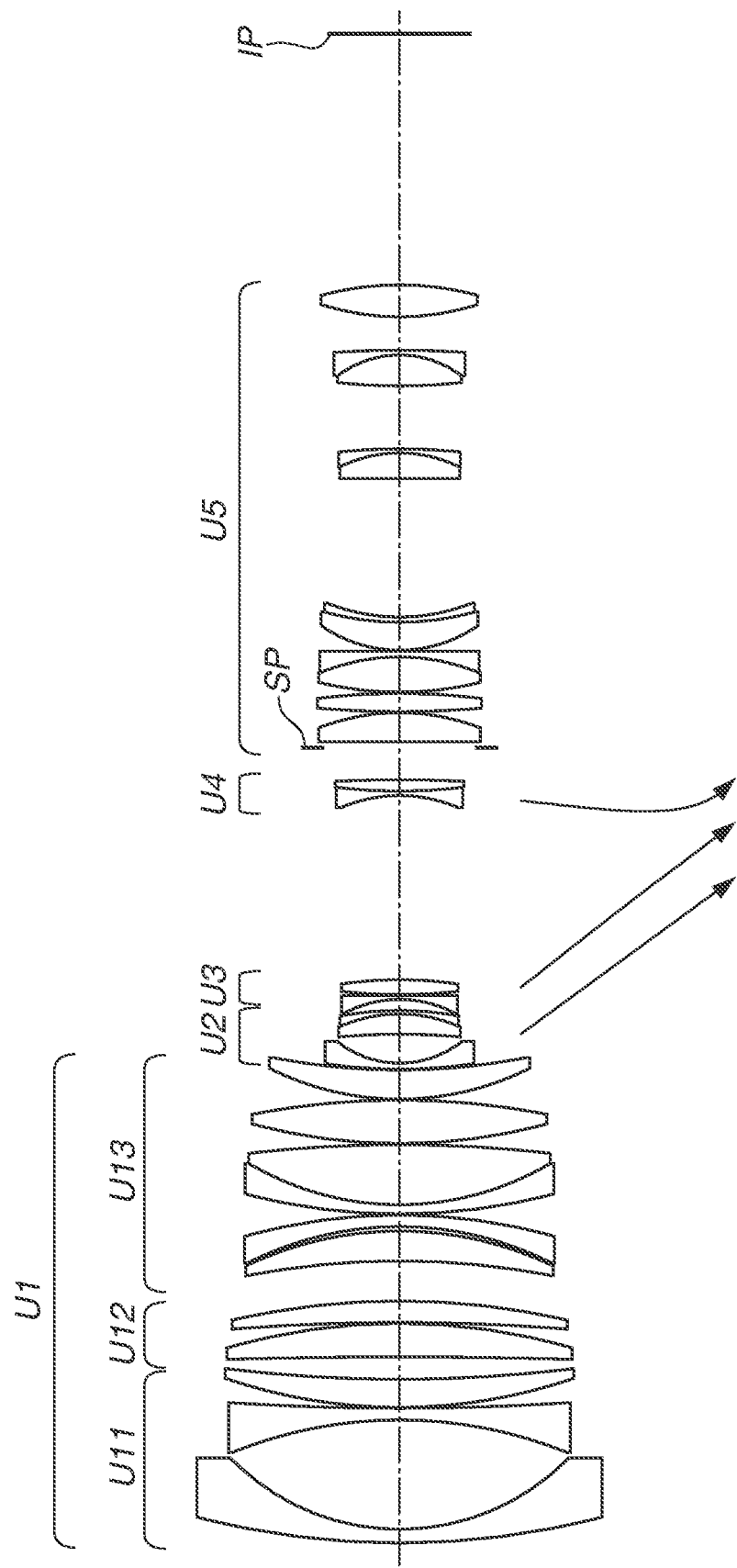
FIG. 27 is a diagram illustrating a cross-section of a zoom lens in a state of being set at the wide-angle end and at focusing on infinite distance according to a fourteenth exemplary embodiment (numerical example 14).

FIG. 27 is a diagram illustrating a cross-section of a zoom lens in a state of being set at the wide-angle end and at focusing on infinite distance according to a fourteenth exemplary embodiment (corresponding to a numerical example 14 described below). The zoom lens includes, in order from an object side to an image side, first to fifth lens units. The first lens unit (U1) has positive refractive power and does not move for variation of magnification. The second lens unit (U2) has negative refractive power and moves in variation of magnification. The third lens unit (U3) has negative refractive power and moves in variation of magnification. The fourth lens unit (U4) has negative refractive power and moves in variation of magnification. The fifth lens unit (U5) has positive refractive power, serves to form an image, and does not move for variation of magnification. Furthermore, the second lens unit moves toward the image side in variation of magnification from the wide-angle end to the telephoto end. Moreover, the fifth lens unit (U5) includes an aperture stop (SP). Moreover, IP denotes an image plane of the zoom lens, at which the imaging surface (light receiving surface) of an image sensor (image pickup element; photoelectric conversion element) can be located.

Figure 28A:
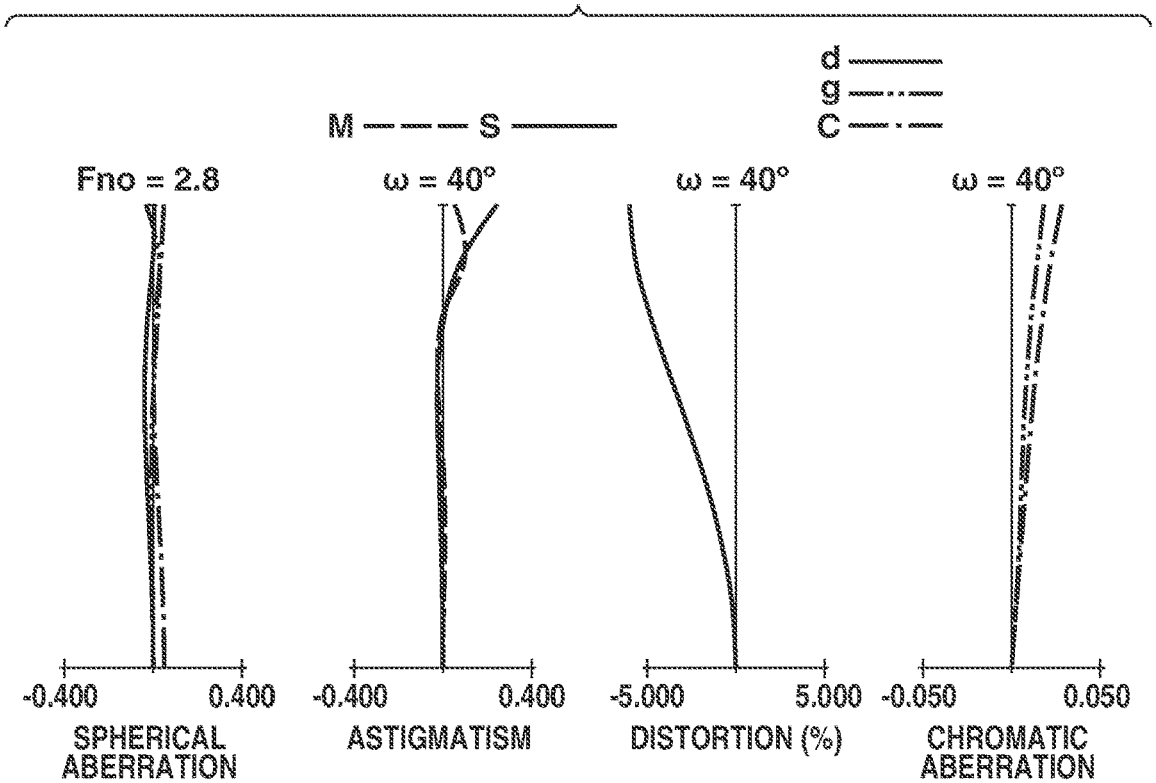
FIGS. 28A and 28B are aberration diagrams of the zoom lens in a state of being set at the wide-angle end and at focusing on infinite distance and in a state of being set at the telephoto end and at focusing on infinite distance, respectively, according to the fourteenth exemplary embodiment (numerical example 14).
Figure 28B:
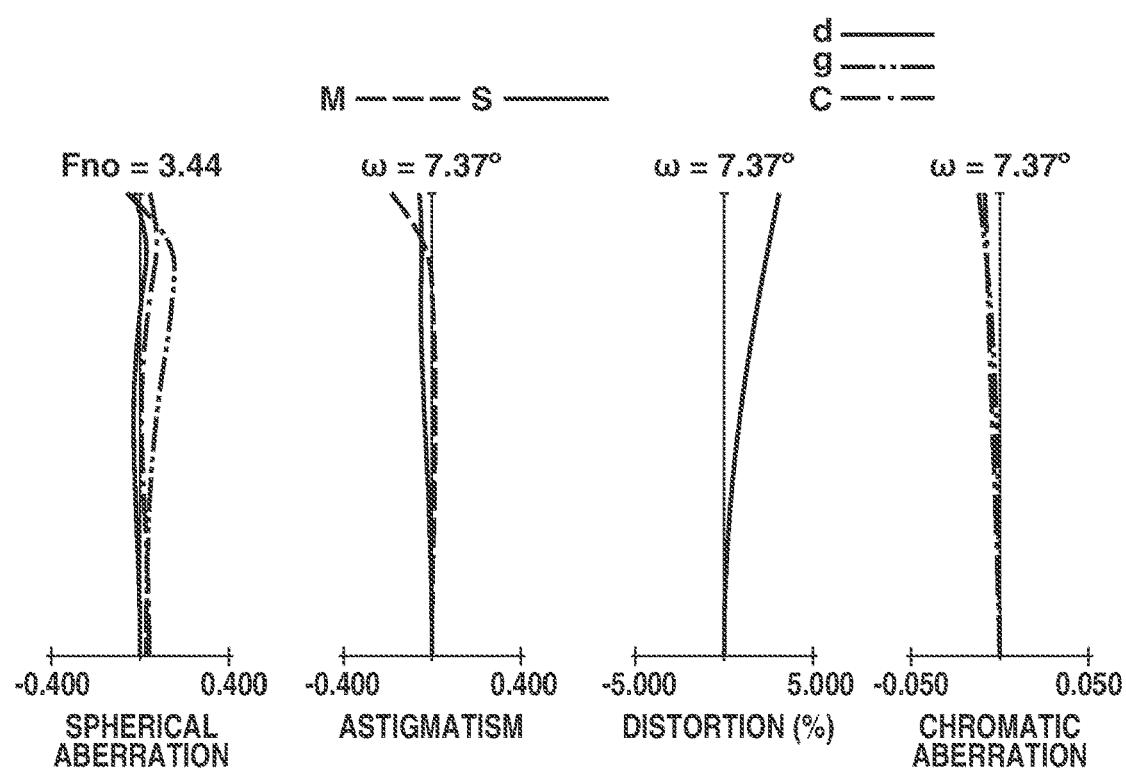

FIGS. 28A and 28B are aberration diagrams of the zoom lens in a state of being set at the wide-angle end and at focusing on infinite distance and in a state of being set at the telephoto end and at focusing on infinite distance, respectively, according to the fourteenth exemplary embodiment (numerical example 14).

The first lens unit includes four or more lenses, and, here, includes eleven lenses. In the first lens unit, lenses located fourth and fifth from the object side (each being a positive lens; second subunit U12) move from the object side to the image side for focusing from infinite distance to minimum distance.

In the first lens unit, lenses located first to third from the object side (first subunit U11) and lenses located sixth to eleventh from the object side (third subunit U13) do not move for focusing. Furthermore, each of lenses located first and second from the object side is a negative lens. The negative lens located first from the object side satisfies the above-mentioned inequalities (1) to (3) and (5). Lenses located second and third from the object side in the third subunit in the first lens unit, which is located closer to the image side than the second subunit, which moves toward the image side for focusing in the first lens unit, are negative lenses. The negative lens located second from the object side (negative lens, seventh lens) satisfies the above-mentioned inequalities (1) to (3) and (5).

A positive lens the Abbe number based on d-line of which becomes maximum among the positive lenses included in the first lens unit is a lens located eighth from the object side. A negative lens the absolute value of refractive power of which is largest in the first lens unit is a lens located on the most object side. A lens unit the absolute value of refractive power of which is largest among negative lens units which move in variation of magnification is the second lens unit U2.

Figure 29:
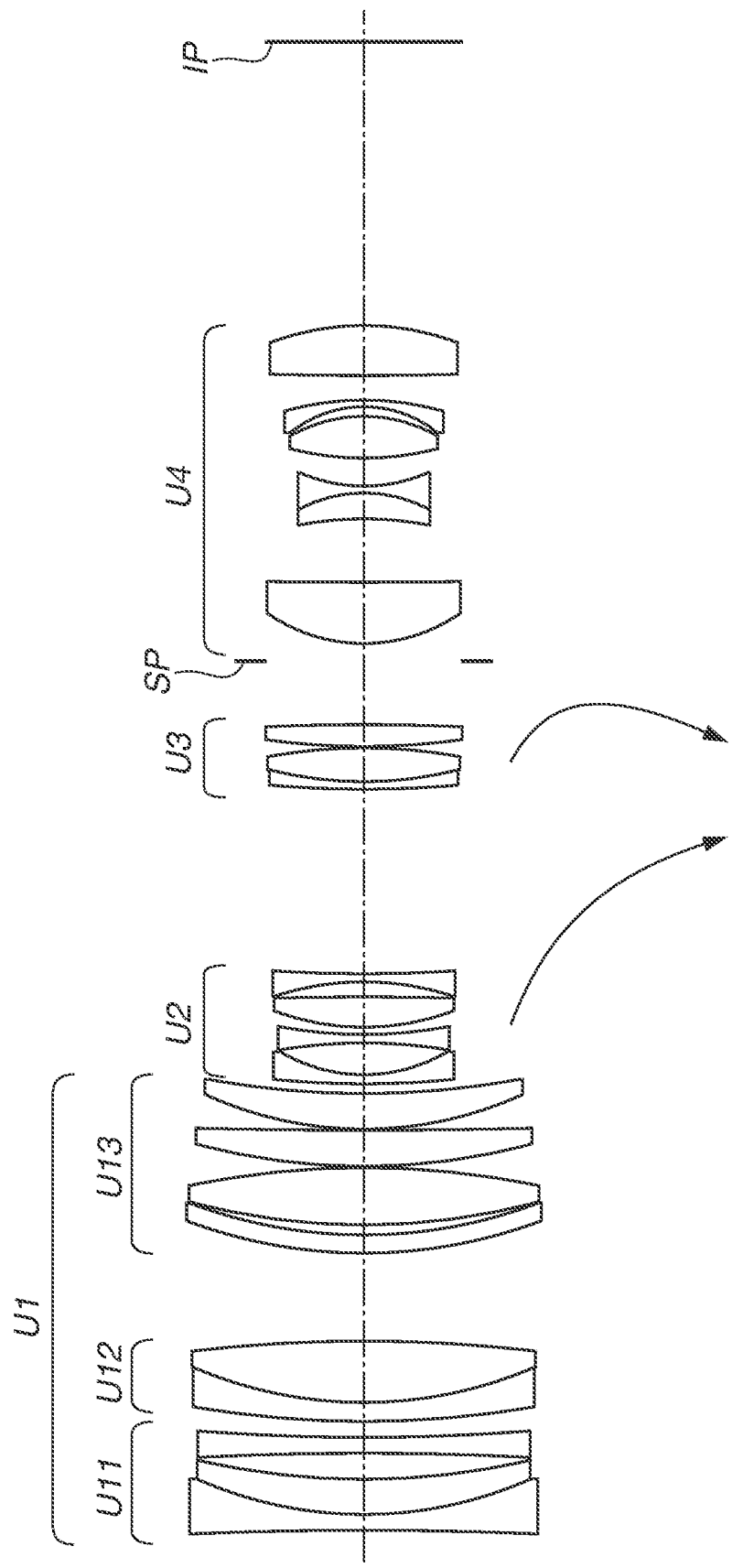
FIG. 29 is a diagram illustrating a cross-section of a zoom lens in a state of being set at the wide-angle end and at focusing on infinite distance according to a fifteenth exemplary embodiment (numerical example 15).

FIG. 29 is a diagram illustrating a cross-section of a zoom lens in a state of being set at the wide-angle end and at focusing on infinite distance according to a fifteenth exemplary embodiment (corresponding to a numerical example 15 described below). The zoom lens includes, in order from an object side to an image side, first to fourth lens units. The first lens unit (U1) has positive refractive power and does not move for variation of magnification. The second lens unit (U2) has negative refractive power and moves in variation of magnification. The third lens unit (U3) has positive refractive power and moves in variation of magnification. The fourth lens unit (U4) has positive refractive power, serves to form an image, and does not move for variation of magnification. Furthermore, the second lens unit moves toward the image side in variation of magnification from the wide-angle end to the telephoto end. Moreover, the fourth lens unit (U4) includes an aperture stop (SP). Moreover, IP denotes an image plane of the zoom lens, at which the imaging surface (light receiving surface) of an image sensor (image pickup element; photoelectric conversion element) can be located.

Figure 30A:
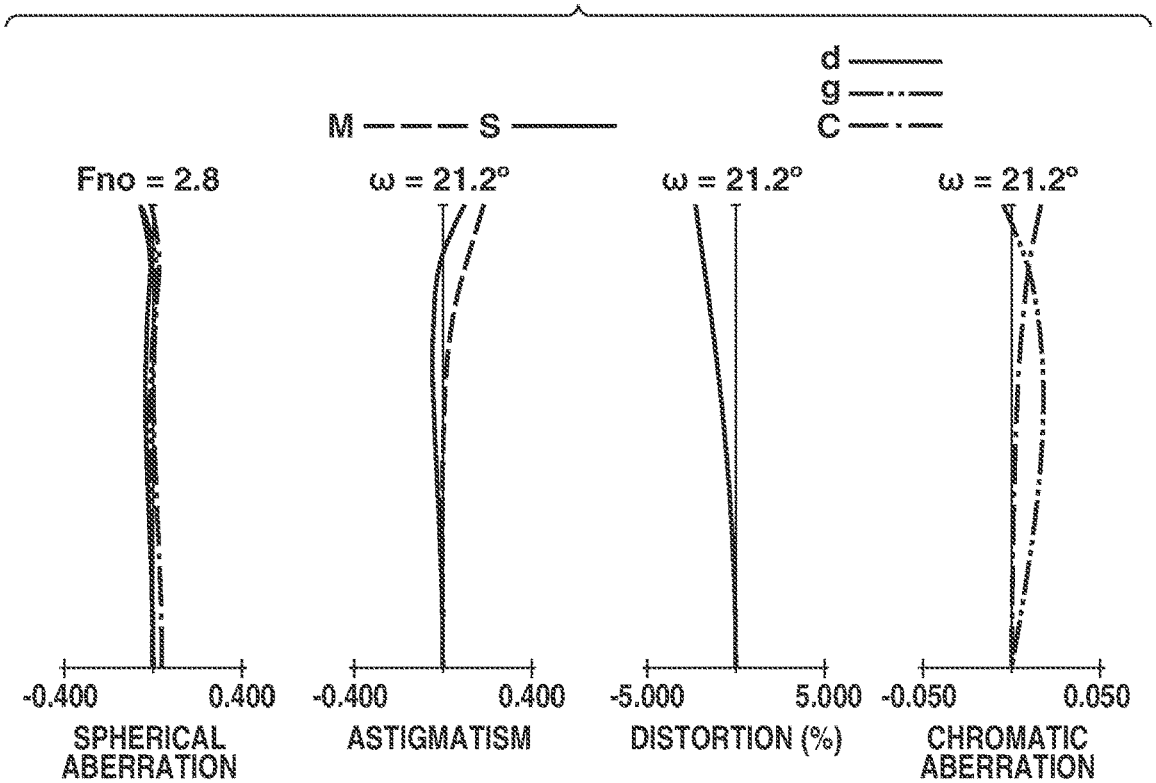
FIGS. 30A and 30B are aberration diagrams of the zoom lens in a state of being set at the wide-angle end and at focusing on infinite distance and in a state of being set at the telephoto end and at focusing on infinite distance, respectively, according to the fifteenth exemplary embodiment (numerical example 15).
Figure 30B:
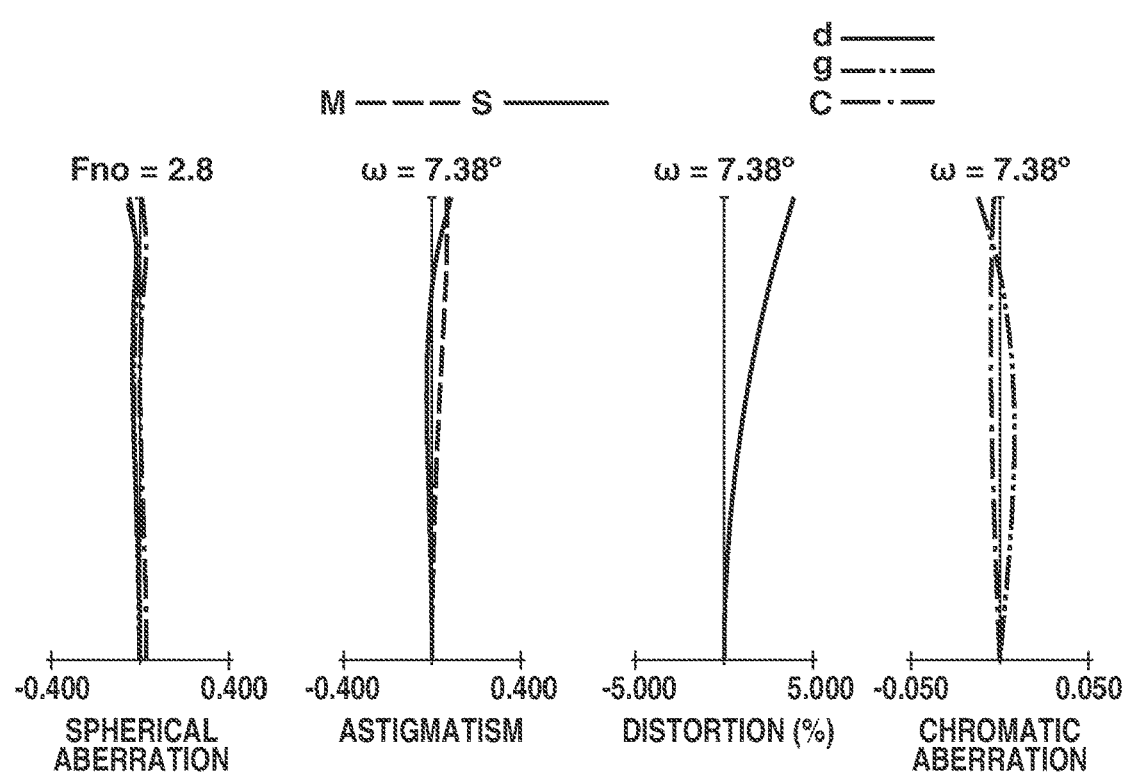

FIGS. 30A and 30B are aberration diagrams of the zoom lens in a state of being set at the wide-angle end and at focusing on infinite distance and in a state of being set at the telephoto end and at focusing on infinite distance, respectively, according to the fifteenth exemplary embodiment (numerical example 15).

The first lens unit includes four or more lenses, and, here, includes nine lenses. In the first lens unit, a cemented lens (second subunit U12) including lenses located fourth and fifth from the object side (each being a positive lens) moves from the object side to the image side for focusing from infinite distance to minimum distance.

In the first lens unit, lenses located first and second from the object side (first subunit U11) and lenses located sixth to ninth from the object side (third subunit U13) do not move for focusing. Furthermore, the lens located first from the object side is a negative lens. A lens located first from the object side in the third subunit in the first lens unit, which is located closer to the image side than the second subunit, which moves toward the image side for focusing in the first lens unit, is a negative lens, and the negative lens (sixth lens) satisfies the above-mentioned inequalities (1) to (3) and (5).

A positive lens the Abbe number based on d-line of which becomes maximum among the positive lenses included in the first lens unit is lenses located seventh and eighth from the object side. A negative lens the absolute value of refractive power of which is largest in the first lens unit is a lens located on the most object side. A lens unit the absolute value of refractive power of which is largest among negative lens units which move in variation of magnification is the second lens unit U2.

FIG. 31 is a diagram illustrating a cross-section of a zoom lens in a state of being set at the wide-angle end and at focusing on infinite distance according to a sixteenth exemplary embodiment (corresponding to a numerical example 16 described below). The zoom lens includes, in order from an object side to an image side, first to seventh lens units. The first lens unit (U1) has positive refractive power and does not move for variation of magnification. The second lens unit (U2) has negative refractive power and moves in variation of magnification. The third lens unit (U3) has positive refractive power and does not move for variation of magnification. The fourth lens unit (U4) has positive refractive power and moves in variation of magnification. The fifth lens unit (U5) has negative refractive power and does not move for variation of magnification. The sixth lens unit (U6) has positive refractive power and moves in variation of magnification. The seventh lens unit (U7) has positive refractive power, serves to form an image, and does not move for variation of magnification. Furthermore, the second lens unit moves toward the image side in variation of magnification from the wide-angle end to the telephoto end. Moreover, the third lens unit (U3) includes an aperture stop (SP). Moreover, IP denotes an image plane of the zoom lens, at which the imaging surface (light receiving surface) of an image sensor (image pickup element; photoelectric conversion element) can be located.

Figure 32A:
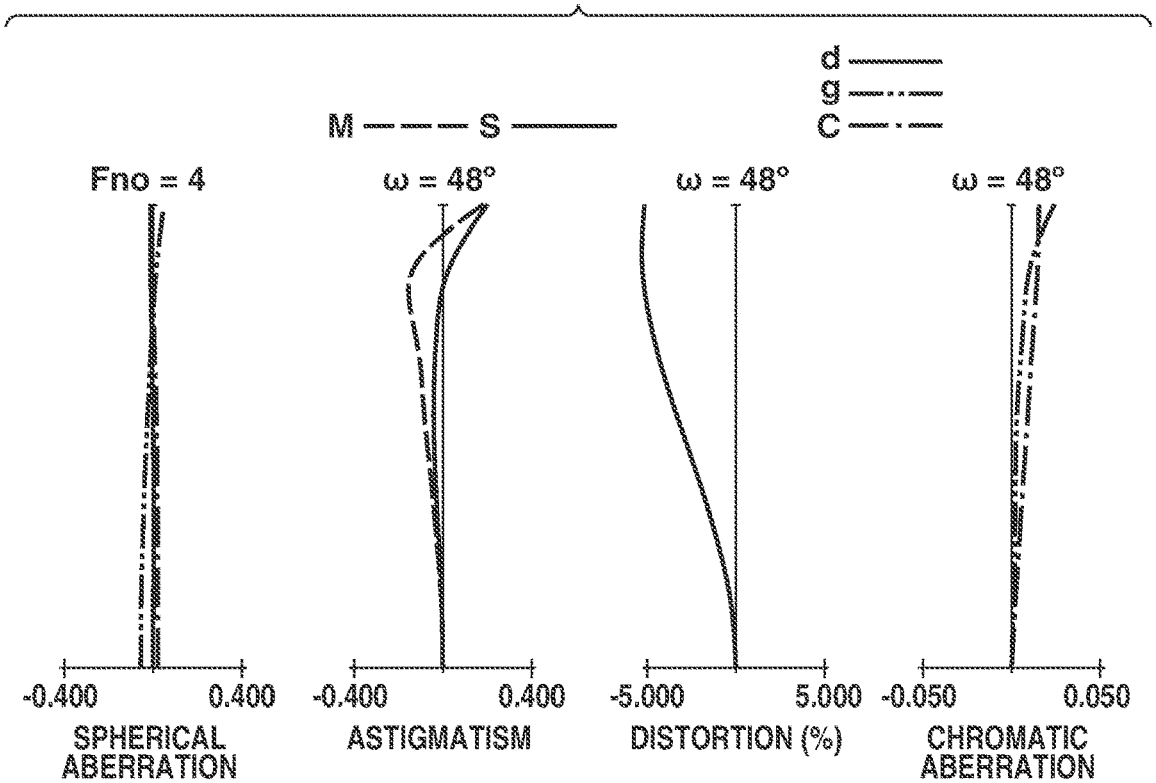
FIGS. 32A and 32B are aberration diagrams of the zoom lens in a state of being set at the wide-angle end and at focusing on infinite distance and in a state of being set at the telephoto end and at focusing on infinite distance, respectively, according to the sixteenth exemplary embodiment (numerical example 16).
Figure 32B:
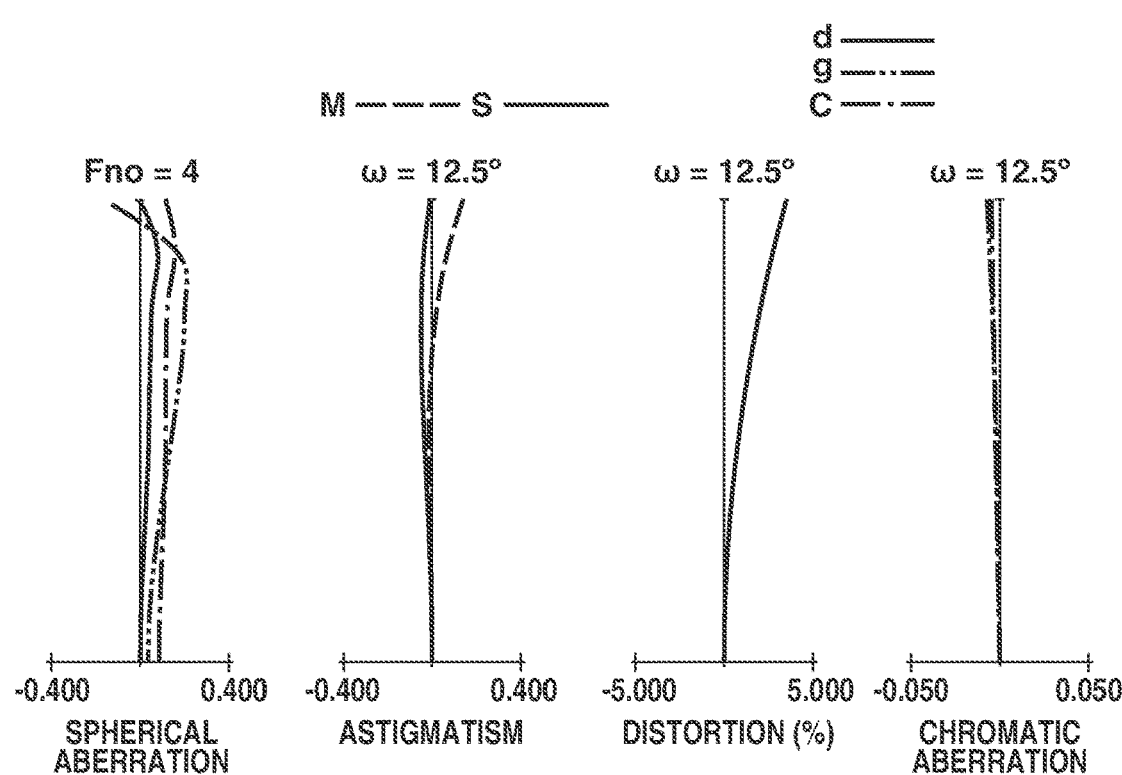

FIGS. 32A and 32B are aberration diagrams of the zoom lens in a state of being set at the wide-angle end and at focusing on infinite distance and in a state of being set at the telephoto end and at focusing on infinite distance, respectively, according to the sixteenth exemplary embodiment (numerical example 16).

The first lens unit includes four or more lenses, and, here, includes eight lenses. In the first lens unit, a lens located fifth from the object side (positive lens; second subunit U12) moves from the object side to the image side for focusing from infinite distance to minimum distance.

In the first lens unit, lenses located first to fourth from the object side (first subunit U11) and lenses located sixth to eighth from the object side (third subunit U13) do not move for focusing. Furthermore, each of the lenses located first to third from the object side is a negative lens. The lens located first from the object side satisfies the above-mentioned inequalities (1) to (3) and (5). A lens located first from the object side in the third subunit in the first lens unit, which is located closer to the image side than the second subunit, which moves toward the image side for focusing in the first lens unit, is a negative lens.

A positive lens the Abbe number based on d-line of which becomes maximum among the positive lenses included in the first lens unit is a lens located seventh from the object side. A negative lens the absolute value of refractive power of which is largest in the first lens unit is a lens located on the most object side. A lens unit the absolute value of refractive power of which is largest among negative lens units which move in variation of magnification is the second lens unit U2.

FIG. 33 is a diagram illustrating a configuration example of an image pickup apparatus. The image pickup apparatus 125 illustrated in FIG. 33 includes a zoom lens 101, which corresponds to a zoom lens according to any one of the first to sixteenth exemplary embodiments. The image pickup apparatus 125 further includes a camera (image pickup apparatus) body 124. The zoom lens 101 is configured to be attachable to and detachable from the camera body 124. The image pickup apparatus 125 is configured with the zoom lens 101 attached to the camera body 124.

The zoom lens 101 includes a first lens unit F, two or more lens units LZ used for variation of magnification, and a rear lens unit R used for image formation. The first lens unit F is not specifically limited but, here, is configured to include a second subunit 1b, which moves on the optical axis for focusing, and a first subunit 1a and a third subunit 1c, which do not move for focusing.

The two or more lens units LZ used for variation of magnification moves on the optical axis for variation of magnification. The zoom lens 101 further includes an aperture stop SP. The rear lens unit R can include a subunit which is able to be inserted into and extracted from an optical path thereof. The range of focal lengths of the zoom lens 101 can be changed by insertion and extraction of the subunit. The zoom lens 101 further includes drive mechanisms 114 and 115, which are configured to drive the second subunit 1b and the two or more lens units LZ used for variation of magnification, respectively, along the optical axis. Each of the drive mechanisms 114 and 115 can be configured to include, for example, a helicoid or a cam. The zoom lens 101 further includes motors (drive units) 116 to 118, which drive the drive mechanisms 114 and 115 and the aperture stop SP, respectively. The zoom lens 101 further includes detection units 119 to 121, which detect the position of the second subunit 1b on the optical axis, the positions of the two or more lens units LZ used for variation of magnification on the optical axis, and the aperture diameter of the aperture stop SP, respectively. Each of the detection units 119 to 121 can be configured to include, for example, an encoder, a potentiometer, or a photosensor. The camera body 124 includes a glass block 109, which includes, for example, an optical filter, and an image sensor (image pickup element; photoelectric conversion element) 110, which captures an object image formed by the zoom lens 101. The image sensor 110 can be configured to include, for example, a charge-coupled device (CCD) sensor or a complementary metal-oxide semiconductor (CMOS) sensor. Moreover, the camera body 124 further includes a central processing unit (CPU) 111 serving as a processing unit (control unit), and the zoom lens 101 further includes a CPU 122 serving as a processing unit (control unit). In this way, attaching a zoom lens according to any one of the above-described exemplary embodiments to a camera body enables providing a useful image pickup apparatus including the zoom lens having the above-mentioned beneficial effects.

The following are details of numerical values employed in the respective numerical examples. In each numerical example, "r" denotes the radius of curvature of each surface, "d" denotes a surface interval between every adjacent surfaces, "nd" or "Nd" denotes an absolute refractive index at 1 atmosphere (atm) with respect to a d-line of the Fraunhofer lines, and "vd" denotes an Abbe number related to a d-line (based on a d-line). "θn" denotes a partial dispersion ratio with respect to a g-line and an F-line. "θn" is also referred to as "θgF." The "half angle of view" ω is assumed to be expressed by an equation of "ω=arctan(Y/fw)", where 2Y denotes the diagonal image size of a camera for which the zoom lens is used and fw denotes the focal length of the zoom lens at the wide-angle end. The "maximum image height" is equivalent to half Y (for example, 5.50 mm) of the diagonal image size 2Y (for example, 11.00 mm). BF denotes the back focal distance (length reduced to air). The last three surfaces are surfaces of a glass block such as a filter. Refractive indices relative to F-line, d-line, and C-line of the Fraunhofer lines are denoted by NF, Nd, and NC, respectively, and the definition of the Abbe number vd is similar to that generally used and is thus expressed as follows.

$$vd=(Nd-1)/(NF-NC)$$

The shape of an aspheric surface is expressed with the X-axis taken in the optical axis direction, the H-axis taken in a direction perpendicular to the optical axis direction, and the direction of travel of light regarded as plus. "R" denotes a paraxial radius of curvature, "k" denotes a conic constant, and A3, A4, A5, A6, A7, A8, A9, A10, A11, A12, A13, A14, A15, and A16 denote respective aspheric surface coefficients. Then, the shape of an aspheric surface (the amount of deviation from a reference spherical surface) is expressed by the following equation. Furthermore, "e-Z" means "x10$^{-z}$".

Moreover, the mark "*" added to the right of a surface number indicates that the surface concerned is an aspheric surface.

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

NUMERICAL EXAMPLE 1

Unit mm

Surface Data

| Surface Number | r | d | nd | vd | θn |
|---|---|---|---|---|---|
| 1 | −162.40263 | 2.20000 | 1.780000 | 35.00 | 0.5789 |
| 2 | 84.92244 | 1.17956 | | | |
| 3 | 88.24163 | 7.41675 | 1.433870 | 95.10 | 0.5373 |
| 4 | 335.76141 | 0.20000 | | | |
| 5 | 162.31038 | 12.74039 | 1.433870 | 95.10 | 0.5373 |
| 6 | −95.73216 | 7.63816 | | | |
| 7 | 153.60089 | 5.74687 | 1.433870 | 95.10 | 0.5373 |
| 8 | −587.53678 | 0.15000 | | | |
| 9 | 99.60615 | 7.75841 | 1.433870 | 95.10 | 0.5373 |
| 10 | −305.19834 | 0.15000 | | | |
| 11 | 55.32476 | 4.77294 | 1.763850 | 48.49 | 0.5589 |
| 12 | 108.02287 | (variable) | | | |
| 13 | 68.96484 | 0.90000 | 1.882997 | 40.76 | 0.5667 |
| 14 | 13.39106 | 4.69706 | | | |
| 15 | −66.60538 | 6.78047 | 1.808095 | 22.76 | 0.6307 |
| 16 | −11.97242 | 0.70000 | 1.882997 | 40.76 | 0.5667 |
| 17 | 47.56807 | 0.20000 | | | |
| 18 | 25.39273 | 2.78394 | 1.780000 | 35.00 | 0.5789 |
| 19 | 80.56031 | (variable) | | | |
| 20 | −27.49269 | 0.70000 | 1.750000 | 38.70 | 0.5739 |
| 21 | 24.62014 | 3.06303 | 1.846490 | 23.90 | 0.6217 |
| 22 | 168.63733 | (variable) | | | |
| 23 (stop) | ∞ | 2.28825 | | | |
| 24 | −74.67020 | 3.06933 | 1.638539 | 55.38 | 0.5484 |
| 25 | −30.44870 | 0.15000 | | | |
| 26 | 358.69949 | 2.26245 | 1.518229 | 58.90 | 0.5457 |
| 27 | −152.97822 | 0.08283 | | | |
| 28 | 45.03467 | 6.84723 | 1.517417 | 52.43 | 0.5564 |
| 29 | −31.73498 | 0.90000 | 1.750000 | 38.70 | 0.5739 |
| 30 | −113.48650 | (variable) | | | |
| 31 | 216.26991 | 2.92004 | 1.496999 | 81.54 | 0.5375 |
| 32 | −88.02005 | 3.39672 | | | |
| 33 | 74.51748 | 1.40000 | 1.780000 | 35.00 | 0.5789 |
| 34 | 20.98634 | 5.97147 | 1.487490 | 70.23 | 0.5300 |
| 35 | 114.08808 | −0.01752 | | | |
| 36 | 45.46390 | 8.65126 | 1.501270 | 56.50 | 0.5536 |
| 37 | −20.93765 | 1.40000 | 1.834807 | 42.71 | 0.5642 |
| 38 | −228.69944 | 0.14662 | | | |
| 39 | 117.08763 | 6.17237 | 1.501270 | 56.50 | 0.5536 |
| 40 | −28.40603 | 4.00000 | | | |
| 41 | ∞ | 33.00000 | 1.608590 | 46.44 | 0.5664 |
| 42 | ∞ | 13.20000 | 1.516330 | 64.14 | 0.5353 |
| 43 | ∞ | 7.34000 | | | |
| Image plane | ∞ | | | | |

Various Pieces of Data
Zoom Ratio 17.00

| | Wide-Angle | Intermediate | Telephoto |
|---|---|---|---|
| Focal Length | 8.00 | 32.71 | 136.00 |
| F-number | 1.90 | 1.90 | 2.50 |
| Half Angle of View | 34.51 | 9.54 | 2.32 |
| Maximum Image Height | 5.50 | 5.50 | 5.50 |
| Total Lens Length | 266.01 | 266.01 | 266.01 |
| BF | 7.34 | 7.34 | 7.34 |
| d12 | 0.79 | 32.79 | 47.00 |
| d19 | 45.29 | 9.67 | 11.82 |
| d22 | 6.52 | 10.61 | 1.85 |
| d30 | 40.45 | 39.97 | 32.37 |

Zoom Lens Unit Data

| Unit | Beginning Surface | Focal length |
|---|---|---|
| 1 | 1 | 61.00 |
| 2 | 13 | −13.50 |
| 3 | 20 | −34.98 |
| 4 | 23 | 35.36 |
| 5 | 31 | 52.03 |

NUMERICAL EXAMPLE 2

Unit mm

Surface Data

| Surface Number | r | d | nd | vd | θn |
|---|---|---|---|---|---|
| 1 | −175.32080 | 2.30000 | 1.780000 | 35.00 | 0.5789 |
| 2 | 319.29487 | 3.45049 | | | |
| 3 | 1656.22431 | 2.30000 | 1.780000 | 35.00 | 0.5789 |
| 4 | 89.54508 | 17.69850 | 1.496999 | 81.54 | 0.5375 |
| 5 | −133.15020 | 0.40000 | | | |
| 6 | 172.64768 | 9.01346 | 1.433870 | 95.10 | 0.5373 |
| 7 | −288.99680 | 6.89910 | | | |
| 8 | 109.85140 | 10.83870 | 1.618000 | 63.33 | 0.5441 |
| 9 | −280.39691 | 0.15000 | | | |
| 10 | 65.73774 | 5.27886 | 1.772499 | 49.60 | 0.5520 |
| 11 | 107.90155 | (variable) | | | |
| 12 | 104.58197 | 2.34769 | 1.772499 | 49.60 | 0.5520 |
| 13 | 146.08205 | (variable) | | | |
| 14 | 65.29784 | 0.90000 | 1.882997 | 40.76 | 0.5667 |
| 15 | 13.75279 | 6.36093 | | | |
| 16 | −58.21997 | 6.95675 | 1.808095 | 22.76 | 0.6307 |
| 17 | −13.15312 | 0.70000 | 1.882997 | 40.76 | 0.5667 |
| 18 | 80.19284 | 0.20000 | | | |
| 19 | 26.92618 | 2.87077 | 1.666800 | 33.05 | 0.5957 |
| 20 | 66.41767 | (variable) | | | |
| 21 | −37.39814 | 0.75000 | 1.772499 | 49.60 | 0.5520 |
| 22 | 35.00057 | 3.85147 | 1.698947 | 30.13 | 0.6030 |
| 23 | −65.39064 | 2.04508 | | | |
| 24 | −29.84249 | 0.75000 | 1.772499 | 49.60 | 0.5520 |
| 25 | −64.12005 | (variable) | | | |
| 26 | −107.59707 | 3.78469 | 1.638539 | 55.38 | 0.5484 |
| 27 | −31.33685 | 0.15000 | | | |
| 28 | −131.67315 | 2.47704 | 1.516330 | 64.14 | 0.5353 |
| 29 | −58.83156 | (variable) | | | |
| 30 (stop) | ∞ | 1.30000 | | | |
| 31 | 59.17111 | 6.72488 | 1.517417 | 52.43 | 0.5564 |
| 32 | −32.16786 | 0.90000 | 1.834807 | 42.71 | 0.5642 |
| 33 | −124.55899 | 32.40000 | | | |
| 34 | 80.76717 | 5.22820 | 1.496999 | 81.54 | 0.5375 |
| 35 | −52.30546 | 9.33833 | | | |
| 36 | −351.88800 | 1.40000 | 1.834030 | 37.20 | 0.5775 |
| 37 | 22.48130 | 5.89070 | 1.487490 | 70.23 | 0.5300 |
| 38 | −837.15605 | 0.19663 | | | |
| 39 | 48.33796 | 8.05950 | 1.501270 | 56.50 | 0.5536 |
| 40 | −19.46839 | 1.40000 | 1.834807 | 42.71 | 0.5642 |
| 41 | −91.49783 | 3.26247 | | | |
| 42 | 235.90013 | 5.49307 | 1.501270 | 56.50 | 0.5536 |
| 43 | −28.79296 | 4.00000 | | | |

-continued

Unit mm

| | | | | | |
|---|---|---|---|---|---|
| 44 | ∞ | 33.00000 | 1.608590 | 46.44 | 0.5664 |
| 45 | ∞ | 13.20000 | 1.516330 | 64.14 | 0.5353 |
| 46 | ∞ | 7.61000 | | | |
| Image plane | ∞ | | | | |

Various Pieces of Data
Zoom Ratio 20.03

| | Wide-Angle | Intermediate | Telephoto |
|---|---|---|---|
| Focal Length | 8.00 | 35.80 | 160.25 |
| F-number | 1.90 | 1.90 | 2.80 |
| Half Angle of View | 34.51 | 8.73 | 1.97 |
| Maximum Image Height | 5.50 | 5.50 | 5.50 |
| Total Lens Length | 295.15 | 295.15 | 295.15 |
| BF | 7.61 | 7.61 | 7.61 |
| d11 | 0.84 | 26.25 | 37.14 |
| d13 | 0.80 | 11.85 | 16.58 |
| d20 | 54.64 | 8.55 | 7.08 |
| d25 | 6.00 | 11.08 | 1.47 |
| d29 | 0.99 | 5.55 | 0.99 |

Zoom Lens Unit Data

| Unit | Beginning Surface | Focal length |
|---|---|---|
| 1 | 1 | 71.16 |
| 2 | 12 | 465.08 |
| 3 | 14 | −13.85 |
| 4 | 21 | −38.11 |
| 5 | 26 | 51.34 |
| 6 | 30 | 58.21 |

NUMERICAL EXAMPLE 3

Unit mm

Surface Data

| Surface Number | r | d | nd | vd | θn |
|---|---|---|---|---|---|
| 1 | −179.20204 | 3.00000 | 1.780000 | 35.00 | 0.5789 |
| 2 | 214.45553 | 6.25994 | | | |
| 3 | 1145.86122 | 2.60000 | 1.750000 | 38.70 | 0.5739 |
| 4 | 534.08740 | 8.32163 | 1.438750 | 94.93 | 0.5340 |
| 5 | −202.46792 | 0.15000 | | | |
| 6 | 472.92945 | 10.07982 | 1.433870 | 95.10 | 0.5373 |
| 7 | −126.91571 | 7.61363 | | | |
| 8 | 568.80572 | 5.64502 | 1.433870 | 95.10 | 0.5373 |
| 9 | −238.36149 | 4.04812 | | | |
| 10 | −109.04107 | 2.40000 | 1.820000 | 30.00 | 0.5889 |
| 11 | −139.92318 | 0.15000 | | | |
| 12 | 136.36909 | 8.51069 | 1.595220 | 67.74 | 0.5442 |
| 13 | −243.13806 | 0.42875 | | | |
| 14 | 58.53939 | 4.91210 | 1.677900 | 55.34 | 0.5472 |
| 15 | 95.52890 | (variable) | | | |
| 16* | 312.07186 | 1.00000 | 2.003300 | 28.27 | 0.5980 |
| 17 | 16.51807 | 5.39790 | | | |
| 18 | −36.24253 | 5.06400 | 1.808095 | 22.76 | 0.6307 |
| 19 | −13.32745 | 0.75000 | 1.882997 | 40.76 | 0.5667 |
| 20 | 75.76826 | 0.30000 | | | |
| 21 | 49.44978 | 3.29006 | 1.808095 | 22.76 | 0.6307 |
| 22 | −79.37355 | (variable) | | | |
| 23 | −73.59175 | 0.75000 | 1.882997 | 40.76 | 0.5667 |
| 24 | 49.16246 | 2.86332 | 1.808095 | 22.76 | 0.6307 |
| 25 | −216.35096 | 1.39753 | | | |
| 26 | −42.72625 | 0.75000 | 1.729157 | 54.68 | 0.5444 |
| 27 | −152.13691 | (variable) | | | |
| 28* | 52.74031 | 6.03983 | 1.696797 | 55.53 | 0.5434 |
| 29 | −73.07985 | (variable) | | | |
| 30 (stop) | ∞ | 0.15000 | | | |
| 31 | 198.03957 | 6.26231 | 1.531717 | 48.84 | 0.5631 |

-continued

Unit mm

| | | | | | |
|---|---|---|---|---|---|
| 32 | −33.74830 | 1.00000 | 1.953750 | 32.32 | 0.5898 |
| 33 | −62.99153 | 36.20000 | | | |
| 34 | 161.58142 | 4.45838 | 1.487490 | 70.23 | 0.5300 |
| 35 | −48.29628 | 1.06919 | | | |
| 36 | −132.43954 | 1.00000 | 1.882997 | 40.76 | 0.5667 |
| 37 | 51.14043 | 6.00990 | 1.487490 | 70.23 | 0.5300 |
| 38 | −46.57763 | 0.17248 | | | |
| 39 | 51.00506 | 7.12662 | 1.516330 | 64.14 | 0.5353 |
| 40 | −31.19093 | 1.00000 | 1.882997 | 40.76 | 0.5667 |
| 41 | 227.87206 | 1.65739 | | | |
| 42 | 35.78375 | 5.63723 | 1.487490 | 70.23 | 0.5300 |
| 43 | −545.32525 | 4.50000 | | | |
| 44 | ∞ | 33.00000 | 1.608590 | 46.44 | 0.5664 |
| 45 | ∞ | 13.20000 | 1.516330 | 64.14 | 0.5353 |
| 46 | ∞ | 7.04000 | | | |
| Image plane | ∞ | | | | |

Aspheric Surface Data

Sixteenth Surface k = 1.11360e+002 A4 = 8.41551e−006 A6 = −2.06210e−008
A8 = 2.00704e−011 A10 = 1.54336e−014 A12 = 2.25478e−017

Twenty-eighth Surface k = −2.16968e+000 A4 = −3.76175e−006 A6 = 4.78154e−009
A8 = −1.40476e−011 A10 = 4.88467e−014 A12 = −7.47817e−017

Various Pieces of Data
Zoom Ratio 19.00

| | Wide-Angle | Intermediate | Telephoto |
|---|---|---|---|
| Focal Length | 8.00 | 34.88 | 152.04 |
| F-number | 1.87 | 1.87 | 2.50 |
| Half Angle of View | 34.51 | 8.96 | 2.07 |
| Maximum Image Height | 5.50 | 5.50 | 5.50 |
| Total Lens Length | 294.40 | 294.40 | 294.40 |
| BF | 7.04 | 7.04 | 7.04 |
| d15 | 1.20 | 41.02 | 58.90 |
| d22 | 58.50 | 6.42 | 10.87 |
| d27 | 4.27 | 11.80 | 2.14 |
| d29 | 9.23 | 13.96 | 1.28 |

Zoom Lens Unit Data

| Unit | Beginning Surface | Focal length |
|---|---|---|
| 1 | 1 | 72.81 |
| 2 | 16 | −14.46 |
| 3 | 23 | −44.64 |
| 4 | 28 | 44.85 |
| 5 | 30 | 53.44 |

NUMERICAL EXAMPLE 4

Unit mm

Surface Data

| Surface Number | r | d | nd | vd | θn |
|---|---|---|---|---|---|
| 1 | −184.62674 | 2.80000 | 1.780000 | 35.00 | 0.5789 |
| 2 | 161.33799 | 1.59190 | | | |
| 3 | 169.21378 | 5.26012 | 1.959060 | 17.47 | 0.6598 |
| 4 | 359.87032 | 1.78363 | | | |
| 5 | 274.59482 | 13.42127 | 1.603112 | 60.64 | 0.5415 |
| 6* | −144.49958 | 8.66656 | | | |
| 7 | 179.83736 | 2.50000 | 1.820000 | 30.00 | 0.5889 |
| 8 | 71.73612 | 9.76671 | 1.438750 | 94.66 | 0.5340 |
| 9 | 454.46933 | 6.48386 | | | |
| 10 | 116.83736 | 8.54810 | 1.433870 | 95.10 | 0.5373 |

-continued

Unit mm

| | | | | | |
|---|---|---|---|---|---|
| 11 | −580.25367 | 0.20000 | | | |
| 12 | 73.82528 | 10.17214 | 1.595220 | 67.74 | 0.5442 |
| 13 | 2885.66374 | (variable) | | | |
| 14 | 5263.28585 | 0.95000 | 1.755000 | 52.32 | 0.5474 |
| 15 | 19.99726 | 7.19181 | | | |
| 16 | −40.83729 | 0.75000 | 1.496999 | 81.54 | 0.5375 |
| 17 | 101.67746 | 5.45381 | 1.8200000 | 30.00 | 0.5889 |
| 18 | −27.21652 | 1.00010 | | | |
| 19 | −23.37486 | 1.20000 | 1.772499 | 49.60 | 0.5520 |
| 20* | −192.21142 | (variable) | | | |
| 21 | −50.00817 | 4.08311 | 1.808095 | 22.76 | 0.6307 |
| 22 | −23.73340 | 1.10000 | 1.780000 | 35.00 | 0.5789 |
| 23 | −238.30156 | (variable) | | | |
| 24 (stop) | ∞ | 2.00000 | | | |
| 25* | 68.11180 | 8.21411 | 1.639999 | 60.08 | 0.5370 |
| 26 | −65.59900 | 0.19805 | | | |
| 27 | 48.47486 | 1.10000 | 1.854780 | 24.80 | 0.6122 |
| 28 | 34.48154 | 5.01315 | 1.487490 | 70.23 | 0.5300 |
| 29 | 71.48023 | (variable) | | | |
| 30 | 817.93839 | 5.57323 | 1.487490 | 70.23 | 0.5300 |
| 31 | −41.44402 | 1.20000 | 2.001000 | 29.14 | 0.5997 |
| 32 | 190.18723 | 0.25652 | | | |
| 33 | 99.02405 | 5.41336 | 1.8200000 | 30.00 | 0.5889 |
| 34 | −76.55576 | 43.66984 | | | |
| 35 | 663.06846 | 6.72396 | 1.438750 | 94.66 | 0.5340 |
| 36 | −55.94902 | 0.99715 | | | |
| 37 | 49.59918 | 10.08380 | 1.808095 | 22.76 | 0.6307 |
| 38 | −40.11579 | 0.90000 | 1.953750 | 32.32 | 0.5905 |
| 39 | 31.52829 | 1.39447 | | | |
| 40 | 29.44285 | 12.67395 | 1.487490 | 70.23 | 0.5300 |
| 41 | −29.33726 | 1.00000 | 2.001000 | 29.14 | 0.5997 |
| 42 | 121.97392 | 0.06634 | | | |
| 43 | 58.88742 | 6.99728 | 1.780000 | 35.00 | 0.5789 |
| 44 | −101.53582 | 41.96000 | | | |
| Image plane | ∞ | | | | |

Aspheric Surface Data

Sixth Surface k = −1.42891e+001 A4 = −5.01906e−007 A6 = 1.64033e−010
A8 = −5.28726e−014 A10 = 1.20803e−017 A12 = −1.28744e−021

Twentieth Surface k = 1.20439e+002 A4 = −6.59748e−006 A6 = −4.26777e−009
A8 = 1.27445e−011 A10 = −5.18298e−014 A12 = 1.34440e−016

Twenty-fifth Surface k = −8.37457e−001 A4 = −2.15233e−006 A6 = 5.10862e−010
A8 = 1.46311e−012 A10 = −5.00426e−015 A12 = 4.82310e−018

Various Pieces of Data
Zoom Ratio 9.62

| | Wide-Angle | Intermediate | Telephoto |
|---|---|---|---|
| Focal Length | 25.99 | 79.93 | 249.99 |
| F-number | 2.73 | 2.73 | 3.67 |
| Half Angle of View | 29.65 | 10.49 | 3.39 |
| Maximum Image Height | 14.80 | 14.80 | 14.80 |
| Total Lens Length | 313.88 | 313.88 | 313.88 |
| BF | 41.96 | 41.96 | 41.96 |
| d13 | 1.39 | 35.80 | 53.53 |
| d20 | 47.07 | 3.95 | 2.57 |
| d23 | 9.33 | 19.07 | 0.98 |
| d29 | 7.74 | 6.70 | 8.45 |

Zoom Lens Unit Data

| Unit | Beginning Surface | Focal length |
|---|---|---|
| 1 | 1 | 83.92 |
| 2 | 14 | −21.11 |
| 3 | 21 | −86.88 |
| 4 | 24 | 50.50 |
| 5 | 30 | 118.34 |

NUMERICAL EXAMPLE 5

Unit mm

Surface Data

| Surface Number | r | d | nd | vd | θn |
|---|---|---|---|---|---|
| 1 | −410.90301 | 2.20000 | 1.780000 | 35.00 | 0.5789 |
| 2 | 72.33718 | 1.32451 | | | |
| 3 | 74.21341 | 23.73801 | 1.433870 | 95.10 | 0.5373 |
| 4 | −92.96069 | 11.52441 | | | |
| 5 | 82.31845 | 10.43059 | 1.592400 | 68.30 | 0.5456 |
| 6 | −314.06785 | 0.15000 | | | |
| 7 | 59.18678 | 3.27925 | 1.763850 | 48.49 | 0.5589 |
| 8 | 83.64088 | (variable) | | | |
| 9 | 75.64379 | 0.90000 | 1.882997 | 40.76 | 0.5667 |
| 10 | 17.50614 | 4.26893 | | | |
| 11 | −36.57881 | 5.80444 | 1.808095 | 22.76 | 0.6307 |
| 12 | −12.49063 | 0.70000 | 1.882997 | 40.76 | 0.5667 |
| 13 | 56.26671 | 0.20000 | | | |
| 14 | 38.31295 | 2.37280 | 1.666800 | 33.05 | 0.5957 |
| 15 | 571.58114 | (variable) | | | |
| 16 | −26.16746 | 0.70000 | 1.756998 | 47.82 | 0.5565 |
| 17 | 41.34955 | 2.39204 | 1.846490 | 23.90 | 0.6217 |
| 18 | 1510.43396 | (variable) | | | |
| 19 (stop) | ∞ | 2.30000 | | | |
| 20 | −210.73026 | 3.07797 | 1.638539 | 55.38 | 0.5484 |
| 21 | −34.65762 | 0.15000 | | | |
| 22 | 110.97692 | 1.75519 | 1.568832 | 56.36 | 0.5489 |
| 23 | 265.80108 | 0.04585 | | | |
| 24 | 54.81863 | 5.61394 | 1.517417 | 52.43 | 0.5564 |
| 25 | −29.04157 | 0.90000 | 1.834807 | 42.71 | 0.5642 |
| 26 | −69.19488 | (variable) | | | |
| 27 | 54.52663 | 5.63300 | 1.496999 | 81.54 | 0.5375 |
| 28 | −39.87740 | 3.20273 | | | |
| 29 | −38.79021 | 1.40000 | 1.834030 | 37.20 | 0.5775 |
| 30 | 52.01068 | 6.40229 | 1.487490 | 70.23 | 0.5300 |
| 31 | −39.99135 | 0.14452 | | | |
| 32 | 71.80203 | 6.63161 | 1.501270 | 56.50 | 0.5536 |
| 33 | −30.20975 | 1.40000 | 1.834807 | 42.71 | 0.5642 |
| 34 | −196.73740 | 0.14948 | | | |
| 35 | 42.60210 | 4.76513 | 1.501270 | 56.50 | 0.5536 |
| 36 | −125.90882 | 4.00000 | | | |
| 37 | ∞ | 33.00000 | 1.608590 | 46.44 | 0.5664 |
| 38 | ∞ | 13.20000 | 1.516330 | 64.14 | 0.5353 |
| 39 | ∞ | 7.47000 | | | |
| Image plane | ∞ | | | | |

Various Pieces of Data
Zoom Ratio 17.00

| | Wide-Angle | Intermediate | Telephoto |
|---|---|---|---|
| Focal Length | 8.00 | 32.77 | 136.00 |
| F-number | 1.90 | 1.90 | 2.50 |
| Half Angle of View | 34.51 | 9.53 | 2.32 |
| Maximum Image Height | 5.50 | 5.50 | 5.50 |
| Total Lens Length | 267.93 | 267.93 | 267.93 |
| BF | 7.47 | 7.47 | 7.47 |
| d8 | 0.79 | 39.16 | 59.08 |
| d15 | 48.69 | 4.75 | 3.58 |
| d18 | 2.48 | 9.15 | 1.45 |
| d26 | 44.73 | 43.65 | 32.60 |

Zoom Lens Unit Data

| Unit | Beginning Surface | Focal length |
|---|---|---|
| 1 | 1 | 74.51 |
| 2 | 9 | −14.02 |
| 3 | 16 | −36.60 |
| 4 | 19 | 34.87 |
| 5 | 27 | 48.32 |

NUMERICAL EXAMPLE 6

Unit mm

Surface Data

| Surface-Number | r | d | nd | vd | θn |
|---|---|---|---|---|---|
| 1 | 409.19748 | 3.00000 | 1.780000 | 35.00 | 0.5789 |
| 2 | 146.05686 | 1.07300 | | | |
| 3 | 146.62324 | 13.58698 | 1.438750 | 94.93 | 0.5340 |
| 4 | −2000.89272 | 11.15000 | | | |
| 5 | 176.90502 | 7.31101 | 1.496999 | 81.54 | 0.5375 |
| 6 | 642.09606 | 0.20000 | | | |
| 7 | 164.00945 | 8.14483 | 1.496999 | 81.54 | 0.5375 |
| 8 | 760.50287 | 0.20000 | | | |
| 9 | 150.15352 | 6.60666 | 1.496999 | 81.54 | 0.5375 |
| 10 | 362.62493 | (variable) | | | |
| 11 | 212.43495 | 1.00000 | 2.003300 | 28.27 | 0.5980 |
| 12 | 23.63162 | 7.54348 | | | |
| 13 | −38.61056 | 0.90000 | 1.816000 | 46.62 | 0.5568 |
| 14 | 254.37113 | 0.70000 | | | |
| 15 | 66.58599 | 4.66748 | 1.922860 | 18.90 | 0.6495 |
| 16 | −63.93812 | (variable) | | | |
| 17 | −84.82044 | 1.10000 | 1.816000 | 46.62 | 0.5568 |
| 18 | −637.40158 | (variable) | | | |
| 19 | −46.25608 | 1.30000 | 1.717004 | 47.92 | 0.5605 |
| 20 | 60.42386 | 3.40831 | 1.846490 | 23.90 | 0.6217 |
| 21 | 525.86703 | (variable) | | | |
| 22 (stop) | ∞ | 3.96745 | | | |
| 23 | 226.67058 | 6.75742 | 1.607379 | 56.81 | 0.5483 |
| 24 | −52.36155 | 0.15000 | | | |
| 25 | 3180.72058 | 3.29188 | 1.518229 | 58.90 | 0.5457 |
| 26 | −125.09849 | 0.35000 | | | |
| 27 | 39.06865 | 9.43204 | 1.487490 | 70.23 | 0.5300 |
| 28 | −98.06367 | 1.50000 | 1.834000 | 37.17 | 0.5774 |
| 29 | −2415.03003 | 0.15000 | | | |
| 30 | 36.73108 | 8.30910 | 1.487490 | 70.23 | 0.5300 |
| 31 | −86.27365 | 1.50000 | 1.882997 | 40.76 | 0.5667 |
| 32 | 30.30129 | 50.00000 | | | |
| 33 | −120.62916 | 4.64093 | 1.517417 | 52.43 | 0.5564 |
| 34 | −35.36457 | 2.54355 | | | |
| 35 | 63.07563 | 1.20000 | 1.785896 | 44.20 | 0.5631 |
| 36 | 31.79036 | 6.49533 | 1.517417 | 52.43 | 0.5564 |
| 37 | −109.65039 | 2.01000 | | | |
| 38 | 76.16107 | 5.44373 | 1.517417 | 52.43 | 0.5564 |
| 39 | −36.25647 | 1.20000 | 1.834807 | 42.71 | 0.5642 |
| 40 | 48.07162 | 0.66799 | | | |
| 41 | 33.72522 | 4.04093 | 1.487490 | 70.23 | 0.5300 |
| 42 | 1827.86184 | 3.80000 | | | |
| 43 | ∞ | 34.37500 | 1.608590 | 46.44 | 0.5664 |
| 44 | ∞ | 13.75000 | 1.516800 | 64.17 | 0.5347 |
| 45 | ∞ | 9.06000 | | | |
| Image plane | ∞ | | | | |

Various Pieces of Data
Zoom Ratio 40.00

| | Wide-Angle | Intermediate | Telephoto |
|---|---|---|---|
| Focal Length | 11.00 | 70.00 | 440.00 |
| F-number | 2.10 | 2.09 | 4.10 |
| Half Angle of View | 26.57 | 4.49 | 0.72 |
| Maximum Image Height | 5.50 | 5.50 | 5.50 |
| Total Lens Length | 393.47 | 393.47 | 393.47 |
| BF | 9.06 | 9.06 | 9.06 |
| d10 | 0.70 | 94.66 | 124.33 |
| d16 | 0.50 | 6.33 | 9.60 |
| d18 | 135.73 | 24.21 | 11.22 |
| d21 | 10.01 | 21.74 | 1.79 |

Zoom Lens Unit Data

| Unit | Beginning Surface | Focal length |
|---|---|---|
| 1 | 1 | 161.84 |
| 2 | 11 | −34.91 |
| 3 | 17 | −120.01 |
| 4 | 19 | −66.60 |
| 5 | 22 | 84.48 |

NUMERICAL EXAMPLE 7

Unit mm

Surface Data

| Surface number | r | d | nd | vd | θn |
|---|---|---|---|---|---|
| 1 | 209.32984 | 6.31714 | 1.433870 | 95.10 | 0.5373 |
| 2 | 474.22245 | 1.00000 | | | |
| 3 | 347.11126 | 3.00000 | 1.780000 | 35.00 | 0.5789 |
| 4 | 152.71844 | 1.07300 | | | |
| 5 | 151.83756 | 13.71420 | 1.433870 | 95.10 | 0.5373 |
| 6 | −6703.78707 | 11.15000 | | | |
| 7 | 193.32468 | 5.76352 | 1.433870 | 95.10 | 0.5373 |
| 8 | 394.02019 | 0.20000 | | | |
| 9 | 161.82291 | 7.05454 | 1.433870 | 95.10 | 0.5373 |
| 10 | 428.58712 | 0.20000 | | | |
| 11 | 114.45039 | 8.72462 | 1.433870 | 95.10 | 0.5373 |
| 12 | 293.07570 | (variable) | | | |
| 13 | 143.35190 | 1.00000 | 1.8200000 | 30.00 | 0.5889 |
| 14 | 20.63614 | 8.39150 | | | |
| 15 | −38.70595 | 0.90000 | 1.772499 | 49.60 | 0.5520 |
| 16 | 61.00280 | 0.70000 | | | |
| 17 | 41.60677 | 6.08619 | 1.808095 | 22.76 | 0.6307 |
| 18 | −41.74740 | (variable) | | | |
| 19 | −32.03677 | 1.10000 | 1.772499 | 49.60 | 0.5520 |
| 20 | −152.80126 | (variable) | | | |
| 21 | −55.39789 | 1.30000 | 1.712995 | 53.87 | 0.5459 |
| 22 | 36.80706 | 3.69041 | 1.8200000 | 30.00 | 0.5889 |
| 23 | 171.15423 | (variable) | | | |
| 24 | 317.00372 | 4.40217 | 1.750000 | 38.70 | 0.5739 |
| 25 | −63.43641 | 0.15000 | | | |
| 26 | −395.89092 | 2.76330 | 1.518229 | 58.90 | 0.5457 |
| 27 | −88.41583 | (variable) | | | |
| 28 (stop) | ∞ | 1.00000 | | | |
| 29 | 45.62539 | 9.43204 | 1.750000 | 38.70 | 0.5739 |
| 30 | −54.96926 | 1.50000 | 2.001000 | 29.14 | 0.5997 |
| 31 | 45.48066 | 0.15000 | | | |
| 32 | 41.15552 | 8.30910 | 1.487490 | 70.23 | 0.5300 |
| 33 | −68.52630 | 1.50000 | 1.882997 | 40.76 | 0.5667 |
| 34 | −517.91192 | 50.00000 | | | |
| 35 | 73.93174 | 4.64093 | 1.517417 | 52.43 | 0.5564 |
| 36 | −71.94432 | 2.54355 | | | |
| 37 | 151.18446 | 1.20000 | 1.785896 | 44.20 | 0.5631 |
| 38 | 23.63163 | 6.49533 | 1.517417 | 52.43 | 0.5564 |
| 39 | −193.59512 | 2.01000 | | | |
| 40 | −99.96630 | 5.44373 | 1.517417 | 52.43 | 0.5564 |
| 41 | −44.85034 | 1.20000 | 1.834807 | 42.71 | 0.5642 |
| 42 | −156.66018 | 0.66799 | | | |
| 43 | 38.21542 | 4.04093 | 1.487490 | 70.23 | 0.5300 |
| 44 | −821.71042 | 3.80000 | | | |
| 45 | ∞ | 34.37500 | 1.608590 | 46.44 | 0.5664 |
| 46 | ∞ | 13.75000 | 1.516800 | 64.17 | 0.5347 |
| 47 | ∞ | 7.00000 | | | |
| Image plane | ∞ | | | | |

Various Pieces of Data
Zoom Ratio 40.00

| | Wide-Angle | Intermediate | Telephoto |
|---|---|---|---|
| Focal Length | 11.00 | 69.83 | 440.00 |
| F-number | 2.10 | 2.10 | 4.10 |
| Half Angle of View | 26.57 | 4.50 | 0.72 |
| Maximum Image Height | 5.50 | 5.50 | 5.50 |
| Total Lens Length | 387.37 | 387.37 | 387.37 |
| BF | 7.00 | 7.00 | 7.00 |
| d12 | 10.00 | 89.17 | 116.99 |

-continued

| Unit mm | | | |
|---|---|---|---|
| d18 | 0.94 | 8.63 | 3.33 |
| d20 | 115.14 | 10.62 | 16.47 |
| d23 | 10.04 | 25.42 | 1.83 |
| d27 | 3.50 | 5.78 | 1.00 |

| Zoom Lens Unit Data | | |
|---|---|---|
| Unit | Beginning Surface | Focal length |
| 1 | 1 | 161.84 |
| 2 | 13 | −50.20 |
| 3 | 19 | −52.68 |
| 4 | 21 | −66.60 |
| 5 | 24 | 54.06 |
| 6 | 28 | 70.35 |

NUMERICAL EXAMPLE 8

| Unit mm | | | | | |
|---|---|---|---|---|---|
| Surface Data | | | | | |
| Surface Number | r | d | nd | vd | θn |
| 1 | 175.29861 | 13.02521 | 1.487490 | 70.23 | 0.5300 |
| 2 | 1225.56363 | 1.20000 | | | |
| 3 | 190.57806 | 4.00000 | 1.780000 | 35.00 | 0.5789 |
| 4 | 115.03011 | 15.73697 | 1.496999 | 81.54 | 0.5375 |
| 5 | 506.42514 | 13.83539 | | | |
| 6 | 406.54765 | 6.45593 | 1.496999 | 81.54 | 0.5375 |
| 7 | −65407.61823 | 0.20000 | | | |
| 8 | 169.76758 | 13.45862 | 1.496999 | 81.54 | 0.5375 |
| 9 | −612.09531 | 2.50000 | 1.750000 | 38.70 | 0.5739 |
| 10 | 883.28901 | 1.77924 | | | |
| 11 | 1592.38188 | 6.60747 | 1.808095 | 22.76 | 0.6307 |
| 12 | −403.02815 | 2.20000 | 1.780000 | 35.00 | 0.5789 |
| 13 | 332.37754 | (variable) | | | |
| 14* | 28536.73538 | 1.20000 | 1.772499 | 49.60 | 0.5520 |
| 15 | 27.61593 | 6.55911 | | | |
| 16 | −35.57294 | 1.00000 | 1.618000 | 63.33 | 0.5441 |
| 17 | 110.91020 | 6.15671 | 1.720467 | 34.71 | 0.5834 |
| 18 | −40.92138 | 2.15731 | | | |
| 19 | −32.78059 | 1.00000 | 1.618000 | 63.33 | 0.5441 |
| 20 | 230.87937 | 0.20000 | | | |
| 21 | 87.97878 | 4.89169 | 1.548141 | 45.79 | 0.5686 |
| 22 | −61.15693 | (variable) | | | |
| 23 | −78.57973 | 1.00000 | 1.729157 | 54.68 | 0.5444 |
| 24 | 177.93879 | 3.38966 | 1.846660 | 23.78 | 0.6205 |
| 25 | −1158.20864 | (variable) | | | |
| 26 | 60.67685 | 7.80758 | 1.593490 | 67.00 | 0.5361 |
| 27* | −172.34540 | 1.00000 | | | |
| 28 | 61.00053 | 10.05482 | 1.595220 | 67.74 | 0.5442 |
| 29 | −107.01734 | 3.00000 | | | |
| 30 (stop) | ∞ | 3.00000 | | | |
| 31 | −251.16821 | 6.55628 | 1.438750 | 94.93 | 0.5340 |
| 32 | −44.51986 | 1.20000 | 2.003300 | 28.27 | 0.5980 |
| 33 | 134.91442 | 0.19993 | | | |
| 34 | 45.19789 | 9.49846 | 1.567322 | 42.82 | 0.5731 |
| 35 | −57.80392 | 6.20300 | | | |
| 36 | −65.98767 | 1.20000 | 2.001000 | 29.13 | 0.5997 |
| 37 | 21.95410 | 8.52134 | 1.846660 | 23.78 | 0.6205 |
| 38 | −204.07645 | 50.00007 | | | |
| 39 | 32.10904 | 4.05742 | 1.487490 | 70.23 | 0.5300 |
| 40 | 635.41379 | 2.99982 | | | |
| 41 | −31.32836 | 1.00000 | 1.882997 | 40.76 | 0.5667 |
| 42 | 28.34148 | 9.67384 | 1.717362 | 29.52 | 0.6047 |
| 43 | −25.86996 | 1.99982 | | | |
| 44 | −20.65002 | 1.00000 | 1.953750 | 32.32 | 0.5898 |
| 45 | −6.00000 | 6.19011 | 1.517417 | 52.43 | 0.5564 |
| 46 | −19.86035 | 52.03000 | | | |
| Image plane | ∞ | | | | |

| Unit mm | | | |
|---|---|---|---|
| Aspheric Surface Data | | | |
| Fourteenth Surface | | | | k = 3.96531e+006 A4 = 2.00795e−006 A6 = −4.55579e−010
A8 = −1.45968e−011 A10 = 4.52454e−014 A12 = 2.70002e−016
A14 = −2.07763e−018 A16 = 3.31413e−021
Twenty-seventh Surface k = −7.21603e+000 A4 = 1.14045e−006 A6 = 4.27683e−010
A8 = −1.22698e−012 A10 = 4.65837e−015 A12 = −8.08521e−018
A14 = 7.16653e−021 A16 = −2.32227e−024

| Various Pieces of Data Zoom Ratio 18.00 | | | |
|---|---|---|---|
| | Wide-Angle | Intermediate | Telephoto |
| Focal Length | 50.00 | 212.50 | 900.00 |
| F-number | 4.50 | 4.50 | 7.00 |
| Half Angle of View | 17.59 | 4.27 | 1.01 |
| Maximum Image Height | 15.85 | 15.85 | 15.85 |
| Total Lens Length | 437.38 | 437.38 | 437.38 |
| BF | 52.03 | 52.03 | 52.03 |
| d13 | 1.00 | 90.94 | 128.61 |
| d22 | 135.63 | 25.28 | 11.53 |
| d25 | 5.00 | 25.41 | 1.50 |

| Zoom Lens Unit Data | | |
|---|---|---|
| Unit | Beginning Surface | Focal length |
| 1 | 1 | 225.00 |
| 2 | 14 | −33.00 |
| 3 | 23 | −127.08 |
| 4 | 26 | 63.15 |

NUMERICAL EXAMPLE 9

| Unit mm | | | | | |
|---|---|---|---|---|---|
| Surface Data | | | | | |
| Surface Number | r | d | nd | vd | θn |
| 1 | 195.38134 | 15.00550 | 1.501372 | 56.42 | 0.5533 |
| 2 | −9114.51344 | 1.00000 | | | |
| 3 | 117.58628 | 3.40000 | 1.780000 | 35.00 | 0.5789 |
| 4 | 103.81496 | 16.77261 | | | |
| 5 | 345.63354 | 8.63166 | 1.433870 | 95.10 | 0.5373 |
| 6 | −11207.35422 | 8.43828 | | | |
| 7 | −333.25337 | 3.20000 | 1.780000 | 35.00 | 0.5789 |
| 8 | 767.57239 | 18.85831 | | | |
| 9 | 219.31219 | 13.48008 | 1.433870 | 95.10 | 0.5373 |
| 10 | −553.69039 | 0.20000 | | | |
| 11 | 209.02044 | 11.44026 | 1.433870 | 95.10 | 0.5373 |
| 12 | −3375.17877 | (variable) | | | |
| 13* | 1117.65326 | 1.20000 | 1.772499 | 49.60 | 0.5520 |
| 14 | 31.32339 | 4.94426 | | | |
| 15 | 713.45616 | 1.00000 | 1.639999 | 60.08 | 0.5370 |
| 16 | 30.51380 | 6.77227 | 1.698947 | 30.13 | 0.6030 |
| 17 | −166.67241 | 3.67765 | | | |
| 18 | −37.65931 | 1.00000 | 1.639999 | 60.08 | 0.5370 |
| 19 | −1778.19608 | 0.20000 | | | |
| 20 | 83.60624 | 2.55707 | 1.548141 | 45.79 | 0.5686 |
| 21 | 370.14480 | (variable) | | | |
| 22 | −79.94517 | 1.00000 | 1.729157 | 54.68 | 0.5444 |
| 23 | 185.30720 | 3.37474 | 1.846660 | 23.78 | 0.6205 |
| 24 | −1239.24712 | (variable) | | | |
| 25 | 74.65994 | 8.59212 | 1.593490 | 67.00 | 0.5361 |
| 26* | −84.11144 | 1.00000 | | | |
| 27 | 52.93079 | 8.43564 | 1.595220 | 67.74 | 0.5442 |

-continued

Unit mm

| | | | | | |
|---|---|---|---|---|---|
| 28 | −165.88659 | 3.00000 | | | |
| 29 (stop) | ∞ | 3.00000 | | | |
| 30 | −643.28580 | 5.51286 | 1.438750 | 94.93 | 0.5340 |
| 31 | −46.64153 | 1.20000 | 2.003300 | 28.27 | 0.5980 |
| 32 | 127.23272 | 0.80695 | | | |
| 33 | 39.09173 | 9.00869 | 1.567322 | 42.82 | 0.5731 |
| 34 | −73.31451 | 4.14686 | | | |
| 35 | −157.47173 | 1.20000 | 2.001000 | 29.13 | 0.5997 |
| 36 | 18.70055 | 7.34989 | 1.846660 | 23.78 | 0.6205 |
| 37 | 126.18608 | 35.60404 | | | |
| 38 | 42.98024 | 3.67643 | 1.487490 | 70.23 | 0.5300 |
| 39 | 1300.79180 | 5.73693 | | | |
| 40 | −45.45609 | 1.00000 | 1.882997 | 40.76 | 0.5667 |
| 41 | 16.36431 | 8.74504 | 1.717362 | 29.52 | 0.6047 |
| 42 | −24.46558 | 4.51806 | | | |
| 43 | −16.01659 | 1.00000 | 1.953750 | 32.32 | 0.5898 |
| 44 | −6.00000 | 9.66997 | 1.517417 | 52.43 | 0.5564 |
| 45 | −17.02589 | 43.99000 | | | |
| Image plane | ∞ | | | | |

Aspheric Surface Data

Thirteenth Surface k = 3.44331e+003 A4 = 1.80008e−006 A6 = −6.73718e−010
A8 = 1.21114e−012 A10 = −9.37216e−014 A12 = 7.97471e−016
A14 = −2.89883e−018 A16 = 3.82921e−021

Twenty-sixth Surface k = −1.09267e+000 A4 = 6.74620e−007 A6 = 2.79436e−010
A8 = −1.09108e−012 A10 = 3.31209e−015 A12 = −3.80796e−018
A14 = 3.87840e−022 A16 = 1.66073e−024

Various Pieces of Data
Zoom Ratio 18.00

| | Wide-Angle | Intermediate | Telephoto |
|---|---|---|---|
| Focal Length | 50.00 | 212.50 | 900.00 |
| F-number | 4.50 | 4.50 | 7.00 |
| Half Angle of View | 17.59 | 4.27 | 1.01 |
| Maximum Image Height | 15.85 | 15.85 | 15.85 |
| Total Lens Length | 449.44 | 449.44 | 449.44 |
| BF | 43.99 | 43.99 | 43.99 |
| d12 | 10.00 | 101.36 | 140.54 |
| d21 | 142.54 | 28.89 | 13.36 |
| d24 | 3.55 | 25.83 | 2.19 |

Zoom Lens Unit Data

| Unit | Beginning Surface | Focal length |
|---|---|---|
| 1 | 1 | 225.00 |
| 2 | 13 | −33.00 |
| 3 | 22 | −128.44 |
| 4 | 25 | 53.08 |

NUMERICAL EXAMPLE 10

Unit mm

Surface Data

| Surface Number | r | d | nd | vd | θn |
|---|---|---|---|---|---|
| 1 | −2942.38402 | 6.00000 | 1.780000 | 35.00 | 0.5789 |
| 2 | 455.96827 | 1.80000 | | | |
| 3 | 476.46315 | 20.51381 | 1.433870 | 95.10 | 0.5373 |
| 4 | −864.91844 | 0.20000 | | | |
| 5 | 1443.29044 | 9.56692 | 1.433870 | 95.10 | 0.5373 |
| 6 | −1563.92493 | 24.67208 | | | |
| 7 | 368.34148 | 18.71387 | 1.433870 | 95.10 | 0.5373 |

-continued

Unit mm

| | | | | | |
|---|---|---|---|---|---|
| 8 | −2366.35267 | 0.25000 | | | |
| 9 | 280.76097 | 16.54069 | 1.433870 | 95.10 | 0.5373 |
| 10 | 1380.19285 | 1.49961 | | | |
| 11 | 181.87517 | 16.11602 | 1.438750 | 94.66 | 0.5340 |
| 12 | 389.48234 | (variable) | | | |
| 13* | −183.19617 | 2.20000 | 2.003300 | 28.27 | 0.5980 |
| 14 | 40.06445 | 10.65857 | | | |
| 15 | −54.78201 | 1.45000 | 1.743198 | 49.34 | 0.5531 |
| 16 | 54.49115 | 10.41345 | 1.892860 | 20.36 | 0.6393 |
| 17 | −52.49079 | 2.49318 | | | |
| 18 | −43.02823 | 2.00000 | 1.750000 | 38.70 | 0.5739 |
| 19 | −220.43662 | (variable) | | | |
| 20 | 126.27934 | 11.06637 | 1.729157 | 54.68 | 0.5444 |
| 21* | −438.17318 | 1.50182 | | | |
| 22 | 206.97718 | 9.25264 | 1.438750 | 94.66 | 0.5340 |
| 23 | −338.92315 | 0.49893 | | | |
| 24 | 325.12044 | 2.60000 | 1.820000 | 30.00 | 0.5889 |
| 25 | 102.14024 | (variable) | | | |
| 26 | 83.90109 | 13.38904 | 1.595220 | 67.74 | 0.5442 |
| 27 | −683.57694 | 0.50000 | | | |
| 28 | 150.11737 | 2.50000 | 1.820000 | 30.00 | 0.5889 |
| 29 | 53.29917 | 15.94535 | 1.603112 | 60.64 | 0.5415 |
| 30* | −528.81810 | (variable) | | | |
| 31 (stop) | ∞ | 4.39326 | | | |
| 32 | −371.39305 | 1.40000 | 1.750000 | 38.70 | 0.5739 |
| 33 | 33.26689 | 1.90955 | | | |
| 34 | 37.07323 | 3.77886 | 1.922860 | 18.90 | 0.6495 |
| 35 | 92.94545 | 4.89016 | | | |
| 36 | −50.92272 | 1.70000 | 1.804000 | 46.53 | 0.5577 |
| 37 | −91.80566 | 7.51742 | | | |
| 38 | −105.11690 | 1.50000 | 1.755000 | 52.32 | 0.5474 |
| 39 | 29.57304 | 5.92896 | 1.820000 | 30.00 | 0.5889 |
| 40 | −958.59817 | 5.50025 | | | |
| 41 | −1325.04373 | 1.50000 | 1.891900 | 37.13 | 0.5780 |
| 42 | 30.42156 | 8.20965 | 1.516330 | 64.14 | 0.5353 |
| 43 | −66.31658 | 10.44276 | | | |
| 44 | −123.25455 | 5.01086 | 1.517417 | 52.43 | 0.5564 |
| 45 | −36.95171 | 1.39991 | | | |
| 46 | 151.29827 | 1.50000 | 1.882997 | 40.76 | 0.5667 |
| 47 | 29.21807 | 8.11616 | 1.487490 | 70.23 | 0.5300 |
| 48 | −130.14789 | 0.20000 | | | |
| 49 | 237.73596 | 7.86978 | 1.517417 | 52.43 | 0.5564 |
| 50 | −28.38399 | 1.50000 | 1.882997 | 40.76 | 0.5667 |
| 51 | −116.54877 | 0.20000 | | | |
| 52 | 151.23020 | 7.79229 | 1.539956 | 59.46 | 0.5441 |
| 53 | −34.31623 | 10.00000 | | | |
| 54 | ∞ | 33.00000 | 1.608590 | 46.44 | 0.5664 |
| 55 | ∞ | 13.20000 | 1.516330 | 64.15 | 0.5352 |
| 56 | ∞ | 13.28000 | | | |
| Image plane | ∞ | | | | |

Aspheric Surface Data

Thirteenth Surface k = −2.00000e+000 A4 = 2.28984e−006 A6 = −9.44314e−009
A8 = −3.44572e−010 A10 = 7.02571e−013 A12 = 2.68307e−015
A14 = 1.22424e−018 A16 = 6.53287e−022 A3 = −1.01427e−006
A5 = −6.18783e−008 A7 = 3.27127e−009 A9 = 1.11823e−011
A11 = −7.63056e−014 A13 = −4.75146e−017 A15 = −4.55830e−020

Twenty-first Surface k = 7.70304e+001 A4 = 2.46498e−007 A6 = −7.51804e−010
A8 = 6.36514e−013 A10 = 1.98322e−015 A12 = −2.39938e−019
A14 = −2.73292e−023 A16 = −8.43867e−027 A3 = 9.79642e−008
A5 = 1.00468e−008 A7 = 2.20170e−011 A9 = −6.81118e−014
A11 = −1.73758e−017 A13 = 4.99918e−021 A15 = 6.30137e−025

Thirtieth Surface k = −4.44825e+001 A4 = 6.05419e−007 A6 = 7.50451e−009
A8 = 2.62817e−011 A10 = 2.31488e−015 A12 = 2.74876e−018
A14 = −2.38649e−020 A16 = −4.92666e−024 A3 = −6.85947e−007
A5 = −6.08981e−008 A7 = −5.70644e−010 A9 = −6.12821e−013
A11 = 6.63462e−017 A13 = 2.61088e−019 A15 = 5.91643e−022

| Unit mm | | | |
|---|---|---|---|
| Various Pieces of Data Zoom Ratio 120.00 | | | |
| | Wide-Angle | Intermediate | Telephoto |
| Focal Length | 8.50 | 94.20 | 1020.00 |
| F-number | 1.75 | 1.75 | 5.30 |
| Half Angle of View | 32.91 | 3.34 | 0.31 |
| Maximum Image Height | 5.50 | 5.50 | 5.50 |
| Total Lens Length | 663.91 | 663.91 | 663.91 |
| BF | 13.28 | 13.28 | 13.28 |
| d12 | 4.15 | 154.42 | 189.67 |
| d19 | 291.17 | 108.08 | 2.00 |
| d25 | 1.52 | 6.08 | 1.81 |
| d30 | 2.99 | 31.25 | 106.35 |

| Zoom Lens Unit Data | | |
|---|---|---|
| Unit | Beginning Surface | Focal length |
| 1 | 1 | 251.50 |
| 2 | 13 | −24.65 |
| 3 | 20 | 171.95 |
| 4 | 26 | 97.72 |
| 5 | 31 | 41.07 |

NUMERICAL EXAMPLE 11

| Unit mm | | | | |
|---|---|---|---|---|
| Surface Data | | | | |
| Surface Number | r | d | nd | vd | θn |
| 1 | 790.57847 | 6.00000 | 1.780000 | 35.00 | 0.5789 |
| 2 | 286.92848 | 6.50183 | | | |
| 3 | 383.28258 | 9.74832 | 1.433870 | 95.10 | 0.5373 |
| 4 | 748.63368 | 0.20000 | | | |
| 5 | 503.37189 | 6.00000 | 1.750000 | 38.70 | 0.5739 |
| 6 | 350.15087 | 0.79177 | | | |
| 7 | 313.98012 | 19.55003 | 1.433870 | 95.10 | 0.5373 |
| 8 | −4785.35686 | 34.30338 | | | |
| 9 | 297.16324 | 22.39834 | 1.433870 | 95.10 | 0.5373 |
| 10 | −2589.27209 | 0.25000 | | | |
| 11 | 273.04684 | 20.24743 | 1.433870 | 95.10 | 0.5373 |
| 12 | 19706.34491 | 1.20000 | | | |
| 13 | 197.86162 | 12.35525 | 1.496999 | 81.54 | 0.5375 |
| 14 | 356.57017 | (variable) | | | |
| 15* | 485.94160 | 2.35000 | 1.882997 | 40.76 | 0.5667 |
| 16 | 52.73191 | 8.46075 | | | |
| 17 | −157.59273 | 1.45000 | 1.816000 | 46.62 | 0.5568 |
| 18 | 38.08990 | 10.29119 | 1.808095 | 22.76 | 0.6307 |
| 19 | −193.45360 | 3.78132 | | | |
| 20 | −51.06655 | 2.00000 | 1.696797 | 55.53 | 0.5434 |
| 21 | 671.69351 | (variable) | | | |
| 22* | 510.14056 | 12.47239 | 1.603112 | 60.64 | 0.5415 |
| 23 | −104.04262 | 1.29103 | | | |
| 24 | 178.75600 | 13.08137 | 1.496999 | 81.54 | 0.5375 |
| 25 | −142.39939 | 5.79140 | | | |
| 26 | −145.77790 | 2.50000 | 1.780000 | 35.00 | 0.5789 |
| 27 | 97.47668 | 10.49747 | 1.496999 | 81.54 | 0.5375 |
| 28 | 32141.35787 | (variable) | | | |
| 29 | 235.85666 | 14.10652 | 1.618000 | 63.33 | 0.5441 |
| 30 | −96.38872 | (variable) | | | |
| 31 (stop) | ∞ | 4.90749 | | | |
| 32 | −72.13544 | 1.80000 | 1.816000 | 46.62 | 0.5568 |
| 33 | 60.43089 | 5.13557 | 1.808095 | 22.76 | 0.6307 |
| 34 | −237.28216 | 7.55722 | | | |
| 35 | −28.78125 | 1.49977 | 1.816000 | 46.62 | 0.5568 |
| 36 | 72.49578 | 10.08032 | 1.548141 | 45.79 | 0.5686 |
| 37 | −28.55262 | 16.01812 | | | |
| 38 | 194.31854 | 9.07524 | 1.531717 | 48.84 | 0.5631 |
| 39 | −44.35136 | 1.49161 | | | |
| 40 | −104.49421 | 1.50000 | 1.882997 | 40.76 | 0.5667 |
| 41 | 50.24421 | 8.69548 | 1.518229 | 58.90 | 0.5457 |
| 42 | −42.76309 | 0.49453 | | | |
| 43 | 151.55145 | 6.51018 | 1.496999 | 81.54 | 0.5375 |
| 44 | −36.61436 | 1.50000 | 1.882997 | 40.76 | 0.5667 |
| 45 | −449.26887 | 1.00055 | | | |
| 46 | 79.39231 | 5.73260 | 1.522494 | 59.84 | 0.5440 |
| 47 | −95.94112 | 10.00000 | | | |
| 48 | ∞ | 33.00000 | 1.608590 | 46.44 | 0.5664 |
| 49 | ∞ | 13.20000 | 1.516330 | 64.14 | 0.5353 |
| 50 | ∞ | 13.35000 | | | |
| Image plane | ∞ | | | | |

Aspheric Surface Data

Fifteenth Surface k = −4.57299e+002 A4 = 9.54749e−007 A6 = −3.59161e−010
A8 = 1.80055e−013

Twenty-second Surface k = 1.35216e+001 A4 = −4.61173e−007 A6 = 4.52239e−013
A8 = −5.28204e−015

| Various Pieces of Data Zoom Ratio 80.00 | | | |
|---|---|---|---|
| | Wide-Angle | Intermediate | Telephoto |
| Focal Length | 10.00 | 89.73 | 799.97 |
| F-number | 1.80 | 1.80 | 4.20 |
| Half Angle of View | 28.81 | 3.51 | 0.39 |
| Maximum Image Height | 5.50 | 5.50 | 5.50 |
| Total Lens Length | 686.82 | 686.82 | 686.82 |
| BF | 13.35 | 13.35 | 13.35 |
| d14 | 2.70 | 139.21 | 176.67 |
| d21 | 288.09 | 114.84 | 2.91 |
| d28 | 4.10 | 6.84 | 6.84 |
| d30 | 11.76 | 45.76 | 120.23 |

| Zoom Lens Unit Data | | |
|---|---|---|
| Unit | Beginning Surface | Focal length |
| 1 | 1 | 246.00 |
| 2 | 15 | −28.50 |
| 3 | 22 | 166.28 |
| 4 | 29 | 112.55 |
| 5 | 31 | 60.19 |

NUMERICAL EXAMPLE 12

| Unit mm | | | | | |
|---|---|---|---|---|---|
| Surface Data | | | | | |
| Surface Number | r | d | nd | vd | θn |
| 1* | 1244.02894 | 2.70000 | 1.780000 | 35.00 | 0.5738 |
| 2 | 39.79177 | 28.09076 | | | |
| 3 | −74.47429 | 2.10000 | 1.804000 | 46.53 | 0.5577 |
| 4 | −245.81962 | 0.14311 | | | |
| 5 | 113.48607 | 3.90695 | 1.922860 | 20.88 | 0.6391 |
| 6 | 199.94102 | 1.99483 | | | |
| 7 | 130.45092 | 13.51443 | 1.496999 | 81.54 | 0.5375 |
| 8* | −86.60278 | 6.23401 | | | |
| 9 | 104.57965 | 2.00000 | 1.788800 | 28.43 | 0.6009 |
| 10 | 49.93673 | 18.20778 | 1.438750 | 94.66 | 0.5340 |
| 11 | −226.07228 | 0.28790 | | | |
| 12 | 209.60007 | 10.12345 | 1.433870 | 95.10 | 0.5373 |
| 13 | −108.79424 | 0.28428 | | | |

-continued

Unit mm

| | | | | | |
|---|---|---|---|---|---|
| 14 | 79.25694 | 7.55936 | 1.763850 | 48.49 | 0.5589 |
| 15 | 558.93233 | (variable) | | | |
| 16* | 677.68797 | 0.95000 | 2.001000 | 29.14 | 0.5997 |
| 17 | 15.79124 | 4.09736 | | | |
| 18 | −137.54275 | 7.05376 | 1.858956 | 22.73 | 0.6284 |
| 19 | −12.26043 | 0.70000 | 1.882997 | 40.76 | 0.5667 |
| 20 | 66.65285 | 0.29992 | | | |
| 21 | 28.34308 | 2.77994 | 1.639799 | 34.46 | 0.5922 |
| 22 | 154.65433 | (variable) | | | |
| 23 | −30.81641 | 0.80000 | 1.755000 | 52.32 | 0.5474 |
| 24 | 39.77462 | 2.69578 | 1.854780 | 24.80 | 0.6122 |
| 25 | 1801.54900 | (variable) | | | |
| 26* | 220.65497 | 4.31014 | 1.639999 | 60.08 | 0.5370 |
| 27 | −58.41781 | 0.20000 | | | |
| 28 | 65.59473 | 6.47225 | 1.567322 | 42.82 | 0.5731 |
| 29 | −38.72412 | 1.00000 | 2.001000 | 29.14 | 0.5997 |
| 30 | −88.78539 | (variable) | | | |
| 31 (stop) | ∞ | 39.87835 | | | |
| 32 | −264.24230 | 3.38208 | 1.805181 | 25.42 | 0.6161 |
| 33 | −61.15815 | 2.46515 | | | |
| 34 | 54.62273 | 0.90000 | 1.882997 | 40.76 | 0.5667 |
| 35 | 21.57624 | 4.43070 | 1.516330 | 64.14 | 0.5353 |
| 36 | 46.31677 | 0.19247 | | | |
| 37 | 28.92113 | 9.32412 | 1.438750 | 94.66 | 0.5340 |
| 38 | −28.74656 | 0.90000 | 2.001000 | 29.14 | 0.5997 |
| 39 | −119.84045 | 0.24932 | | | |
| 40 | 56.68323 | 5.65932 | 1.487490 | 70.23 | 0.5300 |
| 41 | −44.63381 | 4.00000 | | | |
| 42 | ∞ | 33.00000 | 1.608590 | 46.44 | 0.5664 |
| 43 | ∞ | 13.20000 | 1.516330 | 64.14 | 0.5353 |
| 44 | ∞ | 7.41000 | | | |
| Image plane | ∞ | | | | |

Aspheric Surface Data

First Surface k = 1.90832e+000 A4 = 2.36984e−006 A6 = 1.02720e−008
A8 = −1.81997e−011 A10 = −6.72853e−015 A12 = −4.67153e−019
A14 = 5.33623e−022 A16 = 3.34185e−025 A3 = −1.97237e−006
A5 = −1.80667e−007 A7 = −7.55755e−011 A9 = 7.50829e−013
A11 = −1.22958e−016 A13 = 7.67174e−020 A15 = −3.96658e−023
Eighth Surface k = 9.13029e−001 A4 = 1.03418e−006 A6 = −4.73263e−009
A8 = −2.57729e−011 A10 = −4.63932e−015 A12 = 6.14400e−018
A14 = 8.53285e−021 A16 = 2.27079e−024 A3 = −2.42943e−007
A5 = 1.76385e−008 A7 = 4.80881e−010 A9 = 7.10827e−013
A11 = −2.54130e−016 A13 = −1.40921e−019 A15 = −2.40485e−022
Sixteenth Surface k = 1.98879e+000 A4 = 1.20367e−005 A6 = 2.85062e−007
A8 = 1.02974e−008 A10 = 5.98804e−010 A12 = 7.96570e−012
A14 = −3.43191e−014 A16 = −8.65687e−017 A3 = 5.34324e−006
A5 = −1.45608e−006 A7 = −5.88687e−008 A9 = −2.34753e−009
A11 = −9.61860e−011 A13 = −1.44111e−013 A15 = 3.11704e−015
Twenty-sixth Surface k = −7.41958e−001 A4 = −1.55337e−006 A6 = 1.50645e−009
A8 = −1.46354e−012

Various Pieces of Data
Zoom Ratio 20.00

| | Wide-Angle | Intermediate | Telephoto |
|---|---|---|---|
| Focal Length | 5.00 | 25.00 | 100.00 |
| F-number | 1.80 | 1.80 | 2.95 |
| Half Angle of View | 47.73 | 12.41 | 3.15 |
| Maximum Image Height | 5.50 | 5.50 | 5.50 |
| Total Lens Length | 321.47 | 321.47 | 321.47 |
| BF | 7.41 | 7.41 | 7.41 |
| d15 | 0.70 | 42.71 | 55.37 |
| d22 | 37.13 | 3.34 | 3.21 |
| d25 | 13.24 | 17.23 | 1.69 |
| d30 | 16.89 | 4.70 | 7.70 |

-continued

Unit mm

Zoom Lens Unit Data

| Unit | Beginning Surface | Focal length |
|---|---|---|
| 1 | 1 | 40.24 |
| 2 | 16 | −15.48 |
| 3 | 23 | −44.53 |
| 4 | 26 | 44.65 |
| 5 | 31 | 50.05 |

NUMERICAL EXAMPLE 13

Unit mm

Surface Data

| Surface-Number | r | d | nd | vd | θn |
|---|---|---|---|---|---|
| 1* | −833.89380 | 4.70000 | 1.696797 | 55.53 | 0.5434 |
| 2 | 108.45398 | 40.00000 | | | |
| 3 | −329.66862 | 4.50000 | 1.696797 | 55.53 | 0.5434 |
| 4 | 639.01355 | 0.50000 | | | |
| 5 | 257.36581 | 16.00000 | 1.805181 | 25.42 | 0.6161 |
| 6 | 3949.46449 | 5.14617 | | | |
| 7 | −862.89243 | 15.00000 | 1.496999 | 81.54 | 0.5375 |
| 8 | −197.63370 | 0.50000 | | | |
| 9 | 897.13521 | 4.40000 | 1.805181 | 25.42 | 0.6161 |
| 10 | 234.37281 | 16.50000 | 1.496999 | 81.54 | 0.5375 |
| 11 | −544.38238 | 32.56358 | | | |
| 12 | 374.46092 | 14.00000 | 1.496999 | 81.54 | 0.5375 |
| 13 | −694.41871 | 0.20000 | | | |
| 14 | 219.81393 | 4.40000 | 1.780000 | 35.00 | 0.5789 |
| 15 | 119.68642 | 1.00000 | | | |
| 16 | 121.78439 | 31.00000 | 1.496999 | 81.54 | 0.5375 |
| 17* | −536.91343 | 0.20000 | | | |
| 18 | 224.64823 | 15.00000 | 1.6520411 | 60.29 | 0.5427 |
| 19 | −2476.00268 | (variable) | | | |
| 20 | 129.42474 | 1.50000 | 2.003300 | 28.27 | 0.5980 |
| 21 | 68.83326 | 6.89982 | | | |
| 22 | −200.59165 | 1.50000 | 1.729157 | 54.68 | 0.5444 |
| 23 | 41.77592 | 10.45708 | 1.846660 | 23.78 | 0.6205 |
| 24 | −106.13437 | 1.50000 | 1.729157 | 54.68 | 0.5444 |
| 25 | 86.71459 | 6.25454 | | | |
| 26 | −81.26395 | 1.50000 | 1.882997 | 40.76 | 0.5667 |
| 27 | 227.62743 | (variable) | | | |
| 28 | 600.75417 | 6.75242 | 1.620411 | 60.29 | 0.5427 |
| 29 | −114.14793 | 0.15000 | | | |
| 30 | 117.66770 | 11.70590 | 1.487490 | 70.23 | 0.5300 |
| 31 | −75.55843 | 0.09304 | | | |
| 32 | −76.87444 | 1.60000 | 1.805181 | 25.42 | 0.6161 |
| 33 | −134.82035 | 0.15000 | | | |
| 34 | 86.22575 | 1.60000 | 1.805181 | 25.42 | 0.6161 |
| 35 | 48.80482 | 10.30397 | 1.487490 | 70.23 | 0.5300 |
| 36 | 2324.27135 | 0.15000 | | | |
| 37 | 94.55226 | 6.65369 | 1.620411 | 60.29 | 0.5427 |
| 38 | −6865.35846 | (variable) | | | |
| 39 (stop) | ∞ | 3.42001 | | | |
| 40 | −89.88811 | 1.50000 | 1.788001 | 47.37 | 0.5559 |
| 41 | 26.67244 | 7.10685 | 1.805181 | 25.42 | 0.6161 |
| 42 | −58.85672 | 1.50000 | 1.788001 | 47.37 | 0.5559 |
| 43 | 56.58919 | 5.93408 | | | |
| 44 | −23.35100 | 19.74135 | 1.772499 | 49.60 | 0.5520 |
| 45 | −29.88021 | 8.40424 | | | |
| 46 | −24.94065 | 1.50000 | 1.438750 | 94.93 | 0.5340 |
| 47 | −774.85414 | 9.02093 | 1.487490 | 70.23 | 0.5300 |
| 48 | −33.79981 | 3.00004 | | | |
| 49 | 167.39522 | 1.50000 | 1.800999 | 34.97 | 0.5864 |
| 50 | 33.41937 | 12.63564 | 1.496999 | 81.54 | 0.5375 |
| 51 | −44.37588 | 3.00000 | | | |
| 52 | 58.00924 | 11.37172 | 1.496999 | 81.54 | 0.5375 |
| 53 | −28.32891 | 1.50000 | 2.003300 | 28.27 | 0.5980 |
| 54 | −96.06088 | 2.78374 | | | |
| 55 | −48.20062 | 4.99928 | 1.892860 | 20.36 | 0.6393 |

-continued

Unit mm

| | | | | |
|---|---|---|---|---|
| 56 | −32.78420 | 7.99999 | | |
| 57 | ∞ | 33.00000 | 1.608590 | 46.44 0.5664 |
| 58 | ∞ | 13.20000 | 1.516330 | 64.15 0.5352 |
| 59 | ∞ | 10.00000 | | |
| Image plane | ∞ | | | |

Aspheric Surface Data

First Surface k = ∞e+000 A4 = 4.74644e−008 A6 = −1.05357e−012

Seventeenth Surface k = ∞e+000 A4 =−4.76686e−009 A6 = −7.38883e−013

Various Pieces of Data
Zoom Ratio 27.00

| | Wide-Angle | Intermediate | Telephoto |
|---|---|---|---|
| Focal Length | 6.70 | 28.66 | 180.90 |
| F-number | 1.50 | 11.50 | 2.20 |
| Half Angle of View | 39.38 | 10.86 | 1.74 |
| Maximum Image Height | 5.50 | 5.50 | 5.50 |
| Total Lens Length | 616.17 | 616.17 | 616.17 |
| BF | 10.00 | 10.00 | 10.00 |
| d19 | 3.93 | 83.93 | 126.22 |
| d27 | 173.43 | 880.39 | 4.41 |
| d38 | 1.30 | 814.35 | 48.04 |

Zoom Lens Unit Data

| Unit | Beginning Surface | Focal length |
|---|---|---|
| 1 | 1 | 120.59 |
| 2 | 20 | −30.00 |
| 3 | 28 | 50.00 |
| 4 | 39 | 31.76 |

NUMERICAL EXAMPLE 14

Unit mm
Surface Data

| Surface Number | r | d | nd | vd | θn |
|---|---|---|---|---|---|
| 1 | 173.04168 | 3.00000 | 1.820000 | 30.00 | 0.5889 |
| 2 | 51.16285 | 23.69287 | | | |
| 3 | −96.58688 | 2.50000 | 1.755000 | 52.32 | 0.5474 |
| 4 | 544.22466 | 0.19704 | | | |
| 5 | 115.67589 | 6.06429 | 1.959060 | 17.47 | 0.6598 |
| 6 | 300.36142 | 4.86350 | | | |
| 7 | −1329.71166 | 7.27013 | 1.651597 | 58.55 | 0.5425 |
| 8 | −133.67807 | 0.20000 | | | |
| 9 | −452.09114 | 4.65675 | 1.595220 | 67.74 | 0.5442 |
| 10 | −160.80420 | 8.66201 | | | |
| 11 | −170.88504 | 6.46656 | 1.595220 | 67.74 | 0.5442 |
| 12 | −76.93914 | 0.99766 | | | |
| 13 | −72.30987 | 2.50000 | 1.780000 | 35.00 | 0.5788 |
| 14 | −123.53002 | 0.20000 | | | |
| 15 | 130.18028 | 2.00000 | 1.846660 | 23.78 | 0.6205 |
| 16 | 63.86580 | 13.00429 | 1.496999 | 81.54 | 0.5375 |
| 17 | −283.65409 | 0.20000 | | | |
| 18 | 120.56566 | 9.46925 | 1.487490 | 70.23 | 0.5300 |
| 19 | −163.79254 | 0.20000 | | | |
| 20 | 62.63192 | 6.25108 | 1.763850 | 48.49 | 0.5589 |
| 21 | 136.72640 | (variable) | | | |
| 22* | 147.89239 | 1.20000 | 1.882997 | 40.76 | 0.5667 |
| 23 | 21.51599 | 6.38054 | | | |
| 24 | −132.55366 | 4.33940 | 1.846660 | 23.78 | 0.6205 |
| 25 | −31.64003 | 0.80000 | 1.772499 | 49.60 | 0.5520 |
| 26 | −65.34615 | (variable) | | | |
| 27 | −25.08825 | 0.80000 | 1.851500 | 40.78 | 0.5695 |
| 28 | 1848.10057 | 0.16000 | | | |
| 29 | 110.53518 | 3.31174 | 1.846660 | 23.78 | 0.6205 |
| 30 | −77.48939 | (variable) | | | |
| 31 | −31.69732 | 0.90000 | 1.696797 | 55.53 | 0.5434 |
| 32 | 103.95508 | 2.46844 | 1.808095 | 22.76 | 0.6307 |
| 33 | −274.30699 | (variable) | | | |
| 34 (stop) | ∞ | 1.29823 | | | |
| 35 | −278310.25377 | 6.35146 | 1.804000 | 46.53 | 0.5577 |
| 36 | −47.70664 | 0.20000 | | | |
| 37 | 205.54910 | 4.00000 | 1.589130 | 61.14 | 0.5407 |
| 38 | −137.08735 | 0.20000 | | | |
| 39 | 72.74151 | 7.66920 | 1.496999 | 81.54 | 0.5375 |
| 40 | −44.38084 | 1.20000 | 1.846660 | 23.78 | 0.6205 |
| 41 | 2190.88595 | 0.19952 | | | |
| 42 | 29.60944 | 6.09495 | 1.517417 | 52.43 | 0.5564 |
| 43 | 61.15145 | 1.10000 | 1.772499 | 49.60 | 0.5520 |
| 44 | 41.76351 | 30.00042 | | | |
| 45 | −4989.75382 | 5.57069 | 1.805181 | 25.42 | 0.6161 |
| 46 | −28.91850 | 0.90000 | 1.882997 | 40.76 | 0.5667 |
| 47 | −121.51235 | 13.56345 | | | |
| 48 | 116.59027 | 6.77104 | 1.496999 | 81.54 | 0.5375 |
| 49 | −21.92404 | 1.00000 | 2.003300 | 28.27 | 0.5980 |
| 50 | −193.11532 | 7.21499 | | | |
| 51 | 54.84116 | 6.90874 | 1.487490 | 70.23 | 0.5300 |
| 52 | −63.40902 | 40.0000 | | | |
| Image plane | ∞ | | | | |

Aspheric Surface Data

Twenty-second Surface k = 4.64304e+001 A4 = 3.79999e−006 A6 = −6.53615e−009
A8 = −4.29758e−013

Various Pieces of Data
Zoom Ratio 6.50

| | Wide-Angle | Intermediate | Telephoto |
|---|---|---|---|
| Focal Length | 18.50 | 36.92 | 120.25 |
| F-number | 2.80 | 2.80 | 3.44 |
| Half Angle of View | 40.05 | 22.84 | 7.37 |
| Maximum Image Height | 15.55 | 15.55 | 15.55 |
| Total Lens Length | 312.43 | 312.43 | 312.43 |
| BF | 40.00 | 40.00 | 40.00 |
| d21 | 0.27 | 20.45 | 40.63 |
| d26 | 2.39 | 3.83 | 4.61 |
| d30 | 39.84 | 15.58 | 3.14 |
| d33 | 6.92 | 9.57 | 1.06 |

Zoom Lens Unit Data

| Unit | Beginning Surface | Focal length |
|---|---|---|
| 1 | 1 | 46.11 |
| 2 | 22 | −42.03 |
| 3 | 27 | −66.97 |
| 4 | 31 | −56.03 |
| 5 | 34 | 52.71 |

NUMERICAL EXAMPLE 15

Unit mm
Surface Data

| Surface Number | r | d | nd | vd | θn |
|---|---|---|---|---|---|
| 1 | −658.82797 | 2.50000 | 1.696797 | 55.53 | 0.5434 |
| 2 | 64.49827 | 5.53338 | 1.761821 | 26.52 | 0.6136 |

-continued

Unit mm

| | | | | | |
|---|---|---|---|---|---|
| 3 | 114.88822 | 4.11270 | | | |
| 4 | −529.58804 | 2.50000 | 2.003300 | 28.27 | 0.5980 |
| 5 | 335.18776 | 2.50000 | | | |
| 6 | 155.28809 | 3.00000 | 1.805181 | 25.42 | 0.6161 |
| 7 | 68.01964 | 9.69736 | 1.589130 | 61.14 | 0.5407 |
| 8 | −229.09667 | 13.83526 | | | |
| 9 | 79.26444 | 2.85000 | 1.750000 | 35.00 | 0.5788 |
| 10 | 77.33014 | 1.57847 | | | |
| 11 | 104.57459 | 9.04891 | 1.496999 | 81.54 | 0.5375 |
| 12 | −134.10375 | 0.19000 | | | |
| 13 | 100.62765 | 5.68359 | 1.496999 | 81.54 | 0.5375 |
| 14 | 1010.24105 | 0.19000 | | | |
| 15 | 60.11331 | 5.59697 | 1.487490 | 70.23 | 0.5300 |
| 16 | 133.60172 | (variable) | | | |
| 17 | 130.41370 | 1.42500 | 1.772499 | 49.60 | 0.5520 |
| 18 | 25.43428 | 5.05115 | | | |
| 19 | −80.71243 | 1.33000 | 1.589130 | 61.14 | 0.5407 |
| 20 | 71.33862 | 1.14000 | | | |
| 21 | 39.71282 | 4.79460 | 1.846660 | 23.78 | 0.6205 |
| 22 | −492.15038 | 2.38984 | | | |
| 23 | −44.09832 | 1.23500 | 1.729157 | 54.68 | 0.5444 |
| 24 | 204.53054 | (variable) | | | |
| 25 | 160.20766 | 1.20000 | 1.834000 | 37.16 | 0.5776 |
| 26 | 59.69764 | 5.35002 | 1.496999 | 81.54 | 0.5375 |
| 27 | −81.72927 | 0.20000 | | | |
| 28 | 109.57425 | 3.45438 | 1.651597 | 58.55 | 0.5425 |
| 29 | −330.86043 | (variable) | | | |
| 30 (stop) | ∞ | 2.78138 | | | |
| 31 | 26.64024 | 9.64842 | 1.589130 | 61.14 | 0.5407 |
| 32 | 1086.14206 | 10.00000 | | | |
| 33 | −52.54393 | 4.08354 | 1.903660 | 31.34 | 0.5963 |
| 34 | −21.55847 | 1.03762 | 1.738000 | 32.26 | 0.5899 |
| 35 | 24.78539 | 4.43317 | | | |
| 36 | 46.15269 | 6.62073 | 1.496999 | 81.54 | 0.5375 |
| 37 | −23.00000 | 1.49239 | | | |
| 38 | −18.34882 | 1.03762 | 1.772499 | 49.60 | 0.5520 |
| 39 | −45.28514 | 3.86300 | | | |
| 40 | 503.02067 | 7.91264 | 1.589130 | 61.14 | 0.5407 |
| 41 | −41.39046 | 43.92000 | | | |
| Image plane | ∞ | | | | |

Various Pieces of Data
Zoom Ratio 3.00

| | Wide-Angle | Intermediate | Telephoto |
|---|---|---|---|
| Focal Length | 40.00 | 76.00 | 120.00 |
| F-number | 2.80 | 2.80 | 2.80 |
| Half Angle of View | 21.24 | 11.56 | 7.38 |
| Maximum Image Height | 15.55 | 15.55 | 15.55 |
| Total Lens Length | 233.79 | 233.79 | 233.79 |
| BF | 43.92 | 43.92 | 43.92 |
| d16 | 1.50 | 23.29 | 31.88 |
| d24 | 29.08 | 16.52 | 1.50 |
| d29 | 10.00 | 0.78 | 7.20 |

Zoom Lens Unit Data

| Unit | Beginning Surface | Focal length |
|---|---|---|
| 1 | 1 | 68.00 |
| 2 | 17 | −25.00 |
| 3 | 25 | 74.00 |
| 4 | 30 | 90.09 |

NUMERICAL EXAMPLE 16

Unit mm

Surface Data

| Surface Number | r | d | nd | vd | θn |
|---|---|---|---|---|---|
| 1* | 103.79514 | 2.35000 | 1.750000 | 38.70 | 0.5738 |
| 2 | 30.85658 | 16.40738 | | | |
| 3 | 196.60637 | 1.90000 | 1.651597 | 58.55 | 0.5425 |
| 4 | 44.99592 | 7.68165 | | | |
| 5 | 498.04019 | 1.90000 | 1.651597 | 58.55 | 0.5425 |
| 6 | 84.92209 | 2.82816 | | | |
| 7 | 56.13763 | 4.39801 | 1.922860 | 18.90 | 0.6495 |
| 8 | 126.13711 | 3.75466 | | | |
| 9 | 16859.92060 | 4.62359 | 1.603112 | 60.64 | 0.5415 |
| 10 | −103.28713 | 11.98451 | | | |
| 11 | 131.16506 | 1.50000 | 1.854780 | 24.80 | 0.6122 |
| 12 | 37.06702 | 6.76677 | 1.496999 | 81.54 | 0.5375 |
| 13 | −287.61984 | 0.20000 | | | |
| 14 | 68.00038 | 6.14764 | 1.729157 | 54.68 | 0.5444 |
| 15 | −89.27800 | (variable) | | | |
| 16 | −117.13481 | 1.00000 | 1.834807 | 42.73 | 0.5648 |
| 17 | 31.16589 | 3.75661 | | | |
| 18 | −53.87755 | 1.00000 | 1.438750 | 94.93 | 0.5340 |
| 19 | 30.33852 | 2.84665 | 1.854780 | 24.80 | 0.6122 |
| 20 | 90.35387 | (variable) | | | |
| 21 (stop) | ∞ | 1.27237 | | | |
| 22 | 40.99171 | 3.73439 | 1.583126 | 59.38 | 0.5423 |
| 23* | −1409.31036 | (variable) | | | |
| 24 | 37.59129 | 1.15000 | 2.001000 | 29.13 | 0.5997 |
| 25 | 22.79043 | 0.20000 | | | |
| 26 | 22.54349 | 5.94390 | 1.487490 | 70.23 | 0.5300 |
| 27 | −66.37511 | (variable) | | | |
| 28 | −753.03792 | 1.15000 | 1.953750 | 32.32 | 0.5898 |
| 29 | 33.38156 | 2.84120 | 1.959060 | 17.47 | 0.6598 |
| 30 | 72.84342 | variable) | | | |
| 31 | −1225.06503 | 4.30280 | 1.496999 | 81.54 | 0.5375 |
| 32 | −41.33420 | (variable) | | | |
| 33 | 70.54836 | 4.51910 | 1.496999 | 81.54 | 0.5375 |
| 34 | −157.46993 | 1.00000 | | | |
| 35 | −355.37534 | 4.89312 | 1.496999 | 81.54 | 0.5375 |
| 36 | −37.46084 | 1.30000 | 2.001000 | 29.13 | 0.5997 |
| 37 | −125.74633 | 46.01000 | | | |
| Image plane | ∞ | | | | |

Aspheric Surface Data

First Surface k = −1.81170e+000 A4 = 1.59561e−006 A6 = −2.14920e−010
A8 = 1.13491e−013
Twenty-third Surface k = ∞e+000 A4 = 4.02936e−006 A6 = −1.28229e−009
A8 = 6.75741e−012

Various Pieces of Data
Zoom Ratio 5.00

| | Wide-Angle | Intermediate | Telephoto |
|---|---|---|---|
| Focal Length | 14.00 | 29.99 | 70.00 |
| F-number | 4.00 | 4.00 | 4.00 |
| Half Angle of View | 48.00 | 27.41 | 12.52 |
| Maximum Image Height | 15.55 | 15.55 | 15.55 |
| Total Lens Length | 247.22 | 247.22 | 247.22 |
| BF | 46.01 | 46.01 | 46.01 |
| d15 | 0.86 | 22.76 | 41.91 |
| d20 | 43.02 | 21.11 | 1.96 |
| d23 | 19.47 | 8.41 | 0.91 |
| d27 | 1.68 | 12.73 | 20.24 |
| d30 | 22.64 | 12.92 | 1.68 |
| d32 | 0.20 | 9.92 | 21.16 |

-continued

Unit mm

Zoom Lens Unit Data

| Unit | Beginning Surface | Focal length |
|---|---|---|
| 1 | 1 | 43.89 |
| 2 | 16 | −25.85 |
| 3 | 21 | 68.37 |
| 4 | 24 | 84.31 |
| 5 | 28 | −69.91 |
| 6 | 31 | 85.97 |
| 7 | 33 | 279.08 |

TABLE 1

| Conditional expression number | Example 1 First lens | Example 2 First lens & Second lens | Example 3 First lens | Example 3 Second lens | Example 3 Sixth lens |
|---|---|---|---|---|---|
| (1) | 1.78000 | 1.78000 | 1.78000 | 1.75000 | 1.82000 |
| (2) | 35.00 | 35.00 | 35.00 | 38.70 | 30.000 |
| (3) | −0.0060 | −0.0060 | −0.0060 | −0.0050 | −0.0041 |
| (4) | 2.717 | 2.717 | 2.717 | 2.457 | 3.170 |
| (5) | 3.5 | 3.5 | 3.5 | 3.3 | 3.7 |
| (6) | 4.52 | 5.14 | | 5.04 | |

| Conditional expression number | Example 4 First lens | Example 4 Fourth lens | Example 5 First lens | Example 6 First lens | Example 7 Second lens |
|---|---|---|---|---|---|
| (1) | 1.78000 | 1.82000 | 1.78000 | 1.78000 | 1.78000 |
| (2) | 35.00 | 30.000 | 35.00 | 35.00 | 35.00 |
| (3) | −0.0060 | −0.0041 | −0.0060 | −0.0060 | −0.0060 |
| (4) | 2.717 | 3.170 | 2.717 | 2.712 | 2.717 |
| (5) | 3.5 | 3.7 | 3.5 | 3.5 | 3.5 |
| (6) | 3.98 | | 5.31 | 4.64 | 3.22 |

| Conditional expression number | Example 8 Second lens | Example 8 Sixth lens | Example 8 Eighth lens | Example 9 Second lens & Fourth lens | Example 10 First lens |
|---|---|---|---|---|---|
| (1) | 1.78000 | 1.75000 | 1.78000 | 1.78000 | 1.78000 |
| (2) | 35.00 | 38.70 | 35.00 | 35.00 | 35.00 |
| (3) | −0.0060 | −0.0050 | −0.0060 | −0.0060 | −0.0060 |
| (4) | 2.330 | 2.107 | 2.330 | 2.717 | 2.717 |
| (5) | 3.5 | 3.3 | 3.5 | 3.5 | 3.5 |
| (6) | | 6.82 | | 6.82 | 10.20 |

| Conditional expression number | Example 11 First lens | Example 11 Third lens |
|---|---|---|
| (1) | 1.78000 | 1.75000 |
| (2) | 35.00 | 38.70 |
| (3) | −0.0060 | −0.0050 |
| (4) | 2.717 | 2.457 |
| (5) | 3.5 | 3.3 |
| (6) | 8.63 | |

TABLE 2

| Conditional expression number | Example 12 First lens | Example 13 Eighth lens | Example 14 First lens | Example 14 Seventh lens | Example 15 Sixth lens | Example 16 First lens |
|---|---|---|---|---|---|---|
| (1) | 1.78000 | 1.78000 | 1.82000 | 1.78000 | 1.78000 | 1.75000 |
| (2) | 35.00 | 35.00 | 30.00 | 35.00 | 35.00 | 38.70 |
| (3) | −0.0060 | −0.0060 | −0.0041 | −0.0060 | −0.0060 | −0.0050 |
| (4) | 2.717 | 2.330 | 2.718 | 2.330 | 2.330 | 2.107 |
| (5) | 3.5 | 3.5 | 3.7 | 3.5 | 3.5 | 3.3 |
| (6') | 2.60 | 4.02 | 1.10 | | 2.72 | 1.70 |
| (7) | 1.03 | 1.09 | 1.33 | | 1.25 | 0.87 |

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-013070 filed Jan. 29, 2021, which is hereby incorporated by reference herein in its entirety.

What is claimed is:

1. A zoom lens comprising, in order from an object side to an image side:

a first lens unit having a positive refractive power;
a plurality of lens units which move in zooming; and
a final lens unit having a positive refractive power,
wherein an interval between each pair of adjacent lens units changes in zooming,
wherein the plurality of lens units include a lens unit having a negative refractive power,
wherein the first lens unit includes a negative lens and a positive lens,
wherein at least a part of the first lens unit moves for focusing,
wherein the first lens unit includes a negative lens made of a material satisfying the following inequalities:

$70<Ndn<1.85,$ $28<vdn<39,$ and $-0.010<\theta n-(0.641682-0.001623\times vdn)<-0.004,$ where Ndn denotes a refractive index with respect to a d-line, vdn denotes an Abbe number based on a d-line, and θn denotes a partial dispersion ratio with respect to a g-line and an F-line, and
wherein the zoom lens satisfies the following inequality:

$2.0<vbg/vdn<3.5,$ where vbg denotes a maximum value of an Abbe number based on d-line of at least one positive lens included in the first lens unit.

2. The zoom lens according to claim 1,
wherein the first lens unit includes a first subunit and a second subunit located in order from the object side to the image side, and
wherein the second subunit has a positive refractive power and moves from the image side to the object side for focusing from an infinite object distance to a minimum object distance.

3. The zoom lens according to claim 2, wherein the first subunit includes a negative lens made of the material.

4. The zoom lens according to claim 1,
wherein the first lens unit includes a first subunit, a second subunit, and a third subunit located in order from the object side to the image side, and
wherein the second subunit has a positive refractive power and moves from the object side to the image side for focusing from an infinite object distance to a minimum object distance.

5. The zoom lens according to claim 4, wherein the zoom lens satisfies the following inequality:

$05<|f11/f1|<5.0,$ where f1 denotes a focal length of the first lens unit, and f11 denotes a focal length of the first subunit.

6. The zoom lens according to claim 4, wherein the third subunit includes a negative lens made of the material.

7. The zoom lens according to claim 1, wherein at least one of a lens located first from the object side and a lens located second from the object side included in the first lens unit is a negative lens made of the material.

8. The zoom lens according to claim 1, wherein a negative lens whose absolute value of a refractive power is largest in the first lens unit is made of the material.

9. The zoom lens according to claim 1, wherein the zoom lens satisfies the following inequality:

$3<Dn<4,$ where Dn denotes a specific gravity of the material.

10. The zoom lens according to claim 1, wherein the first lens unit includes four or more lenses.

11. The zoom lens according to claim 1, wherein the final lens unit does not move for zooming.

12. The zoom lens according to claim 11,
wherein the first lens unit includes a first subunit and a second subunit located in order from the object side to the image side,
wherein the second subunit has a positive refractive power and moves from the image side to the object side for focusing from an infinite object distance to a minimum object distance, and
wherein the zoom lens satisfies the following inequality:

$2.8<|f1/fnmx|<13.$

13. The zoom lens according to claim 11,
wherein the first lens unit includes a first subunit, a second subunit, and a third subunit located in order from the object side to the image side,
wherein the second subunit has a positive refractive power and moves from the object side to the image side for focusing from an infinite object distance to a minimum object distance, and
wherein the zoom lens satisfies the following inequality:

$0.7<|f1/fnmx|<7.0.$

14. The zoom lens according to claim 1, wherein the zoom lens satisfies the following inequality:

$0.7<|f1/fnmx|<13,$ where f1 is a focal length of the first lens unit, and fnmx is a focal length of a lens unit whose absolute value of a refractive power is largest among at least one lens unit which has a negative refractive power and moves in zooming.

15. An apparatus comprising:
a zoom lens; and
an image pickup element configured to pick up an image formed by the zoom lens,
wherein the zoom lens includes, in order from an object side to an image side:
a first lens unit having a positive refractive power;
a plurality of lens units each of which moves in zooming; and
a final lens unit having a positive refractive power,
wherein an interval between each pair of adjacent lens units changes in zooming,
wherein the plurality of lens units includes a lens unit having a negative refractive power,
wherein the first lens unit includes a negative lens and a positive lens,
wherein at least a part of the first lens unit moves for focusing,
wherein the first lens unit includes a negative lens made of a material satisfying the following inequalities:

$1.70<Ndn<1.85,$ $28<vdn<39,$ and $-0.010<\theta n-(0.641682-0.001623\times vdn)<-0.004,$ where Ndn denotes a refractive index with respect to a d-line, vdn denotes an Abbe number based on a d-line, and θn denotes a partial dispersion ratio with respect to a g-line and an F-line, and wherein the zoom lens satisfies the following inequality:

$$2.0 < vbg/vdn < 3.5,$$

where vbg denotes a maximum value of an Abbe number based on d-line of at least one positive lens included in the first lens unit.

16. The apparatus according to claim 15, wherein the first lens unit includes a first subunit and a second subunit located in order from the object side to the image side, and wherein the second subunit has a positive refractive power and moves from the image side to the object side for focusing from an infinite object distance to a minimum object distance.

17. The apparatus according to claim 15, wherein the first lens unit includes a first subunit, a second subunit, and a third subunit located in order from the object side to the image side, and wherein the second subunit has a positive refractive power and moves from the object side to the image side for focusing from an infinite object distance to a minimum object distance.

18. The apparatus according to claim 15, wherein at least one of a lens located first from the object side and a lens located second from the object side included in the first lens unit is a negative lens made of the material.

19. The apparatus according to claim 15, wherein a negative lens whose absolute value of a refractive power is largest in the first lens unit is made of the material.

20. The apparatus according to claim 15, wherein the zoom lens satisfies the following inequality:

$$3 < Dn < 4,$$

where Dn denotes a specific gravity of the material.

* * * * *